(12) United States Patent
Harrison et al.

(10) Patent No.: US 9,644,866 B2
(45) Date of Patent: *May 9, 2017

(54) TREATED BRINE COMPOSITIONS WITH REDUCED CONCENTRATIONS OF POTASSIUM, RUBIDIUM, AND CESIUM

(71) Applicant: Simbol Inc, Pleasanton, CA (US)

(72) Inventors: Stephen Harrison, Benicia, CA (US); John Burba, III, Parker, CO (US)

(73) Assignee: Simbol, Inc., Pleasanton, CA (US)

( * ) Notice: Subject to any disclaimer, the term of this patent is extended or adjusted under 35 U.S.C. 154(b) by 367 days.

This patent is subject to a terminal disclaimer.

(21) Appl. No.: 14/187,961

(22) Filed: Feb. 24, 2014

(65) Prior Publication Data
US 2014/0165563 A1 Jun. 19, 2014

Related U.S. Application Data

(63) Continuation-in-part of application No. 12/822,580, filed on Jun. 24, 2010, now Pat. No. 8,597,521, and
(Continued)

(51) Int. Cl.
*B01D 21/00* (2006.01)
*C02F 1/52* (2006.01)
(Continued)

(52) U.S. Cl.
CPC ............... *F24J 3/085* (2013.01); *C02F 9/00* (2013.01); *C22B 26/10* (2013.01); *B01D 21/00* (2013.01);
(Continued)

(58) Field of Classification Search
CPC ...... B01D 11/02; B01D 11/0288; C01D 3/04; C01D 3/06; C01D 3/14; C01D 3/145;
(Continued)

(56) References Cited

U.S. PATENT DOCUMENTS 4,016,075 A 4/1977 Wilkins
4,116,856 A 9/1978 Lee et al.
(Continued)

FOREIGN PATENT DOCUMENTS

EP 0189799 B1 8/1988
JP 52009963 A 1/1977
(Continued)

OTHER PUBLICATIONS

Publication of R. Gordon Bloomquist, "Economic Benefits of Mineral Extraction From Geothermal Brines", Washington State University Extension Energy Program, 2006.*
(Continued)

*Primary Examiner* — Joseph Drodge
(74) *Attorney, Agent, or Firm* — Fish & Tsang, LLP

(57) ABSTRACT

This invention relates to treated geothermal brine compositions containing reduced concentrations of silica, iron, and potassium compared to the untreated brines. Exemplary compositions of the treated brine contain a concentration of silica ranging from about 0 mg/kg to about 15 mg/kg, a concentration of iron ranging from about 0 mg/kg to about 10 mg/kg, and a concentration of potassium ranging from about 300 mg/kg to about 8500 mg/kg. Other exemplary compositions of the treated brines also contain reduced concentrations of elements like rubidium, cesium, and lithium.

20 Claims, 41 Drawing Sheets

Related U.S. Application Data a continuation-in-part of application No. 14/062,781, filed on Oct. 24, 2013, which is a continuation of application No. 12/822,580, filed on Jun. 24, 2010, now Pat. No. 8,597,521, application No. 14/187,961, filed on Feb. 24, 2014, which is a continuation-in-part of application No. 12/823,000, filed on Jun. 24, 2010, now Pat. No. 9,051,827.

(60) Provisional application No. 61/239,275, filed on Sep. 2, 2009, provisional application No. 61/873,212, filed on Sep. 3, 2013, provisional application No. 61/220,000, filed on Jun. 24, 2009, provisional application No. 61/780,308, filed on Mar. 13, 2013.

(51) Int. Cl.

| | | |
|---|---|---|
| *C22B 19/00* | (2006.01) | |
| *C22B 26/12* | (2006.01) | |
| *C22B 47/00* | (2006.01) | |
| *F24J 3/08* | (2006.01) | |
| *C22B 26/10* | (2006.01) | |
| *C02F 9/00* | (2006.01) | |
| *C02F 1/74* | (2006.01) | |
| *C02F 5/00* | (2006.01) | |
| *C02F 101/10* | (2006.01) | |
| *C02F 103/06* | (2006.01) | |
| *C02F 103/08* | (2006.01) | |
| *C02F 103/10* | (2006.01) | |
| *C02F 1/26* | (2006.01) | |
| *C02F 1/28* | (2006.01) | |
| *C02F 1/42* | (2006.01) | |
| *C02F 1/56* | (2006.01) | |
| *C02F 1/66* | (2006.01) | |
| *C02F 101/20* | (2006.01) | |

(52) U.S. Cl.
CPC ............ *C02F 1/26* (2013.01); *C02F 1/281* (2013.01); *C02F 1/42* (2013.01); *C02F 1/52* (2013.01); *C02F 1/5245* (2013.01); *C02F 1/56* (2013.01); *C02F 1/66* (2013.01); *C02F 1/74* (2013.01); *C02F 5/00* (2013.01); *C02F 2001/5218* (2013.01); *C02F 2101/10* (2013.01); *C02F 2101/203* (2013.01); *C02F 2103/06* (2013.01); *C02F 2103/08* (2013.01); *C02F 2103/10* (2013.01); *C02F 2209/02* (2013.01); *C02F 2209/06* (2013.01); *Y02E 10/14* (2013.01)

(58) Field of Classification Search
CPC . C01D 3/16; C01D 3/00; C01D 15/00; C01D 17/00; C22B 3/04; C22B 3/06; C22B 3/14; C22B 3/145; C22B 3/16; C22B 26/00; C22B 26/10; C22B 13/00; C22B 13/02; C22B 13/04; C22B 15/00; C22B 19/00; C22B 19/20; C22B 19/26; C22B 26/12; C22B 26/26; C22B 47/00; C02F 2103/06; C02F 2103/16; C02F 1/02; C02F 1/04; C02F 1/60; C02F 1/62; C02F 1/64; C02F 2101/10; C02F 2101/103; C02F 2101/20; C02F 2101/203; F03G 7/04; F03G 7/06; E21B 43/00; E21B 43/29; E21B 43/34; H01M 4/02; H01M 4/13; H01M 4/134; H01M 4/136; H01M 4/139; H01M 4/1395; H01M 4/1397

USPC ............ 60/641.2; 75/308, 711; 210/170.11, 210/747.5, 747.7, 634, 722; 252/71; 423/179, 181, 182, 499.4, 499.5, 751

See application file for complete search history.

(56) References Cited

U.S. PATENT DOCUMENTS

| | | | |
|---|---|---|---|
| 4,116,858 A | 9/1978 | Lee et al. | |
| 4,127,989 A * | 12/1978 | Mickelson | C01D 3/16 165/45 |
| 4,159,311 A | 6/1979 | Lee et al. | |
| 4,221,767 A | 9/1980 | Lee et al. | |
| 4,244,190 A * | 1/1981 | Lieffers | F03G 7/04 60/641.5 |
| 4,276,180 A | 6/1981 | Matson | |
| 4,291,001 A | 9/1981 | Repsher et al. | |
| 4,347,327 A | 8/1982 | Lee et al. | |
| 4,348,295 A | 9/1982 | Burba, III | |
| 4,348,296 A | 9/1982 | Bauman et al. | |
| 4,348,297 A | 9/1982 | Bauman et al. | |
| 4,376,100 A | 3/1983 | Lee et al. | |
| 4,405,463 A * | 9/1983 | Jost | C02F 1/72 210/712 |
| 4,428,200 A * | 1/1984 | McCabe | F03G 7/04 165/45 |
| 4,430,311 A | 2/1984 | Lee et al. | |
| 4,461,714 A | 7/1984 | Burba, III | |
| 4,472,362 A | 9/1984 | Burba, III | |
| 4,492,083 A * | 1/1985 | McCabe | F03G 7/04 165/45 |
| 4,522,728 A * | 6/1985 | Gallup | C02F 1/042 210/714 |
| 4,540,509 A | 9/1985 | Burba, III | |
| 4,602,820 A * | 7/1986 | Hard | C22B 3/46 166/267 |
| 4,710,361 A * | 12/1987 | Ostrea | B03D 1/008 209/166 |
| 4,710,367 A * | 12/1987 | Wong | C02F 9/00 423/109 |
| 4,727,167 A | 2/1988 | Burba, III et al. | |
| 4,745,977 A | 5/1988 | Love et al. | |
| 4,763,479 A * | 8/1988 | Hoyer | F03G 7/04 210/747.7 |
| 4,765,913 A * | 8/1988 | Featherstone | C02F 1/5236 210/714 |
| 4,776,961 A * | 10/1988 | Gritters | B01D 3/06 210/713 |
| 5,015,541 A | 5/1991 | Evans | |
| 5,145,656 A | 9/1992 | Gallup et al. | |
| 5,200,165 A | 4/1993 | Harper et al. | |
| 5,229,003 A | 7/1993 | Duyvesteyn | |
| 5,246,593 A * | 9/1993 | Gallup | C02F 1/5209 210/143 |
| 5,246,684 A * | 9/1993 | Brown | C22B 3/0005 423/101 |
| 5,358,700 A | 10/1994 | Brown et al. | |
| 5,389,349 A | 2/1995 | Bauman et al. | |
| 5,427,691 A | 6/1995 | Kuyucak et al. | |
| 5,441,712 A | 8/1995 | Duyvesteyn et al. | |
| 5,599,516 A | 2/1997 | Bauman et al. | |
| 5,656,172 A * | 8/1997 | Kitz | C02F 1/66 166/310 |
| 5,666,641 A | 9/1997 | Abney et al. | |
| 5,833,844 A | 11/1998 | Leavitt | |
| 6,017,500 A | 1/2000 | Mehta | |
| 6,080,696 A | 6/2000 | Duke et al. | |
| 6,280,693 B1 | 8/2001 | Bauman et al. | |
| 6,458,184 B2 * | 10/2002 | Featherstone | C22B 19/20 210/634 |
| 6,555,078 B1 | 4/2003 | Mehta | |
| 6,682,644 B2 | 1/2004 | Featherstone et al. | |
| 6,761,865 B1 * | 7/2004 | Gallup | C01B 33/22 210/696 |
| 2001/0000597 A1 * | 5/2001 | Featherstone | C22B 19/20 205/605 |

(56) References Cited

U.S. PATENT DOCUMENTS

| | | | |
|---|---|---|---|
| 2001/0011645 A1* | 8/2001 | Silva | C01D 3/145 210/669 |
| 2003/0026749 A1* | 2/2003 | Burrows | C22B 3/44 423/164 |
| 2003/0226761 A1 | 12/2003 | Featherstone et al. | |
| 2004/0149590 A1 | 8/2004 | Featherstone et al. | |

FOREIGN PATENT DOCUMENTS

| | | |
|---|---|---|
| JP | 55031437 A | 3/1980 |
| WO | 0078675 A1 | 12/2000 |
| WO | 0198311 A2 | 12/2001 |

OTHER PUBLICATIONS

Publication by William Bourcier et al., "Co-production of silica from geothermal fluids", published by Lawrence Livermore National Laboratory, publication # UCRL-TR-216881, Nov. 7, 2005, California Energy Commission Project PIR-00-003.*

T. Yokoyama et al. "A study of the Alumina-Silica Gel Adsorbent for the Removal of Silicic Acid from Geothermal Water: Increase in Adsorption Capacity of the Adsorbent due to Formation of Amorphous Aluminosilicate by Adsorption of Silicic Acid" Journal of Colloid and Interface Science, 2002, vol. 252, pp. 1-5.

M.A.F. Pyman et al. "The Point of Zero Charge of Amorphous Coprecipitates of Silica with Hydrous Aluminum or Ferric Hydroxide" Clay Minerals, Western Australia, 1979, vol. 14, pp. 87-92.

Y. Ku et al. "The Adsorption of Fluoride Ion from Aqueous Solution by Activated Alumina" Department of Chemical Engineering, National University of Science and Technology, Netherlands, 2002, vol. 133, pp. 349-360.

J. Bright Sheikholeslami "Silica and metals removal by pretreatment to prevent fouling of reverse osmosis membranes" Desalination vol. 143, 2002, pp. 255-267.

W Bouguerra et al. "Equilibrium and kinetic studies of adsorption of silica onto activated alumina" Desalination vol. 206, 2007, pp. 141-146.

D.L. Gallup et al. "Laboratory investigation of silica removal from geothermal brines to control silica scaling and produce usable silicates" Applied Geochemistry, 2003, vol. 18, pp. 1597-1612.

V.V. Potapv et al. "Experiments on Silica Precipitation from Hydrothermal Solution and Utilization of Precipitated Material" Thirtieth Workshop on Geothermal Reservoir Engineering, Stanford University, 2005, 9 pages.

ISA/KR, International Search Report and Written Opinion for International Application No. PCT/US2014/022962, Aug. 28, 2015 9 pages.

* cited by examiner

TREATED BRINE COMPOSITIONS WITH REDUCED CONCENTRATIONS OF POTASSIUM, RUBIDIUM, AND CESIUM

RELATED APPLICATIONS

This application claims priority to U.S. Provisional Patent Application Ser. No. 61/780,308, filed on Mar. 13, 2013, and U.S. Provisional Patent Application Ser. No. 61/873,212, filed on Sep. 3, 2013; also claims priority to, and is a Continuation-in-Part of U.S. patent application Ser. No. 14/062,781, filed on Oct. 24, 2013, which is a Continuation application of U.S. Pat. No. 8,597,521 filed on Jun. 24, 2010, which claims priority to U.S. Provisional Patent Application Ser. No. 61/220,000, filed on Jun. 24, 2009; also claims priority to and is a Continuation-in-Part of U.S. patent application Ser. No. 12/823,000, filed on Jun. 24, 2010, which claims priority to U.S. Provisional Patent Application Ser. No. 61/239,275, filed on Sep. 2, 2009, all of which are incorporated herein by reference in their entireties.

TECHNICAL FIELD OF THE INVENTION

The invention generally relates to treated brine compositions with reduced concentrations of silica, iron, and potassium. Certain embodiments of the invention also relate to the geothermal brine compositions with reduced concentrations of silica and iron from which potassium, rubidium, and/or cesium, selectively or in combination, have been removed. Additionally, the invention relates to methods of producing these treated brine compositions using tetrafluoroborates.

BACKGROUND

A number of brine sources exist naturally. For instance, brine sources include brine deposits like the Salar de Atacama in Chile, Silver Peak Nev., Salar de Uyuni in Bolivia, or the Salar de Hombre Muerte in Argentina. Other common brine sources are geothermal, oilfield, Smackover, and relict hydrothermal brines. These brines, however, have not previously been commercially exploited very well.

Geothermal brines are of particular interest for a variety of reasons. First, geothermal brines provide a source of power due to the fact that hot geothermal pools are stored at high pressure underground, which when released to atmospheric pressure, can provide a flash-steam. The flash-steam can be used, for example, to run a power plant. Additionally, geothermal brines contain useful elements, which can be recovered and utilized for secondary processes. In some geothermal waters and brines, binary processes can be used to heat a second fluid to provide steam for the generation of electricity without the flashing of the geothermal brine.

One problem associated with geothermal brines when utilized for the production of electricity results from scaling and deposition of solids. Silica and other solids that are dissolved within the geothermal brine precipitate out during all stages of brine processing, particularly during the cooling of a geothermal brine, and may eventually result in fouling of the injection wells or processing equipment.

It is known that geothermal brines can include various metal ions, particularly alkali and alkaline earth metals, as well as silica, iron, lead, silver, and zinc, in varying concentrations, depending upon the source of the brine. Recovery of these metals is potentially important to the chemical, pharmaceutical, and electronic industries. Typically, the economical recovery of metals from natural brines, which may vary widely in composition, depends not only on the specific concentration of the desired metal, but also upon the concentrations of interfering ions, particularly silica, calcium, and magnesium, because the presence of the interfering ions will increase recovery costs, as additional steps must be taken to remove the interfering ions. Economical recovery also depends upon the commercial cost and availability of the desired metal already present in the relevant market.

Some of the desired metals that can be present in brines are potassium, rubidium, and cesium. Economically recoverable deposits of potassium are rare. The potassium concentration in the Salton Sea geothermal brine, however, is around 24,000 parts per million. Potassium that has been extracted from brines can easily be converted into potassium chloride, which is useful in a variety of applications including agriculture, medicine, food processing, and as a standard measure of conductivity of ionic solutions in the chemical arts.

Currently, there are no existing potassium, rubidium, and cesium removal technologies that remove potassium, rubidium, and/or cesium, selectively or in combination, from geothermal brines generally. Therefore, it would be advantageous to develop a method to remove potassium, rubidium, and/or cesium, selectively or in combination, from brines and convert them into chlorides. Additionally, this technology presents an economic advantage. For example, the price of potassium chloride in the chemical market is relatively low, so it would be advantageous to develop a method of production of potassium chloride using extracted potassium from geothermal and other brines that is cost competitive.

Silica is known to deposit in piping as scale deposits, typically as a result of the cooling of a geothermal brine. Frequently, geothermal brines are near saturation with respect to the silica concentration and upon cooling; deposition occurs because of the lower solubilities at lower temperatures. This is combined with the polymerization of silica and co-precipitation with other species, particularly metals. This is seen in geothermal power stations, and is particularly true for amorphous silica/silicates. Additionally, silica is a known problem in reverse osmosis desalination plants. Thus, removal of silica from low concentration brines may help to eliminate these scale deposits, and thus reduce costs and improve efficiency of facilities that use and process brines.

Known methods for the removal of silica from geothermal brines include the use of a geothermal brine clarifier for the removal and recovery of silica solids that may be precipitated with the use of various seed materials, or the use of compounds that absorb silica, such as magnesium oxide, magnesium hydroxide, or magnesium carbonate. In addition to a less than complete recovery of silicon from brines, prior methods also suffer in that they typically remove ions and compounds other than just silica and silicon containing compounds.

Geothermal brines can be flashed via several processes. There is the conventional method to produce steam for power. There have also been modifications to the conventional dual direct flash evaporation method to include multiple flash evaporation stages.

One modification to the conventional dual direct flash method is the crystallizer reactor clarifier process. In the crystallizer reactor clarifier process, a reactor clarifier precipitates components that can cause scaling, such as iron rich amorphous silica, and removes suspended particles from the brines before injection into the flash process. The process also seeds the brine in the flash vessels to reduce scale formation. Thus, when precipitation occurs it is more likely that it will occur on the seed slurry than on the metal surfaces of the flash apparatus.

There is also the pH modification process that differs from the crystallizer reactor clarifier process. In the pH modification process, compounds that cause scaling are maintained in solution. By lowering the pH of the brine solution, for example, as low as 3.0, compounds that typically cause scaling on the flash apparatus are maintained in solution. By lowering pH and modifying pressures, the compounds are maintained in solution and scaling is prevented or reduced.

Thus, although conventional methods employed in the processing of ores and brines can remove some of the silica present in silica containing solutions and brines, there exists a need to develop methods that are selective for the removal of silica from brines and other silica containing solutions at high yields to produce treated compositions with reduced silica concentrations. Additionally, once certain components are removed, the geothermal brine compositions may be injected into a geothermal reservoir, such as into the original reservoir. Compositions for improving injectivity of such brines will improve the efficiency of the process, as improved injectivity will reduce the costs and time associated with cleaning the equipment used for injecting such brines and will also increase long-term permeable flow. While current practices at geothermal plants have focused on reduction of scaling on the apparatus associated with the flash process, there is still a need to reduce scaling after the processing of the brine for energy. The current practice at Salton Sea geothermal plants is to clean injection wells on an annual basis. This is a significant expense as there are typically multiple wells (i.e., three wells) to clean out. This is typically done by hydroblasting or acid treatment. After a certain time, typically three years, this is no longer effective and portions of wells must be routed out to remove blockages, which is expensive and time consuming. The routing process can usually be repeated twice before the wells have to be completely replaced. Thus, compositions and processes that would reduce fouling and prolong the time between required cleanings would be of substantial benefit.

SUMMARY OF THE INVENTION

Exemplary embodiments of the present invention include treated geothermal brine compositions. In certain embodiments, the composition contains a treated geothermal brine having a concentration of silica ranging from about 0 mg/kg to 15 mg/kg, a concentration of iron ranging from about 0 to about 10 mg/kg, and a concentration of potassium ranging from about 300 mg/kg to about 8500 mg/kg. The compositions can be used for further mineral extraction or for injection into a geothermal reservoir.

In other aspects, the invention provides a treated geothermal brine composition having a concentration of silica less than about 10 mg/kg, the concentration of iron less than about 10 mg/kg, and the concentration of potassium less than about 4000 mg/kg.

In other aspects, the invention provides a treated geothermal brine composition having a concentration of silica less than about 5 mg/kg, the concentration of iron less than about 10 mg/kg, and the concentration of potassium less than about 4000 mg/kg.

In other aspects, the invention provides a treated geothermal brine composition having a concentration of silica less than about 10 mg/kg, the concentration of iron less than about 10 mg/kg, and the concentration of potassium less than about 2000 mg/kg.

In other aspects, the invention provides a treated geothermal brine composition having a concentration of silica less than about 5 mg/kg, the concentration of iron less than about 10 mg/kg, and the concentration of potassium less than about 1000 mg/kg.

In other aspects, the invention provides a treated geothermal brine composition having a concentration of silica less than about 10 mg/kg, the concentration of iron less than about 10 mg/kg, and the concentration of potassium less than about 1000 mg/kg.

In other aspects, the invention provides a treated geothermal brine composition having a concentration of silica less than about 10 mg/kg, the concentration of iron less than about 10 mg/kg, and the concentration of potassium less than about 500 mg/kg.

In other aspects, the invention provides a treated geothermal brine composition having a concentration of silica less than about 5 mg/kg, the concentration of iron less than about 10 mg/kg, and the concentration of potassium less than about 500 mg/kg.

In other aspects, the treated geothermal brine compositions described herein have a concentration of rubidium ranging from about 30 mg/kg to about 200 mg/kg.

In other aspects, the treated geothermal brine compositions described herein are Salton Sea geothermal brines. In other aspects, the treated geothermal brine compositions described herein are concentrated geothermal brines. In other aspects, the treated geothermal brine compositions described herein are used in a mineral extraction process. In other aspects, the treated geothermal brine compositions described herein are injected into geothermal reservoirs.

In other aspects, the invention provides a treated geothermal brine composition having a concentration of silica ranging from about 0 mg/kg to about 15 mg/kg, a concentration of iron ranging from about 0 mg/kg to about 10 mg/kg, and a concentration of rubidium ranging from about 30 mg/kg to about 200 mg/kg. In other aspects, this treated geothermal brine composition having a concentration of potassium of less than about 4000 mg/kg.

Some aspects of the present invention include methods of removing silica and iron from brines, as well as removing potassium, rubidium, and/or cesium, selectively or in combination from brines using tetrafluoroborates, as well as compositions that result therefrom. The method includes providing a brine solution that includes potassium, rubidium and/or cesium dissolved therein and then contacting the brine solution with a tetrafluoroborate compound to produce a tetrafluoroborate precipitate and an aqueous layer. The tetrafluoroborate precipitate containing potassium, rubidium and/or cesium is then separated from the aqueous layer.

In other aspects, the invention provides a method for preparing potassium chloride, rubidium chloride and/or cesium chloride from a tetrafluoroborate. The method includes contacting potassium tetrafluoroborate, rubidium tetrafluoroborate, and/or cesium tetrafluoroborate with an ionic liquid containing chloride anions to produce a tetrafluoroborate/ionic liquid solution. The tetrafluoroborate/ionic liquid solution is then heated to produce a tetrafluoroborate layer and an aqueous layer. The tetrafluoroborate layer is then separated from the aqueous layer and the aqueous layer is evaporated to produce potassium chloride, rubidium chloride, and/or cesium chloride.

In another aspect, the invention provides a method for preparing a chloride from a solution containing potassium tetrafluoroborate, rubidium tetrafluoroborate, and/or cesium tetrafluoroborate. The method includes contacting potassium tetrafluoroborate, rubidium tetrafluoroborate, and/or cesium tetrafluoroborate with an aqueous solution containing an ion-exchange media to produce a tetrafluoroborate/ion-exchange media mixture. The tetrafluoroborate/ion-exchange media mixture is then heated to produce an ion-exchange media layer and an aqueous layer. The aqueous layer is then separated from the ion-exchange media layer. The aqueous layer is then evaporated to produce a potassium, rubidium and/or cesium chloride.

BRIEF DESCRIPTION OF THE DRAWINGS

So that the manner in which the features and benefits of the invention, as well as others which will become apparent, may be understood in more detail, a more particular description of the embodiments of the invention may be had by reference to the embodiments thereof which are illustrated in the appended drawings, which form a part of this specification, it is also to be noted, however, that the drawings illustrate only various embodiments of the invention and are therefore not to be considered limiting of the invention's scope as it may include other effective embodiments as well.

DETAILED DESCRIPTION OF THE INVENTION

Figure 1:
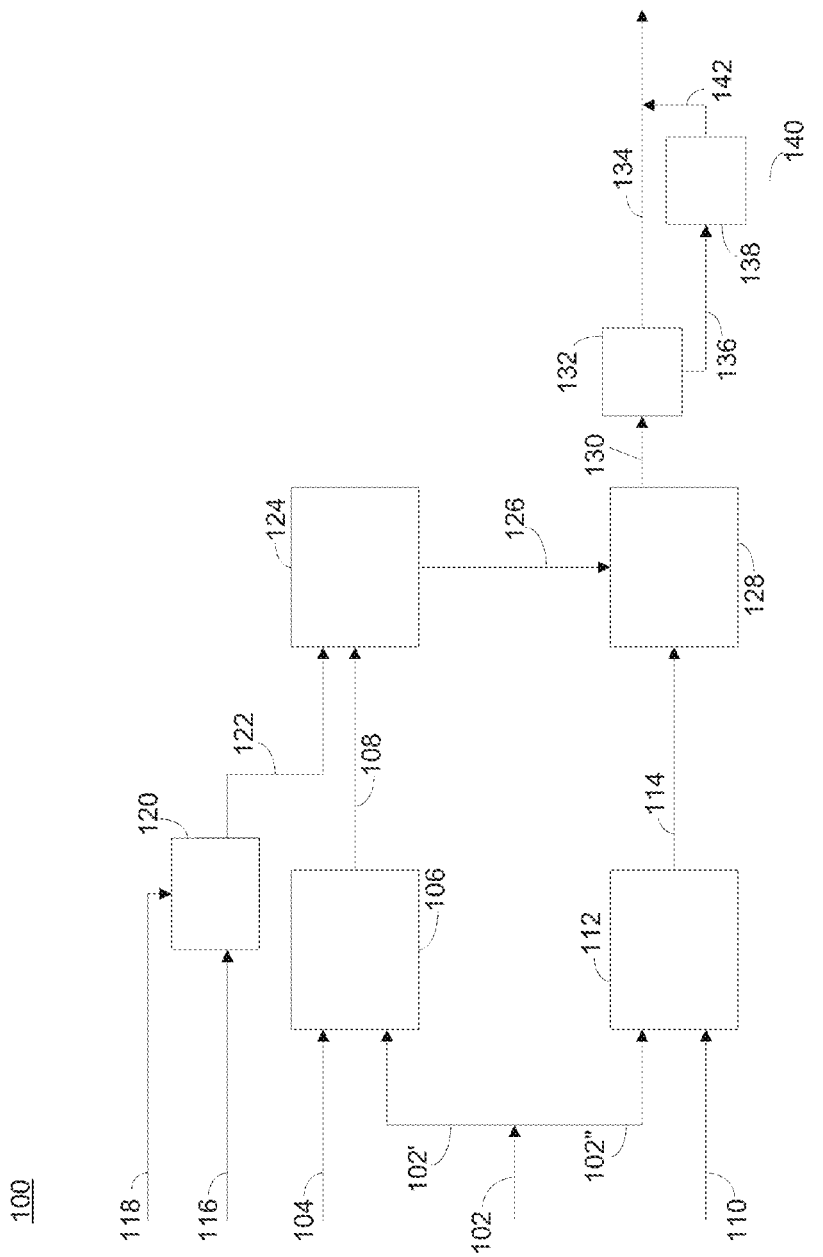
FIG. 1 is an illustration of an apparatus for the removal of silica from a silica containing brine according to an embodiment of the present invention.

As used herein the following terms shall have the following meanings.

As used herein, "brine" or "brine solution" refers to any aqueous solution that contains a substantial amount of dissolved metals, such as alkali and/or alkaline earth metal salt(s) in water, wherein the concentration of salts can vary from trace amounts up to the point of saturation. Generally, brines suitable for the methods described herein are aqueous solutions that may include alkali or alkaline earth metal chlorides, bromides, sulfates, hydroxides, nitrates, and the like, as well as natural brines. In certain brines, other metals like lead, manganese, and zinc may be present. Exemplary elements present in the brines can include sodium, potassium, calcium, magnesium, lithium, strontium, barium, iron, boron, silica, manganese, chlorine, zinc, aluminum, antimony, chromium, cobalt, copper, lead, arsenic, mercury, molybdenum, nickel, silver, thallium, vanadium, and fluorine, although it is understood that other elements and compounds may also be present. Brines can be obtained from natural sources, such as Chilean brines or Salton Sea brines, geothermal brines, Smackover brines, sea water, mineral brines (e.g., lithium chloride or potassium chloride brines), alkali metal salt brines, and industrial brines, for example, industrial brines recovered from ore leaching, mineral dressing, and the like. The present invention is also equally applicable to artificially prepared brine or salt solutions. Brines include continental brine deposits, geothermal brines, and waste or byproduct streams from industrial processes, Smackover brines, synthetic brines, and other brines resulting from oil and gas production. In some embodiments, the brines are brines from which energy has already been extracted. For instance, brines used herein include brines from which a power plant has already extracted energy through methods such as flashing.

The term "geothermal brine" refers to a saline solution that has circulated through the crustal rocks in areas of high heat flow and has become enriched in substances leached from those rocks. Geothermal brines, such as those found in the Salton Sea geothermal fields, can include many dissolved metal salts, including alkali, alkaline earth, and transition metal salts.

The term "Salton Sea brine" refers to geothermal brines obtained from the geothermal fields in San Diego County, Imperial County, and Riverside County, in California, USA.

The term "treated" in reference to a brine (e.g., "treated brine" or "treated geothermal brine") refers to brines that have been processed such that the concentration of at least one metal or elemental component has been reduced in the brine. For instance, a brine in which the concentration of silica, and iron has been reduced is a treated brine, also referred to as reduced silica and iron brine.

The term "concentrated" in reference to a brine (e.g., "concentrated brine" or "concentrated geothermal brine") refers to brines that have reduced water content compared to the original brine. The reduce water content brine may be subsequently diluted post concentration to prevent salt precipitation. In some embodiments, concentrated brines can result from evaporative processes.

The term "synthetic brine" refers to a brine that has been prepared such that it simulates a naturally occurring brine. For instance, a synthetic brine can be prepared in an attempt to simulate the brine composition of various geothermal brine reservoirs found in the Salton Sea region (Calif., U.S.). Generally, the synthetic brine simulating a Salton Sea geothermal brine has a composition of about 280 ppm lithium, 63,000 ppm sodium, 20,000 ppm potassium, 33,000 ppm calcium, 130 ppm strontium, 700 ppm zinc, 1700 ppm iron, 450 ppm boron, 50 ppm sulfate, 3 ppm fluoride, 450 ppm ammonium ion, 180 ppm barium 160 ppm silica (reported as $SiO_2$), and 180,000 ppm chloride. Additional elements, such as manganese, aluminum, antimony, bromine, chromium, cobalt, copper, fluorine, lead, arsenic, mercury, molybdenum, nickel, silver, thallium, and vanadium, may also be present in the brine.

The term "lithium salts" can include lithium nitrates, lithium sulfates, lithium bicarbonate, lithium halides (particularly chlorides and bromides), and acid salts. For example, the Salton. Sea brines have lithium chlorides.

As used herein, precipitates of iron oxides include iron oxides, iron hydroxides, iron oxide-hydroxides and iron oxyhydroxides.

Exemplary embodiments of the present invention include treated geothermal brine compositions. In certain embodiments, the composition contains a treated geothermal brine having a concentration of silica ranging from 0 to 80 mg/kg and a concentration of iron ranging from 0 to 800 mg/kg. In certain embodiments, the composition contains a treated geothermal brine having a concentration of silica ranging from 0 to 30 mg/kg and a concentration of iron ranging from 0 to 300 mg/kg. In another embodiment, the concentration of silica is less than about 5 mg/kg, and the concentration of iron is less than about 5 mg/kg in the treated geothermal brine composition. In another embodiment, the concentration of silica is less than about 5 mg/kg, and the iron concentration is less than about 10 mg/kg in the treated geothermal brine composition. In another embodiment, the concentration of silica is less than about 5 mg/kg, and the iron concentration is less than about 100 mg/kg. In another embodiment, the concentration of silica is less than about 10 mg/kg, and the iron concentration is less than about 100 mg/kg. In another embodiment, the concentration of silica is less than about 20 mg/kg, and the iron concentration is less than about 100 mg/kg. In another embodiment, the concentration of silica is less than about 10 mg/kg, and the iron concentration is less than about 200 mg/kg. In another embodiment, the concentration of silica, is less than about 20 mg/kg, and the iron concentration is less than about 200 mg/kg. In another embodiment, the concentration of silica, is less than about 30 mg/kg, and the iron concentration is less than about 300 mg/kg. In another embodiment, the concentration of silica is less than about 40 mg/kg, and the iron concentration is less than about 300 mg/kg. In another embodiment, the concentration of silica is less than about 40 mg/kg, and iron concentration is less than about 200 mg/kg. In another embodiment, the concentration of silica is less than about 60 mg/kg, and the iron concentration is less than about 300 mg/kg. In another embodiment, the concentration of silica is less than about 70 mg/kg, and the iron concentration is less than about 300 mg/kg.

In another embodiment, the treated geothermal brine compositions described herein have a concentration of arsenic ranging from 0 to 7 mg/kg. In another embodiment, the treated geothermal brine compositions described herein have a concentration of barium ranging from 0 to 200 mg/kg. In another embodiment, the treated geothermal brine compositions described herein have a concentration of lead ranging from 0 to 100 mg/kg. In another embodiment, the treated geothermal brine compositions described herein are Salton Sea brines. In certain embodiments, the treated geothermal brine is a concentrated geothermal brine.

Also disclosed are exemplary embodiments of methods of using the treated geothermal brine compositions described herein. For example without limitations, a treated geothermal brine can be supplied to a process for mineral extraction. For example without limitations, the minerals that can be extracted from the treated geothermal brine include lithium, manganese, potassium, rubidium, cesium, phosphates, zinc, and lead. Also disclosed are exemplary embodiments of methods of using the treated geothermal brine compositions described herein that include injecting the treated geothermal brine compositions into a geothermal reservoir.

Also disclosed are exemplary embodiments of treated Salton Sea geothermal brine compositions containing a concentration of silica ranging from 0 to 80 mg/kg and a concentration of iron ranging from 0 to 800 mg/kg. Also disclosed are exemplary embodiments of treated Salton Sea geothermal brine compositions containing a concentration of silica ranging from 0 to 30 mg/kg and a concentration of iron ranging from 0 to 300 mg/kg. In another embodiment, the treated geothermal brine compositions described herein have a concentration of arsenic ranging from 0 to 7 mg/kg. In another embodiment, the treated geothermal brine compositions described herein have a concentration of barium ranging from 0 to 200 mg/kg. In another embodiment, the treated geothermal brine compositions described herein have a concentration of lead ranging from 0 to 100 mg/kg. In another embodiment, the treated geothermal brine compositions described herein have a concentration of arsenic less than about 7 mg/kg, barium less than about 200 mg/kg, and lead less than about 100 mg/kg. In another embodiment, the invention provides a geothermal brine composition having a pH of about 4.0 to about 6.0 that has less than 20 ppm by weight of silica, less than 20 ppm by weight of iron, and further wherein the geothermal brine composition has total suspended solids ("TSS") of less than 10 ppm.

In some embodiments, the treated geothermal brine has a concentration of silica that ranges from 0 mg/kg to 30 mg/kg. In some embodiments, the treated geothermal brine has a concentration of silica that is less than about 25 mg/kg. In some embodiments, the treated geothermal brine has a concentration of silica that is less than about 20 mg/kg. In some embodiments, the treated geothermal brine has a concentration of silica that is less than about 15 mg/kg. In some embodiments, the treated geothermal brine has a concentration of silica that is less than about 12 mg/kg. In some embodiments, the treated geothermal brine has a concentration of silica that is less than about 10 mg/kg. In some embodiments, the treated geothermal brine has a concentration of silica that is less than about 8 mg/kg. In some embodiments, the treated geothermal brine has a concentration of silica that is less than about 5 mg/kg. In some embodiments, the treated geothermal brine has a concentration of silica that is less than about 1 mg/kg. Exemplary embodiments of the present invention include treated geothermal brine compositions with reduced concentrations of silica. In an embodiment, the concentration of silica ranges from 0 to 5 mg/kg. In another embodiment, the concentration of silica ranges from 0 to 10 mg/kg. In another embodiment, the concentration of silica ranges from 0 to 15 mg/kg. In another embodiment, the concentration of silica ranges from 0 to 20 mg/kg. In another embodiment, the concentration of silica ranges from 0 to 25 mg/kg. In another embodiment, the concentration of silica ranges from 0 to 30 mg/kg. In another embodiment, the concentration of silica ranges from 0 to 35 mg/kg. In another embodiment, the concentration of silica, ranges from 0 to 40 mg/kg. In another embodiment, the concentration of silica ranges from 0 to 45 mg/kg. In another embodiment, the concentration of silica ranges from 0 to 50 mg/kg. In another embodiment, the concentration of silica ranges from 0 to 55 mg/kg. In another embodiment, the concentration of silica ranges from 0 to 60 mg/kg. In another embodiment, the concentration of silica ranges from 0 to 65 mg/kg, in another embodiment, the concentration of silica ranges from 0 to 70 mg/kg. In another embodiment, the concentration of silica ranges from 0 to 75 mg/kg. In another embodiment, the concentration of silica ranges from 0 to 80 mg/kg. In another embodiment, the concentration of silica, ranges from 0 to 85 mg/kg. In another embodiment, the concentration of silica ranges from 0 to 90 mg/kg. In another embodiment, the concentration of silica ranges from 0 to 95 mg/kg. In another embodiment, the concentration of silica ranges from 0 to 100 mg/kg.

In some embodiments, the treated geothermal brine has a concentration of iron that ranges from 0 mg/kg to 300 mg/kg. In some embodiments, the treated geothermal brine has a concentration of iron that ranges from 0 mg/kg to 250 mg/kg. In some embodiments, the treated geothermal brine has a concentration of iron that ranges from 0 mg/kg to 200 mg/kg. In some embodiments, the treated geothermal brine has a concentration of iron that ranges from 0 mg/kg to 150 mg/kg. In some embodiments, the treated geothermal brine has a concentration of iron that ranges from 0 mg/kg to 100 mg/kg. In some embodiments, the treated geothermal brine has a concentration of iron that ranges from 0 mg/kg to 50 mg/kg. In some embodiments, the treated geothermal brine has a concentration of iron that ranges from 0 mg/kg to 25 mg/kg. In some embodiments, the treated geothermal brine has a concentration of iron that ranges from 0 mg/kg to 20 mg/kg. In some embodiments, the treated geothermal brine has a concentration of iron that ranges from 0 mg/kg to 10 mg/kg. In some embodiments, the treated geothermal brine has a concentration of iron that is less than about 300 mg/kg. In some embodiments, the treated geothermal brine has a concentration of iron that is less than about 250 mg/kg. In some embodiments, the treated geothermal brine has a concentration of iron that is less than about 200 mg/kg. In some embodiments, the treated geothermal brine has a concentration of iron that is less than about 100 mg/kg. In some embodiments, the treated geothermal brine has a concentration of iron that is less than about 75 mg/kg. In some embodiments, the treated geothermal brine has a concentration of iron that is less than about 50 mg/kg. In some embodiments, the treated geothermal brine has a concentration of iron that is less than about 40 mg/kg. In some embodiments, the treated geothermal brine has a concentration of iron that is less than about 30 mg/kg. In some embodiments, the treated geothermal brine has a concentration of iron that is less than about 20 mg/kg. In some embodiments, the treated geothermal brine has a concentration of iron that is less than about 10 mg/kg. In some embodiments, the treated geothermal brine has a concentration of iron that is less than about 9 mg/kg. In some embodiments, the treated geothermal brine has a concentration of iron that is less than about 8 mg/kg. In some embodiments, the treated geothermal brine has a concentration of iron that is less than about 7 mg/kg. In some embodiments, the treated geothermal brine has a concentration of iron that is less than about 6 mg/kg. In some embodiments, the treated geothermal brine has a concentration of iron that is less than about 5 mg/kg. In some embodiments, the treated geothermal brine has a concentration of iron that is less than about 4 mg/kg. In some embodiments, the treated geothermal brine has a concentration of iron that is less than about 3 mg/kg. In some embodiments, the treated geothermal brine has a concentration of iron that is less than about 2 mg/kg. In some embodiments, the treated geothermal brine has a concentration of iron that is less than about 1 mg/kg.

In some aspects, the invention provides a method for producing geothermal power using geothermal brines and producing a reduced silica and iron brine having improved injectivity. The method includes flashing a geothermal brine containing silica and iron to generate electrical power. This flashing produces precipitated silica and a reduced silica brine. The precipitated silica is then separated from the reduced silica brine and returned to the flashing the geothermal brine step. The reduced silica brine is then exposed to air to facilitate oxidation and to produce precipitated silica and iron solids, and a reduced silica and iron brine. The silica and iron solids are then separated from the reduced silica and iron brine and optionally, at least a portion of the silica and iron solids are returned to the exposing the reduced silica brine to air step. The reduced silica and iron treated brine is then injected into a separate injection well, but the same reservoir, such as a geothermal reservoir, wherein the reduced silica and iron brine has improved infectivity as compared to the reduced silica brine. In further embodiments, the treated brine having reduced silica, and optionally iron, concentration is further treated to remove additional components, such as lithium, potassium, rubidium, and/or cesium, selectively or in combination.

In geothermal power plants, heat may be recovered from a geothermal brine through the use of one or more flash tanks in a process known as flashing. Any method of flashing may be used in the present invention. In some embodiments, the crystallizer reactor clarifier process is used. In other embodiments, the pH modification process is used. In some embodiments, the brine will be treated after it has left the first clarifier of a two clarifier processing system. In some embodiments, the brine will be treated after it has been completely processed by the clarifier system.

In some embodiments, the reduced silica and iron brine has a concentration of silica that ranges from 0 mg/kg to 30 mg/kg. In some embodiments, the reduced silica and iron brine has a concentration of silica that is less than 5 mg/kg. In some embodiments, the reduced silica and iron brine has a concentration of silica that is less than 10 mg/kg. In some embodiments, the reduced silica and iron brine has a concentration of silica that is less than 20 mg/kg. In some embodiments, the reduced silica and iron brine has a concentration of silica that is less than 30 mg/kg.

In some embodiments, the reduced silica and iron brine has less than 20 ppm of silica. In some embodiments, the reduced silica and iron brine has less than 20 ppm of iron. In further embodiments, the reduced silica and iron brine has less than 20 ppm of silica and less than 20 ppm of iron. In some embodiments, the reduced silica and iron brine has less than 15 ppm of silica. In some embodiments, the reduced silica and iron brine has less than 15 ppm of iron. Further embodiments, the reduced silica and iron brine has less than 15 ppm of silica and less than 15 ppm of iron. In some embodiments, the reduced silica and iron brine has less than 10 ppm of silica. In some embodiments, the reduced silica and iron brine has less than 10 ppm of iron. In further embodiments, the reduced silica and iron brine has less than 10 ppm of silica and less than 10 ppm of iron. In some embodiments, the reduced silica and iron brine has less than 5 ppm of silica. In further embodiments, the reduced silica and iron brine has less than 5 ppm of silica and less than 10 ppm of iron.

In further embodiments of the process, other components may be removed from the brine before the brine is injected into an underground region, such as a reservoir. In one embodiment, lithium is removed from the geothermal brine before the reduced silica and iron brine is injected into the underground region. In another embodiment, manganese is removed from the reduced silica and iron brine before it is injected into the underground region. In another embodiment, zinc is removed from the reduced silica and iron brine before it is injected into the underground region. In another embodiment, potassium is removed from the reduced silica and iron brine before it is injected into the underground region. In another embodiment, rubidium is removed from the reduced silica and iron brine before it is injected into the underground region. In another embodiment, cesium is removed from the reduced silica and iron brine before it is injected into the underground region. In further embodiments, any combination of these components is removed from the reduced silica and iron brine before it is injected into the underground region.

In some embodiments, the reduced silica and iron brine has a concentration of silica ranging from about 0 mg/kg to about 15 mg/kg, a concentration of iron ranging from about 0 mg/kg to about 10 mg/kg, and a concentration of potassium ranging from about 300 mg/kg to about 8500 mg/kg. In other embodiments, the concentration of silica is less than about 10 mg/kg, the concentration of iron of less than about 10 mg/kg, and the concentration of potassium is less than about 4000 mg/kg.

In other embodiments, the concentration of silica is less than about 10 mg/kg, the concentration of iron is less than about 10 mg/kg, and the concentration of potassium is less than about 4000 mg/kg. In other embodiments, the concentration of silica is less than about 5 mg/the concentration of iron is less than about 10 mg/kg, and the concentration of potassium is less than about 4000 mg/kg. In other embodiments, the concentration of silica is less than about 10 mg/kg, the concentration of iron is less than about 10 mg/kg, and the concentration of potassium is less than about 1000 mg/kg. In other embodiments, the a concentration of silica is less than about 10 mg/kg, the concentration of iron is less than about 5 mg/kg, and the concentration of potassium is less than about 1000 mg/kg. In other embodiments, the a concentration of silica is less than about 5 mg/kg, the concentration of iron is less than about 10 mg/kg, and the concentration of potassium is less than about 1000 mg/kg. In other embodiments, the a concentration of silica is less than about 20 mg/kg, the concentration of iron is less than about 10 mg/kg, and the concentration of potassium is less than about 1000 mg/kg. In other embodiments, the concentration of silica is less than about 10 mg/kg, the concentration of iron is less than about 10 mg/kg, and the concentration of potassium is less than about 500 mg/kg. In other embodiments, the concentration of silica is less than about 5 mg/kg, the concentration of iron is less than about 10 mg/kg, and the concentration of potassium is less than about 500 mg/kg.

In further embodiments, the treated geothermal brine composition has a concentration of silica ranging from about 0 mg/kg to about 15 mg/kg. In other embodiments, the treated geothermal brine composition has a silica concentration of less than about 0 mg/kg. In other embodiments, the treated geothermal brine composition has a silica concentration of less than about 5 mg/kg. In other embodiments, the treated geothermal brine composition has a silica concentration of less than about 10 mg/kg. In other embodiments, the treated geothermal brine composition has a silica concentration of less than about 15 mg/kg.

In further embodiments, the geothermal brine has a concentration of iron ranging from about 0 mg/kg to about 10 mg/kg. In other embodiments, the treated geothermal brine composition has an iron concentration of about 0 mg/kg. In other embodiments, the treated geothermal brine composition has an iron concentration of less than about 5 mg/kg. In other embodiments, the treated geothermal brine composition has an iron concentration of about 10 mg/kg.

In further embodiments, the geothermal brine has a concentration of potassium ranging from about 300 mg/kg to about 8500 mg/kg. In other embodiments, the treated geothermal brine composition has a potassium concentration of less than about 300 mg/kg. In other embodiments, the treated geothermal brine composition has a potassium concentration of less than about 500 mg/kg. In other embodiments, the treated geothermal brine composition has a potassium concentration of less than about 1000 mg/kg. In other embodiments, the treated geothermal brine composition has a potassium concentration of less than about 4000 mg/kg. In other embodiments, the treated geothermal brine composition has a potassium concentration of less than about 8500 mg/kg.

In other embodiments, the treated geothermal brine has a concentration of rubidium ranging from about 30 mg/kg to about 200 mg/kg. In other embodiments, the treated geothermal brine composition has a rubidium concentration of less than about 200 mg/kg. In other embodiments, the treated geothermal brine composition has a rubidium concentration of less than about 150 mg/kg. In other embodiments, the treated geothermal brine composition has a rubidium concentration of less than about 100 mg/kg. In other embodiments, the treated geothermal brine composition has a rubidium concentration of less than about 50 mg/kg.

In further embodiments, the treated geothermal brine has a concentration of silica ranging from about 0 mg/kg to about 15 mg/kg, a concentration of iron ranging from about 0 mg/kg to about 10 mg/kg, and a concentration of rubidium ranging from about 30 mg/kg to about 200 mg/kg.

Embodiments of the present invention yield treated brines with improved injectivity over untreated brines solutions. Injectivity is defined in terms of change in pressure over a given flow rate over time. Improvements in injectivity indicate that a brine is able to flow more freely over time, and thus will lead to less required cleanings of a well. One way to assess improved injectivity is through packed bed testing.

In another aspect, the invention provides a method for preventing silica scale in geothermal brine injection wells and improving injectivity of a treated aqueous brine solution by selectively removing silica and iron from a geothermal brine solution. The method includes obtaining a geothermal brine solution comprising silica and iron from a geothermal reservoir. The geothermal brine solution is then supplied to a silica management process to produce a reduced silica geothermal brine solution relative to the geothermal brine solution. The reduced silica geothermal brine solution is then supplied to an iron removal process to produce a treated aqueous brine solution relative to the reduced silica geothermal brine solution. The treated aqueous brine product solution is then injected into the geothermal reservoir. The treated brine also has a packed bed test result that yields an operation time at least 50% greater than an operation time of the geothermal brine solution.

In some embodiments, the step of supplying the geothermal brine solution to a silica management process and the step of supplying the reduced silica geothermal brine solution to an iron removal process are the same step. In other embodiments, the step of supplying the geothermal brine solution to a silica management process and the step of supplying the reduced silica geothermal brine solution to an iron removal process are different steps.

In further embodiments, the treated brine is further treated to remove lithium, potassium, rubidium, and/or cesium. In some embodiments, the process for removing lithium, potassium, rubidium, and/or cesium occurs after the geothermal brine is supplied to a silica management step. In some embodiments, the process for removing lithium, potassium, rubidium, and/or cesium occurs after the geothermal brine is supplied to a silica management step. In some embodiments, the process for removing potassium, rubidium, and/or cesium occurs after the geothermal brine is supplied to both a silica management step and an iron removal process.

In some embodiments, the treated brine has a packed bed test result that yields an operation time at least 100% greater than an operation time of the geothermal brine solution. In some embodiments, the treated brine has a packed bed test result that yields an operation time at least 200% greater than an operation time of the geothermal brine solution. In some embodiments, the treated brine has a packed bed test result that yields an operation time at least 300% greater than an operation time of the geothermal brine solution.

In another aspect, the invention provides a method for preventing silica scale in geothermal brine injection wells and improving injectivity of a treated brine by selectively removing silica and iron from a geothermal brine solution. The method includes obtaining a geothermal brine solution comprising silica and iron from a geothermal reservoir. The geothermal brine solution is supplied to a silica management process to produce a reduced silica geothermal brine solution relative to the geothermal brine solution. The reduced silica geothermal brine solution is supplied to an iron removal process to produce a treated brine. The treated brine is then injected into the geothermal reservoir. Additionally, the treated brine has a TSS of less than about 60 ppm.

In some embodiments, the treated brine has a TSS of less than about 55 ppm. In some embodiments, the treated brine has a TSS of less than about 50 ppm. In some embodiments, the treated brine has a TSS of less than about 45 ppm. In some embodiments, the treated brine has a TSS of less than about 40 ppm. In some embodiments, the treated brine has a TSS of less than about 35 ppm.

In some embodiments, the treated brine has a TSS of less than about 30 ppm. In some embodiments, the treated brine has a TSS of less than about 25 ppm. In some embodiments, the treated brine has a TSS of less than about 20 ppm. In some embodiments, the treated brine has a TSS of less than about 15 ppm. In some embodiments, the treated brine has a TSS of less than about 10 ppm.

In another aspect, the invention provides a method for generating energy from a geothermal brine solution and improving injectivity of a treated aqueous brine solution by selectively removing silica and iron from a geothermal brine solution used for energy production. The method includes obtaining a geothermal brine solution comprising silica and iron from a geothermal reservoir. The geothermal brine solution is then flashed to produce and recover heat and energy therefrom and to produce a spent geothermal brine solution. The spent geothermal brine solution is then supplied to a silica management process to produce a reduced silica geothermal brine solution relative to the spent geothermal brine solution. The reduced silica geothermal brine solution is then supplied to an iron removal process to produce a treated aqueous brine solution relative to the reduced silica geothermal brine solution. The treated aqueous brine product solution is then injected into the geothermal reservoir. Additionally, the treated brine has a TSS of less than about 60 ppm.

In some embodiments, the step of supplying the geothermal brine solution to a silica management process and the step of supplying the reduced silica geothermal brine solution to an iron removal process are the same step. In other embodiments, the step of supplying the geothermal brine solution to a silica management process and the step of supplying the reduced silica geothermal brine solution to an iron removal process are different steps.

In further embodiments, the treated brine is further treated to remove lithium, potassium, rubidium, and/or cesium. In some embodiments, the process for removing lithium, potassium, rubidium, and/or cesium occurs after the geothermal brine is supplied to a silica management step. In some embodiments, the process for removing lithium, potassium, rubidium, and/or cesium occurs after the geothermal brine is supplied to a silica management step. In some embodiments, the process for removing potassium, rubidium, and/or cesium occurs after the geothermal brine is supplied to both a silica management step and an iron removal process.

In some embodiments, the treated brine has a TSS of less than about 55 ppm. In some embodiments, the treated brine has a TSS of less than about 50 ppm. In some embodiments, the treated brine has a TSS of less than about 45 ppm. In some embodiments, the treated brine has a TSS of less than about 40 ppm. In some embodiments, the treated brine has a TSS of less than about 35 ppm. In some embodiments, the treated brine has a TSS of less than about 30 ppm. In some embodiments, the treated brine has a TSS of less than about 25 ppm. In some embodiments, the treated brine has a TSS of less than about 20 ppm. In some embodiments, the treated brine has a TSS of less than about 15 ppm. In some embodiments, the treated brine has a TSS of less than about 10 ppm.

In another aspect, the invention provides a treated geothermal brine composition having a pH of about 4.0 to about 6.0 that has less than about 20 ppm by weight of silica, less than about 20 ppm by weight of iron, and further wherein the treated geothermal brine composition has TSS of less than about 30 ppm. In some embodiments, the treated geothermal brine composition has a TSS of less than about 25 ppm. In some embodiments, the treated geothermal brine composition has a TSS of less than about 20 ppm. In some embodiments, the treated geothermal brine composition has a. TSS of less than about 15 ppm. In some embodiments, the treated geothermal brine composition has a TSS of less than about 10 ppm.

Packed Bed Testing

The objective of packed bed testing is to simulate injectivity of brine solutions. This entails pumping a brine solution through a material that simulates the region where the brine is to be injected. Incompatibility is primarily manifested as a shorter run time to reach a 1000 maximum psi, due to generation of suspended solids and scales that cause an increase in pressure across the packed bed.

In general, the packed beds should be selected such that granulated materials, such as rock chips, may be packed within the inner region, and such that the flow of brine may be allowed continuously over the granulated materials under pressures up to at least 1000 psig and temperatures ranging from about 80 to 110° C. The primary response factor for the packed bed testing is the time period, or operation time, that the brine is able to be pumped through the packed bed, until scaling and blockage cause the head pressure to reach 1000 psi. Long-term permeable flow is desired, so the longer the packed bed unit runs, the better the potential outcome of the brine for injecting into a reservoir. In some embodiments, the brine can be injected into the reservoir from which it was obtained (also sometimes referred to as "reinjecting"). In some embodiments, the brine can be injected into a different reservoir than the one from which it was obtained.

In some embodiments, the beds are packed with screened drilling rock chips from the well hydrothermal zone (e.g., from the well into which the brine will be injected). In some embodiments, the rock chips may be primarily of two types: 1) hydrothermally-crystallized fine-grained granitic material composed of quartz and feldspar, and 2) silica-bonded meta-siltstone. In some embodiments, the packed beds may be a combination of the two types of rock chips. In other embodiments, the packed beds may be primarily of a single type of rock chip. In some embodiments, the packing material is uniform in size.

In order to yield appropriate comparisons, the same type of material and packing should be used in both packed bed tests (i.e., for the treated and untreated brine) for the comparative testing. The packed beds will have brine pumped through them until the pressure reaches about 1000 psig at 1 LPM brine flow. Thus, the materials for the packed beds should be selected from materials that will allow for such pressures and temperatures ranging from about 80 to 110° C. By comparing the packed bed tests of a treated and an untreated brine, one can assess whether the treatment process used has improved injectivity and reduced scaling. If a treated brine has a longer operation time, or the time to reach 1000 psi, then the treated brine will have improved injectivity. In some embodiments, the treated brine has an operation time at least about 50% greater than the operation time of the untreated brine solution. In some embodiments, the treated brine has an operation time at least about 100% greater than the operation time of the untreated brine solution. In some embodiments, the treated brine has an operation time at least about 150% greater than the operation time of the untreated brine solution. In some embodiments, the treated brine has an operation time at least about 200% greater than the operation time of the untreated brine solution. In some embodiments, the treated brine has an operation time at least about 250% greater than the operation time of the untreated brine solution. In some embodiments, the treated brine has an operation time at least about 300% greater than the operation time of the untreated brine solution.

TSS is also an important parameter for assessing brines. TSS can indicate whether brines may have minerals that could precipitate solids and generate suspended solids, contributing to scaling and plugging. In some embodiments, the TSS of the treated brine will be less than about 60 ppm. In some embodiments, the TSS of the treated brine will be less than about 30 ppm. In some embodiments, the TSS of the treated brine will be less than about 25 ppm. In some embodiments, the TSS of the treated brine will be less than about 20 ppm. In some embodiments, the TSS of the treated brine will be less than about 15 ppm. In some embodiments, the TSS of the treated brine will be less than about 10 ppm.

Broadly, also described herein are methods for the selective removal of silica and silicates (typically reported as silicon dioxide ($SiO_2$)) from solution. Methods for the removal of silica are commonly known as silica management. As used herein, the selective removal of silica generally refers to methods to facilitate the removal of silica from solutions, such as geothermal brines, Smackover brines, synthetic brines, and other brines resulting from oil and gas production without the simultaneous removal of other ions. In certain embodiments, silica is preferably selectively removed such that the silica can be further refined or supplied to an associated process, without the need for extensive purification thereof. In some embodiments, the brines are brines from which energy has already been extracted. For instance, brines from which a power plant has already extracted energy through methods such as flashing. Broadly described, in certain embodiments, the methods described herein employ chemical means for the separation of silica. The removal of silica from solutions, such as geothermal brines, can prevent, reduce or delay scale formation as silica present in brines can form scale deposits. It is known that scale deposit formation is a common problem with geothermal brines and therefore the methods described herein for the selective removal of silica can be utilized to prevent scale formation in geothermal power equipment and also improve injectivity of treated brines in reservoirs. Additionally, the removal of silica from solutions, such as geothermal brines, also facilitates the subsequent recovery of various metals from the solution, such as lithium, manganese, zinc, as well as boron, cesium, potassium, rubidium, and silver. It is understood that the recovery of valuable metals from a geothermal brine depends upon the concentration of a metal in the brine, and the economics of the recovery thereof which can vary widely among brines. The prevention, reduction, and/or delay of scale production in geothermal wells and geothermal power plant equipment can result in increased geothermal energy production by improving the equipment lifetime and reducing the frequency of equipment maintenance, as well as increase or prolong well permeability.

Typically, in geothermal power plants, heat is recovered from a geothermal brine through the use of one or more flash tanks. In certain embodiments, a silica precipitate seed can be supplied to the geothermal brine prior to the brine being supplied to the flash tanks to remove at least a portion of the silica present. In other embodiments, the post-flash geothermal brine from a geothermal plant is then fed through the silica management and iron removal steps. In certain embodiments, the silica precipitate seed can result in the removal of up to 25% of the silica present in the brine, alternatively up to about 40% of the silica present in the brine, alternatively up to about 50% of the silica present in the brine, alternatively up to about 60% of the silica present in the brine, or alternatively greater than about 60% of the silica present in the brine. In certain embodiments, the silica precipitate seed can reduce the silica concentration of the brine to less than about 200 ppm, alternatively less than about 175 ppm, alternatively less than about 160 ppm, alternatively less than about 145 ppm.

The geothermal brine supplied to the flash tanks is typically supplied at a temperature of at least about 250° C., alternatively at least about 300° C. After flashing of the geothermal brine and the recovery of significant heat and energy therefrom, the geothermal brine can be supplied to a silica management process (as further described herein) for the removal of additional silica. As noted previously, the removal of silica, can prevent, reduce, or delay the buildup of scale, thereby increasing the lifetime of the equipment and improving injectivity of the treated brine. Typically, the temperature of the brine has been reduced to less than about 150° C. before it is supplied to one of the silica removal processes described herein, alternatively less than about 125° C., alternatively less than about 120° C., alternatively less than about 115° C., alternatively less than about 110° C., alternatively less than about 105° C., or alternatively less than about 100° C.

While the removal of silica from geothermal brines in geothermal power plants is useful for reducing scale buildup in the power plant, supplying the brine to one or more of the silica removal processes described herein also has the effect of reducing the injection temperature of the brine to less than about 100° C., alternatively less than about 90° C., alternatively less than about 80° C., alternatively less than about 75° C.

As described herein, the selective silica recovery of the present invention can include the use of activated alumina, aluminum salts (such as $AlCl_3$), or iron (III) oxyhydroxides.

In certain embodiments of the present invention, the brine or silica containing solution can first be filtered or treated to remove solids present prior to the selective recovery and removal of silica.

Simulated brines can be prepared to mimic naturally occurring brines. As described herein, a simulated brine can be prepared to mimic the brine composition of various test wells found in the Salton Sea geothermal fields (Calif., U.S.). Generally, the simulated brine is an aqueous solution having a composition of about 260 ppm lithium, 63,000 ppm sodium, 20,100 ppm potassium, 33,000 ppm calcium, 130 ppm strontium, 700 ppm zinc, 1700 ppm iron, 450 ppm boron, 54 ppm sulfate, 3 ppm fluoride, 450 ppm ammonium ion, 180 ppm barium, 160 ppm silicon dioxide, and 181,000 ppm chloride. Additional elements, such as manganese, aluminum, antimony, chromium, cobalt, copper, lead, arsenic, mercury, molybdenum, nickel, silver, thallium, and vanadium, may also be present in the brine. It is understood, however, that the methods described herein can be used to remove silica from brines and other silica containing solutions having silica concentrations greater than about 160 ppm. In certain embodiments, the brine or silica containing solution can have a silica concentration of greater than about 400 ppm, greater than about 500 ppm, or greater than about 600 ppm. In certain instances, geothermal brines can have silica concentrations of between about 400 and 600 ppm.

Selective Silica Recovery by Precipitation with Aluminum Salts

The addition of aluminum salts, such as $AlCl_3$, to brine at a pH of between about 4 and 6, results in the formation of charged polymers, such as $Al_{13}O_4(OH)_{24}^{7+}$. These charged polymers are highly reactive with respect to silica, resulting in the formation of amorphous aluminosilicate precipitates, which can be removed by filtration. In certain embodiments, any silica present in the brine will react with the positively charged polymer to form an amorphous aluminosilicate precipitate, thereby reducing the silica concentration of the brine. In certain embodiments, the brine can be seeded with an aluminosilicate precipitate, which allows the silica to attach to the seed material, thereby allowing the silica and aluminum polymer to be removed by conventional filtration or clarification processes. Typically, the aluminum polymers do not react with other components in the brine, such as lithium or iron, and thus they stay in solution while the silica forms the precipitate.

Silica can be selectively recovered from silica containing solutions (including brines) by contacting them with aluminum salts, particularly aluminum halides, such as chlorides and bromides and maintaining a pH of between about 4 and 6, preferably between about 4.5 and 5.5, more preferably between about 4.75 and 5.25, and even more preferably between about 4.85 and 5.15. Generally, the brine solution, as prepared, has a measured pH of between about 5.1 and 5.3, which is comparable to the brines of the Salton Sea, which typically have a measured pH of between about 4.9 and 5.1. Aluminum salt is added in a molar ratio of aluminum salt to silica of at least about 0.25:1, preferably at least about 0.5:1, and more preferably at least about 1:1. In certain embodiments, the aluminum salt to silica ratio is between about 0.5:1 and 2:1. Optionally, the solution can be maintained at elevated temperatures. In certain embodiments, the solution can be at a temperature greater than about 50° C., more preferably at least about 75° C., and even more preferably at least about 90° C. Optionally, the silica containing solution is seeded with between about 0.1 and 10% by weight of an amorphous aluminosilicate solid. In certain embodiments, the solution is seeded with between about 1 and 2% by weight of the amorphous aluminosilicate solid. In certain other embodiments, the solution is seeded with between about 1.25 and 1.75% by weight of the amorphous aluminosilicate solid.

The addition of, for example, aluminum chloride to an aqueous silica solution, such as brine, typically lowers the pH (i.e., acidifies) of the silica containing solution as the addition results in the production of aluminum hydroxide and hydrochloric acid. Typically, the pH is monitored during the process to maintain the solution at a constant pH. In certain embodiments, a base (for example, but not limited to, sodium hydroxide, calcium hydroxide, and the like) can be added to the silica containing solution to maintain the pH of the solution between about 4 and 6 alternatively, between about 4.5 and 5.5, and preferably at or about 5.

In certain embodiments, the addition rate of the base is near stoichiometric. In certain embodiments, the equipment can be designed to include control equipment to add the base in a controlled process so that at least a stoichiometric amount of base is added to the solution, based upon the amount of silica and $AlCl_3$ present in solution.

In certain embodiments, the amorphous aluminosilicate solid used as the seed material is prepared in a laboratory setting. Aluminum salt can be added to a concentrated sodium silicate solution that may optionally be heated, neutralized to a pH of between about 4 and 6, and stirred to form a precipitate. The precipitate is collected, washed, and dried.

Precipitation of the amorphous aluminosilicate with an aluminum salt is capable of removing at least 75% of the silica present in the silica containing solution, preferably at least about 90%, and even more preferably at least about 95% of the silica present in the silica containing solution. In certain embodiments, precipitation of silica from a silica containing solution with an aluminum salt results in a total silica concentration in the resulting solution of less than about 15 ppm, preferably less than about 10 ppm, and even more preferably less than about 5 ppm.

In one embodiment, the resulting amorphous aluminosilicate precipitate is removed from the solution by filtration, dried, and recycled as seed material for subsequent precipitation of silica. In other embodiments, the aluminosilicate precipitate is supplied to a subsequent process for recovery of silica and/or aluminum.

In certain embodiments, contacting the silica containing solution with an aluminum halide at a pH of between 4 and 6 results in the formation of a gel, which can be subsequently separated from the remaining aqueous solution by filtration, which can be aided by the use of a centrifuge.

In certain embodiments, precipitation occurs by adding a seed containing solution to the brine, contacting the mixture with aluminum chloride, and then contacting the resulting mixture with a base, such as limestone, NaOH or $Ca(OH)_2$. In other embodiments, the brine is contacted with $AlCl_3$, and the resulting mixture is contacted with a base. In yet other embodiments, the brine is contacted with $AlCl_3$, the mixture is then contacted with a seed containing solution, and the resulting mixture is then contacted with a base. Finally, in certain embodiments, the brine is first contacted with $AlCl_3$, then contacted with a base, and then the resulting mixture is contacted with a seed containing solution.

Referring now to FIG. 1, apparatus 100 for the removal of silica from a silica containing brine is provided. Water is provided via line 102. First water stream 102 is supplied to first mixer 106, where the water is mixed with base 104, for example NaOH (caustic soda) or $Ca(OH)_2$ (staked lime) or limestone to produce aqueous base stream 108. First mixer 106 can include any known means for mixing the base and water to form a homogeneous stream. Second water stream 102" is supplied to second mixer 112 where the water is combined with flocculant 110 to produce mixed flocculant stream 114. Exemplary flocculants include, but are not limited to, Magnafloc 351, Nalco 9907, 9911, 9913, 8181, 7193, 8170, and the like.

Brine 116 is supplied to third mixer 120 where it is combined with aluminum chloride ($AlCl_3$) containing stream 118 to produce mixed brine stream 122. Aqueous base stream 108 is combined with mixed brine stream 122 in fourth mixer 124 to produce basic brine stream 126. Basic brine stream 126 is supplied to fifth mixer 128 where it is combined and intimately mixed with mixed flocculant stream 114 to coagulate at least a portion of the silica present in brine stream 126 as an aluminosilicate solid. Mixed stream 130 with a reduced silica brine and solids is supplied to clarifier 132 to produce reduced silica brine stream 134 and slurry stream 136, which can include aluminosilicate precipitate. Clarifier 132 can be a settling tank or like device that can be utilized for the separation of a liquid stream from a slurry. Slurry stream 136 can be supplied to filter 138, which separates the slurry into a solid aluminosilicate precipitate, which can be removed via solid removal line 140, and a precipitate removed treated brine stream 142. Precipitate removed treated brine stream 142 can then be recombined with reduced silica brine stream 134.

Fifth mixer 128 can include multiple stages. In one embodiment, fifth mixer 128 includes three reactor stages wherein the first reactor stage includes a mixer to facilitate intimate mixing of the brine, and the aluminum salt, to produce a solid aluminosilicate solid. The second reactor stage can include means for introducing the base, such as NaOH or $Ca(OH)_2$ to the reaction mixture. The second reactor stage can optionally include means for determining the pH of the solution, and control means, such as automated valves, operable to control the addition of the base to the solution to maintain a desired predetermined pH. In certain embodiments, the second reactor stage can include means for adding an aluminum salt to the solution. The third reactor stage can include means for stabilizing the pH of the solution, and means for supplying a buffer to the solution. In certain embodiments, the third reactor stage can include means for adding an aluminum salt to the solution.

Clarifier 132 can be a vessel and can include valves and lines configured to facilitate the removal of an aluminosilicate slurry from the bottom of the vessel and a low silica concentration brine stream from a position at the midpoint or top of the vessel. In certain embodiments, fifth mixer 128 or clarifier 132 can include a line for supplying a portion of the aluminosilicate precipitate to the basic brine stream 108 as seed. In certain embodiments, fifth mixer 128 can include a line for supplying a low silica concentration brine stream to brine stream 116.

The mixers used herein can each separately be a series of continuously stirred reactors. In certain embodiments, fourth mixer 124 can include at least one pH meter, wherein the feed of the aqueous base stream 108 and brine stream 112 are regulated to maintain a desired pH.

Selective Silica Recovery by Precipitation with Iron

In one embodiment, silica can be removed from a brine by contacting the brine with iron (III) hydroxide at a pH of between about 4.5 and 6, preferably between about 4.75 and 5.5, more preferably between about 4.9 and 5.3.

A synthetic brine can be prepared having the approximate composition provided herein for the simulated Salton Sea reservoir, and further including about 1880 ppm manganese.

In certain embodiments, the brine will have an iron (II) salt, such as iron (II) chloride, naturally present in a concentration, for example, of greater than about 1000 ppm. In other embodiments, an iron (II) salt or iron (III) hydroxide can be added to the brine to achieve a certain concentration of iron (II) salt or iron (III) hydroxide relative to the silica or silicon containing compounds present in the brine. In certain embodiments, the molar ratio of the iron (II) salt or iron (III) hydroxide to silica is at least about 1:1, preferably at least about 4:1, more preferably at least about 7:1 and even more preferably at least about 10:1.

When the iron in the brine or silica containing solution is iron (II), for example iron (II) chloride, an oxidant can be added to oxidize iron (II) salt to iron (Ill) hydroxide. Exemplary oxidants include hypohalite compounds, such as hypochlorite, hydrogen peroxide (in the presence of an acid), air, halogens, chlorine dioxide, chlorite, chlorate, perchlorate and other analogous halogen compounds, permanganate salts, chromium compounds, such as chromic and dichromic acids, chromium trioxide, pyridinium chlorochromate (PCC), chromate and dichromate compounds, sulfoxides, persulfuric acid, nitric acid, ozone, and the like. While it is understood that many different oxidants can be used for the oxidation of iron (II) to iron (III), in an embodiment, oxygen or air is used as the oxidant and lime or a like base is used to adjust and maintain the pH to a range of between about 4 and 7. This pH range is selective for the oxidation of the iron (II) salt to iron (III) hydroxide, and generally does not result in the co-precipitation or co-oxidation of other elements or compounds present in the brine. In one embodiment, the iron JO salt can be oxidized to iron (III) by sparging the reaction vessel with air. Air can be added at a rate of at least about 10 cfm per 300 L vessel, preferably between about 10 and 50 cfm per 300 L vessel. A person of skill in the art will recognize that the cfm rate can be adjusted based on specific operation parameters. It will be recognized by those skilled in the art that iron (III) hydroxide may also have a significant affinity for arsenic (III) and (V) oxyanions, and these anions, if present in the brine, may be co-deposited with the silica on the iron (III) hydroxide. Thus, in these embodiments, steps may have to be employed to remove arsenic from the brine prior to silica management.

In another embodiment, iron (III) hydroxide can be produced by adding a solution of iron (III) chloride to the brine, which upon contact with the more neutral brine solution, will precipitate as iron (III) hydroxide. The resulting brine may require subsequent neutralization with a base to initiate precipitation of the silica. In certain embodiments, iron (III) hydroxide can be contacted with lime to form insoluble ferric hydroxide solids, which can be adsorbed with silica.

The iron (III) hydroxide contacts the silica present in the brine to form a precipitate. Without being bound to any specific theory, it is believed that the silica, or silicon-containing compound attaches to the iron (III) hydroxide. In certain embodiments, the ratio of iron (III) hydroxide to silica is at least about 1:1, more preferably at least about 4:1, more preferably at least about 7:1. In other embodiments, the iron (III) hydroxide is present in a molar excess relative to the silica. The reaction of the iron (III) hydroxide with silica, is capable of removing at least about 80% of the silica present, preferably at least about 90% of the silica present, and more preferably at least about 95% of the silica present, and typically depends upon the amount of iron (III) hydroxide present in the solution.

In certain embodiments, the pH is monitored continually during the reaction of iron (III) with silica and an acid or a base is added, as needed, to maintain the pH the desired level, for example, between about 4.9 and 5.3. In alternate embodiments, a pH of between about 5.1 and 5.25 is maintained. In certain embodiments, a pH of about 5.2 is maintained.

In certain embodiments, the iron (II) salt containing solution is sparged with air for a period of at least about 5 minutes, alternately at least about 10 minutes, alternately at least about 15 minutes, and preferably at least about 30 minutes, followed by the addition of a base, such as calcium oxide, calcium hydroxide, sodium hydroxide, or the like, to achieve the desired pH for the solution. In certain embodiments, the base can be added as an aqueous solution, such as a solution containing between about 10 and 30% solids by weight.

In certain embodiments, a flocculant, such as the Magnafloc® products from Ciba®, for example Magnafloc 351, or a similar flocculant can be added in the clarification step. The flocculant can be added in an aqueous solution in amounts between about 0.005% by weight and about 1% by weight. The flocculant can be added at a rate of at least 0.001 gpm, preferably between about 0.001 and 1 gpm, based upon a 300 L vessel. A person of skill in the art will recognize that the gpm can be adjusted based on specific operation parameters. In certain embodiments, the flocculant is a non-ionic flocculant. In other embodiments, the flocculant is a cationic flocculant. In certain embodiments, it is believed that non-ionic and cationic flocculants may be useful for use with iron precipitates. In certain embodiments, Cytec Superfloc-N flocculants, such as the N-100, N-100 S, N-300, C-100, C-110, C-521, C-573, C-577 and C581 may be used for the recovery of iron and silica precipitates, according to the present invention. In other embodiments, flocculant products from Nalco, such as CAT-Floc, MaxiFloc, Nalco 98DF063, Nalco 1317 Liquid, Nalco 97ND048, Nalco 9907 Flocculant, Nalco 73281, and Nalco 9355 may be used with the present invention.

In certain embodiments, a flocculant can be added to the brine, in addition to the base, to facilitate the production of larger solids for easier solid/liquid separation. In certain embodiments, iron (III) silicate solids can be added to the solution to increase the rate of precipitation of silicates.

Figure 2:
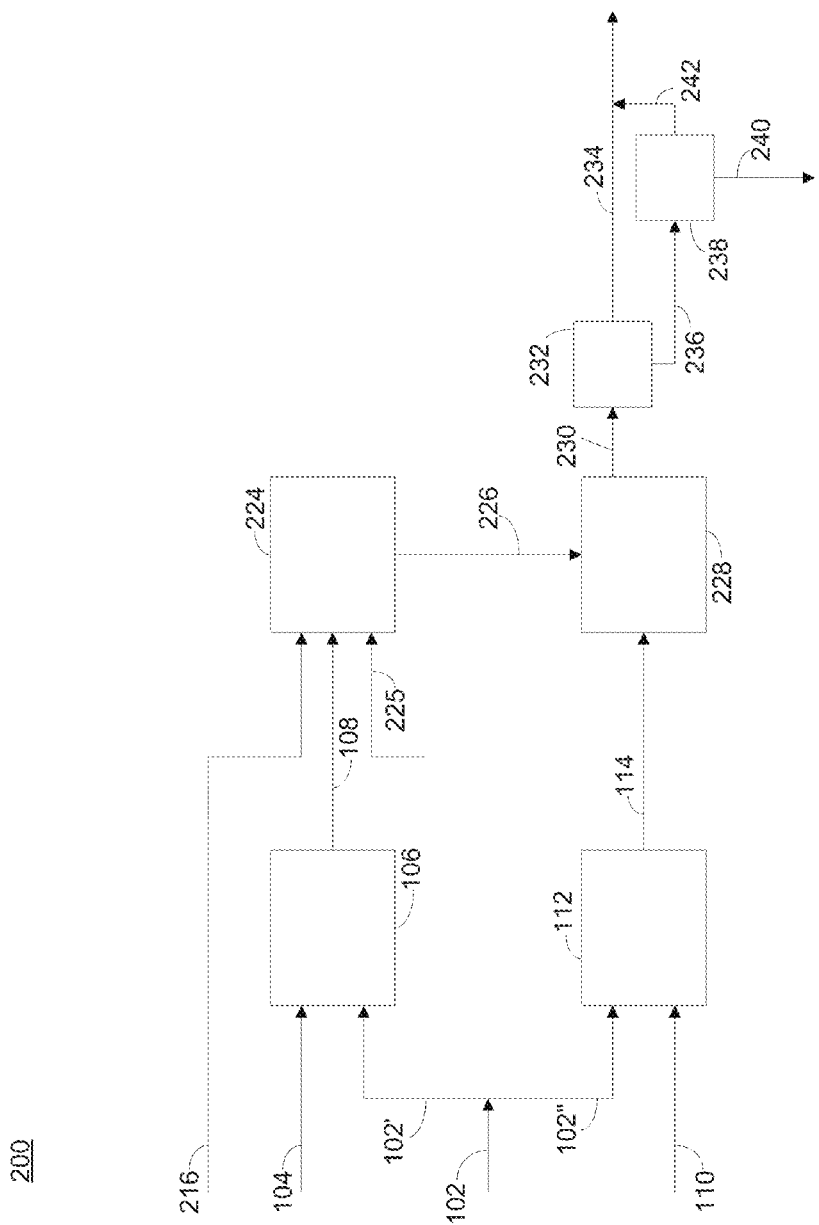
FIG. 2 is an illustration of an apparatus for the removal of silica from a silica containing brine according to an embodiment of the present invention.

Referring now to FIG. 2, apparatus 200 for the removal of silica from a silica containing brine is provided. Water is provided via line 102. First water stream 102 is supplied to first mixer 106, where the water is mixed with base 104, for example NaOH (caustic soda) or Ca(OH)$_2$ (slaked lime), to produce aqueous base stream 108. First mixer 106 can include any known means for mixing the base and water to form a homogeneous stream. Second water stream 102" is supplied to second mixer 112 where the water is combined with flocculant 110 to produce mixed flocculant stream 114.

Brine 216 is supplied to third mixer 224 where it is combined with aqueous base stream 108 and air 225 to produce mixed brine stream 226, with iron-silica precipitates. Mixed brine stream 226 is supplied to fourth mixer 228 where it is combined and intimately mixed with mixed flocculant stream 114 to further encourage precipitation of at least a portion of the silica present in brine stream 226. Mixed stream 230 containing a reduced silica brine and solids is supplied to clarifier 232 to produce reduced silica brine stream 234 and slurry stream 236, which can include iron-silica precipitates. Clarifier 232 can be a settling tank or like device that can be utilized for the separation of a liquid stream from a slurry including a filter such as candle filters. Slurry stream 236 can be supplied to filter 238, which separates the slurry into a solid precipitate, which can be removed via solid removal line 240, and a treated brine stream 242. Solids removed via solid removal line 240 can optionally be separated from any remaining liquid by centrifugation. Precipitate removed treated brine stream 242 can then be recombined with reduced silica brine stream 234. Optionally, precipitate removed treated brine stream 242 can be recycled to third mixer 224, or alternatively can be combined with brine stream 226.

Fourth mixer 228 can include multiple stages. In an embodiment, fourth mixer 228 includes three reactor stages wherein the first reactor stage includes a mixer to facilitate intimate mixing of the brine and air. In some embodiments, sufficient air is supplied to the reactor to oxidize at least a portion of the iron (II) present to iron (III). The second reactor stage can include means for introducing the base, such as NaOH or $Ca(OH)_2$ to the reaction mixture. The second reactor stage can optionally include means for determining the pH of the solution, and control means, such as automated valves, operable to control the addition of the base to the solution to maintain a desired predetermined pH. In certain embodiments, the third reactor stage can include means for adding an aluminum salt to the solution. Optionally, apparatus 200 can include means for supplying air to the second and third reactor stages.

In certain embodiments, the brine is supplied to the first reactor stage at a pH of about 4.9 to 5.1 and a temperature of about 95-110° C. where it is contacted and sparged with air to produce certain iron (III) oxyhydroxides. Preferably, a sparging diffuser is utilized to facilitate contact between the air and iron (II) contained in the brine. At a temperature of greater than about 90° C., the of the first reactor stage is controlled such that the pH is at least about 2.5, but preferably in the range of 3.5 to 5.3. The pH is maintained by the addition of time or other base to the reactor to prevent the pH becoming too acidic, which would prevent further oxidation of the iron (II) to iron (III).

In certain embodiments, in the second reactor stage, the lime or other base is added white continuing to sparge air through the brine. This provokes precipitation of ferric ions as oxides, hydroxides, or oxyhydroxides. Additionally, silica and other metals are adsorbed on the surface of the iron oxyhydroxides. The metals that adsorb on the ferric oxyhydroxides include arsenic, antimony, lead, and barium. The pH of the second stage of the reactor is maintained such that the pH of no greater than about 6, alternatively not greater than about 5.4, preferably not above about 5.3, and more preferably not above about 5.2. Additional air can be fed to the second reactor stage through a sparger, such as an air diffuser, to facilitate the preparation and precipitation of iron (III) hydroxides adsorbed with silica.

In certain embodiments, the third reactor stage can serve as a buffer tank that is configured to maintain the pH of the solution at a pH of no greater than about 6, alternatively not greater than about 5.4, preferably not greater than about 5.3, and even more preferably at a pH of not greater than about 5.2. Optionally, the third reactor stage can include an air sparger, such as an air diffuser, to facilitate preparation and precipitation of iron (III) hydroxides adsorbed with silica.

Clarifier 232 can be a vessel and can include valves and lines configured to facilitate the removal of an iron-silica slurry from the bottom of the vessel and a reduced silica concentration brine stream from a position at the midpoint or top of the vessel. In certain embodiments, fourth mixer 228 or clarifier 232 can include a line for supplying a portion of the iron-silica precipitate to the basic brine stream 216 as seed. Alternatively, clarifier 232 can include one or more lines configured to deliver iron (III) hydroxide precipitate material adsorbed with silica to one or more of the first, second, or third reactor stages. In certain embodiments, fourth mixer 228 can include a line for supplying a reduced silica concentration brine stream to basic brine stream 216.

In certain embodiments, apparatus 200 can include control means for controlling the addition of base to third mixer 224. In alternate embodiments, apparatus 200 can include control means for controlling the addition of base to the second reactor stage.

In certain embodiments, brine stream 216 can be preconditioned by sparging the brine stream with air prior to supplying the brine to third mixer 224.

The mixers used herein can each separately be a series of continuously stirred reactors. In certain embodiments, third mixer 224 can include at least one pH meter, wherein the feed of the aqueous base stream 108 and brine stream 216 are regulated to maintain a desired pH.

In certain embodiments, precipitation of silica and iron hydroxide can be achieved by recycling precipitate from the clarifier 232 to third mixer 224, resulting in an increase of the size of ferrosilicate particles. Additional recycling can also be achieved by recycling the seeds from clarifier 232 to first mixer 106, where base 104 is mixed with some or all of the seeds to promote the formation of a densified seed, which can then be fed to third mixer 224. This recycling step can enhance the quality of the precipitate by increasing density of the precipitate, thus making the design of clarifier 232 smaller and simpler. It has also surprisingly been found that on the introduction of these solids to the reaction vessel a minor amount of the zinc and/or manganese is retained in the precipitate. In certain embodiments, when seeds are re-introduced into third mixer 224, there is no or minimal net loss of zinc and manganese that may be present in the brine, and the ability of the ferrosilicate precipitate to grow and capture silica is unimpaired.

The rate of the addition of the air, base, and flocculant is based upon the size of the reactor and the concentrations of iron and silica. Generally, the rates of addition of the components are proportional to the other components being added and the size of the reaction vessels. For example, to a geothermal brine having iron and silica present, which is supplied at a rate of about 6 gpm (gallons per minute) to a silica removal process having an overall capacity of about 900 gal., air can be added at a rate of about 100 cfm, a 20% solution of calcium oxide in water can be added at a rate of about 0.5 lb/min., and a 0.025% solution of Magnafloc 351 (flocculant) at a rate of about 0.01 gpm.

Selective Silica Recovery with Activated Alumina

Activated alumina is a known absorbent for silica. In certain embodiments, activated alumina is a mixture of $\gamma$-$Al_2O_3$ and AlO(OH) (boehmite). Specifically, activated alumina has been utilized in the removal of silica, from raw water, such as water that is fed to a boiler. Activated alumina has not been used for the removal of silica from brines, wherein the removal of the silica does not also result in the removal of other ions or compounds by the activated alumina. Methods have not been reported for the selective removal of silica from brines without concurrent removal of other ions or compounds.

Activated alumina is a known absorbent for organic and inorganic compounds in nonionic, cationic, and anionic forms. Indeed, activated alumina is a common filter media used in organic chemistry for the separation and purification of reaction products.

In another embodiment of the present invention, silica can be removed from a brine by contacting the brine with activated alumina at a pH of between about 4.5 and 7, alternatively between about 4.75 and 5.75, or in certain embodiments, between about 4.8 and 5.3. The activated alumina can have a BET surface area of between about 50 and 300 m²/g. In certain embodiments, the brine can be combined and stirred with activated alumina to selectively remove the silica. In alternate embodiments, the activated alumina can be added to the brine and stirred to selectively remove silica and silicon containing compounds. In certain embodiments, the pH of the brine can be maintained at between about 4.5 and 8.5, preferably between about 4.75 and 5.75, and more preferably between about 4.8 and 5.3, during the step of contacting the silica with the activated alumina. In certain embodiments, the pH can be maintained at between about 4.75 and 5.25. Alternatively, the pH can be maintained at between about 5.25 and 5.75. Alternatively, the pH can be maintained at between about 5.75 and about 6.25. A pH meter can be used to monitor the pH before, during, and after the contacting step. In certain embodiments, the pH is controlled by titrating the solution with a strong base, such as sodium hydroxide. In an exemplary embodiment, approximately 0.1M solution of sodium hydroxide is used to adjust the pH of the reaction, although it is understood that a base of higher or lower concentration can be employed.

Regeneration of the activated alumina can be achieved by first washing the alumina with a base, for example, a sodium hydroxide solution of at least about 0.01M, followed by the subsequent washing with an acid, for example, a hydrochloric acid solution of at least about 0.01M. In some embodiments, regeneration can be followed by treatment with a sodium fluoride solution having a pH of between about 4 and 5, to completely recover the capacity of the activated alumina. Optionally, the column can be rinsed with water, preferably between 1 and 5 volumes of water, prior to contacting with sodium hydroxide.

In certain embodiments, wherein the silica containing solution can be contacted with the activated alumina in a column, the solution exiting the column can be monitored to determine loading of the activated alumina.

Figure 3:
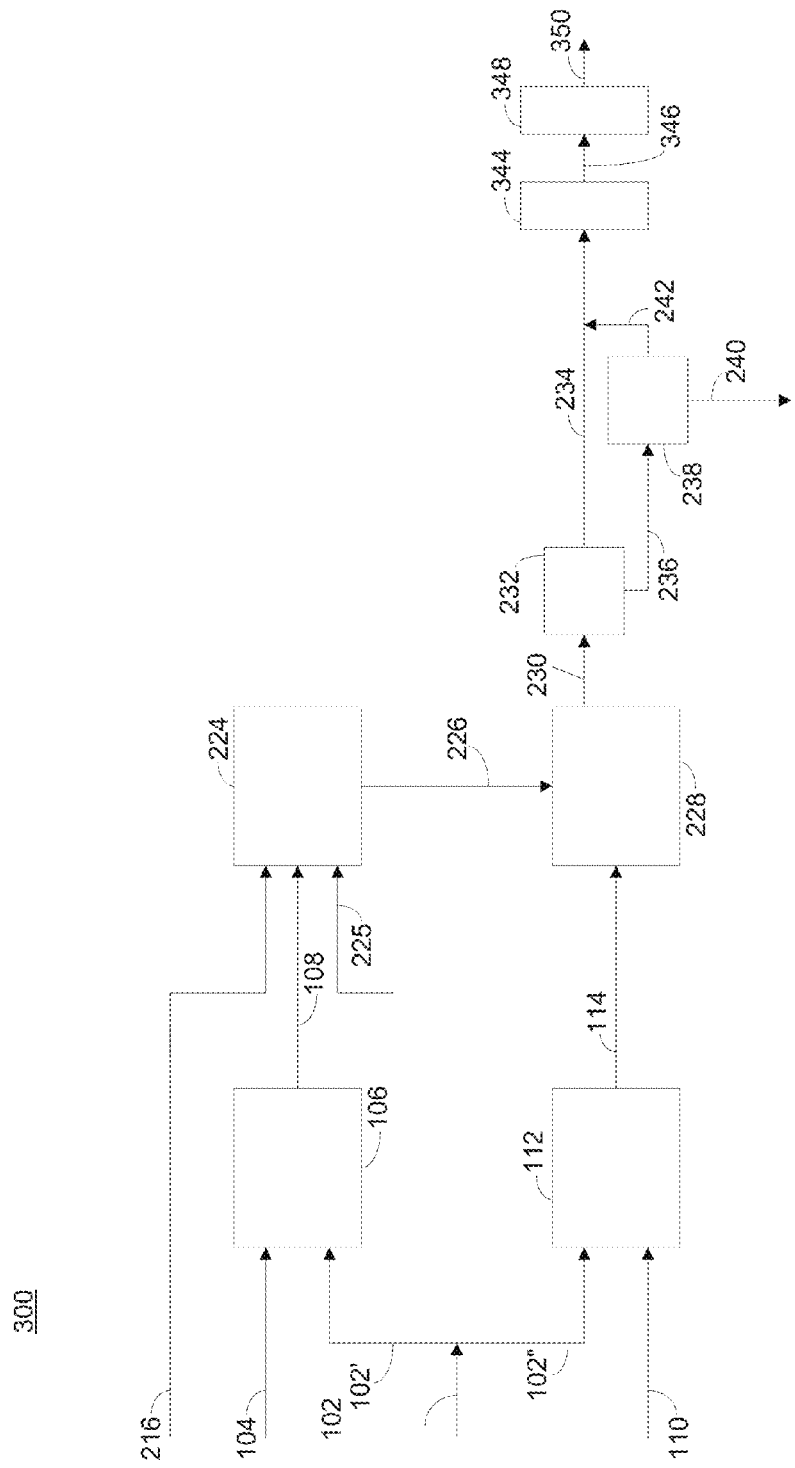
FIG. 3 is an illustration of an apparatus for the removal of silica, from a silica containing brine according to an embodiment of the present invention.

FIG. 3 details apparatus 300 and shows an embodiment that incorporates removal of silica by precipitation with iron, as shown in FIG. 2, followed by removal of any remaining silica by adsorption with activated alumina. Specifically, low silica brine stream 234 can be supplied to first adsorbent column 344, which is charged with activated alumina and is operable to remove at least a portion of the silica present in the low silica brine stream. Treated stream 346 is then supplied to a second adsorbent column 348, which is similarly charged with activated alumina and is operable to remove at least a portion of the silica present in the treated stream, to produce product stream 350, which has a silica content that is lower than that of the low silica brine stream 234. In embodiments wherein treated stream 346 includes a measurable concentration of silica, second adsorbent column 348 is operable to produce a product stream 350 having a lower silica concentration than that of the treated stream 346.

Figure 4:
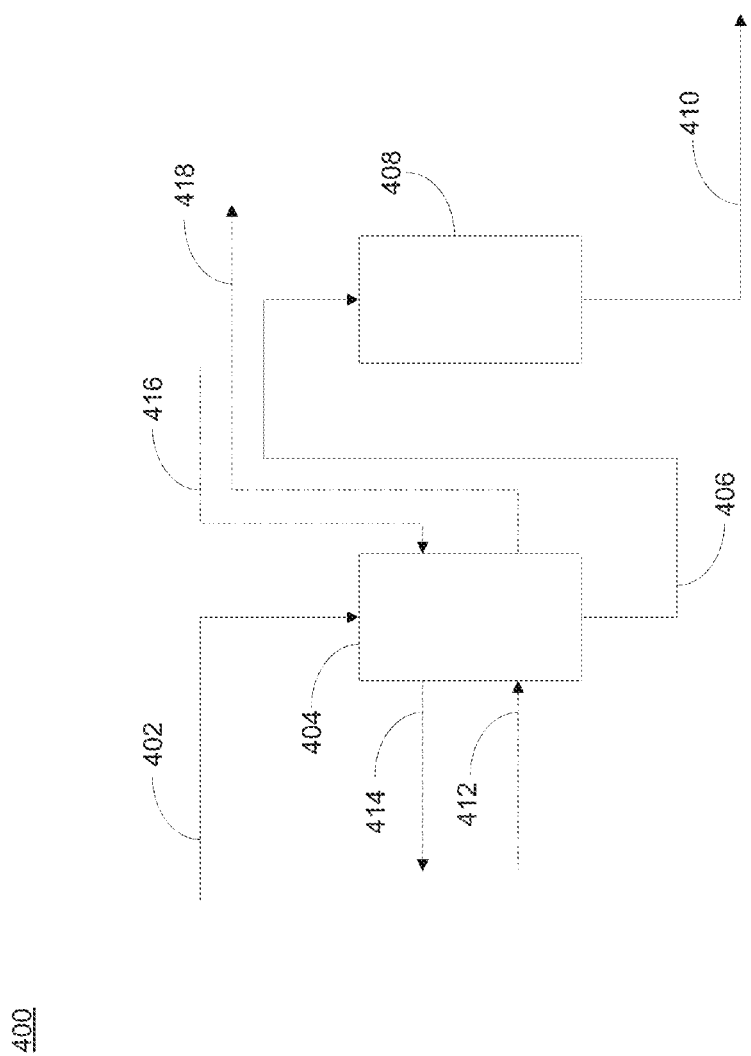
FIG. 4 is an illustration of an apparatus for the removal of silica from a silica containing brine according to an embodiment of the present invention.

Referring to FIG. 4, apparatus 400 for the removal of silica by adsorption with activated alumina is provided. A silica containing solution or silica containing brine is supplied via line 402 to first adsorbent column 404, which is charged with activated alumina and is operable to remove at least a portion of the silica present in the brine or other solution and produce treated stream 406 having a reduced silica content relative to that of the stream being fed through line 402. Treated stream 406 can then be supplied to a second adsorbent column 408, which can also be charged with an activated at alumina adsorbent that is operable to remove at least a portion of the silica present in treated stream 406 to produce a product stream 410 having a reduced silica content relative to the silica containing solution or silica containing brine supplied via line 402, and in certain embodiments, relative to treated stream 406.

In certain embodiments, regenerant solution 412 can be supplied to first adsorbent column 404. Regenerant solution 412 can be a strong base, and can be supplied to remove silica adsorbed onto the activated alumina. Waste stream 414 is configured to provide means for the removal of the regenerant solution and any silica removed from the activated alumina. Optionally, as noted above, a strong acid can be supplied to first adsorbent column 404 after the regenerant solution and/or a sodium fluoride solution can be supplied to the column. While FIG. 4 shows that regenerant solution 412 is supplied at the bottom of adsorbent column 404 and flows in a countercurrent flow, it is understood that the regenerant solution can also be supplied such that it flows in a co-current flow.

In certain embodiments, wash water 416, such as deionized water, can be supplied to adsorbent column 404 and a wash water waste stream 418 can be removed from the column. While the wash water is shown as being supplied in a co-current flow, it is understood that the wash water can be supplied in a counter-current flow.

In certain embodiments, apparatus 400 can include more than two adsorbent columns. In certain methods wherein three or more columns are included in the apparatus, only two adsorbent columns are utilized at any one time. When the activated alumina of one column begins to lose efficiency (i.e., when silica has become adsorbed to a or portion of the activated alumina such that the increasing amounts of silica are not removed by the column), that column can be removed from service and a third column can be employed. When the column is removed from service, it can be regenerated, as described above, and returned to service when the efficiency of the second column decreases, thereby indicating the adsorbent in the second column is losing effectiveness. In this manner, apparatus 400 can be run continuously as two columns and can be employed for the removal of silica while a third column is regenerated.

In certain embodiments, a brine, such as a geothermal brine, can be supplied to a process designed to remove a significant portion of silica, and optionally iron, present in the brine as a precursor step to the subsequent recovery of valuable components, such as potassium, rubidium, cesium, lithium, zinc, and manganese, and other elements. Exemplary methods for the reduction of the silica concentration include those described herein. The treated brine solution having a reduced silica concentration can then be supplied to an associated process that is designed to selectively remove one or more components from the treated brine. Optionally the process for the removal of silica can also include the removal of iron.

In certain embodiments, the treated brine can be supplied to a process designed to selectively remove and recover lithium. Certain methods for the recovery are known in the art, such as is described in U.S. Pat. Nos. 4,116,856, 4,116,858, 4,159,311, 4,221,767, 4,291,001, 4,347,327, 4,348,295, 4,348,296, 4,348,297, 4,376,100, 4,430,311, 4,461,714, 4,472,362, 4,540,509, 4,727,167, 5,389,349, 5,599,516, 6,017,500, 6,048,507, 6,280,693, 6,555,078, 8,287,829, 8,435,468, 8,574,519, and 8,637,428. Alternatively, methods can be employed utilizing a lithium aluminate intercalate/gibbsite composite material, a resin based lithium aluminate intercalate, and a granulated aluminate intercalate as described in U.S. Pat. No. 8,637,428 and U.S. patent application Ser. Nos. 12/945,519 and 13/283,311. Preferably, recovery of lithium occurs without the co-precipitation of other metals.

Figure 5:
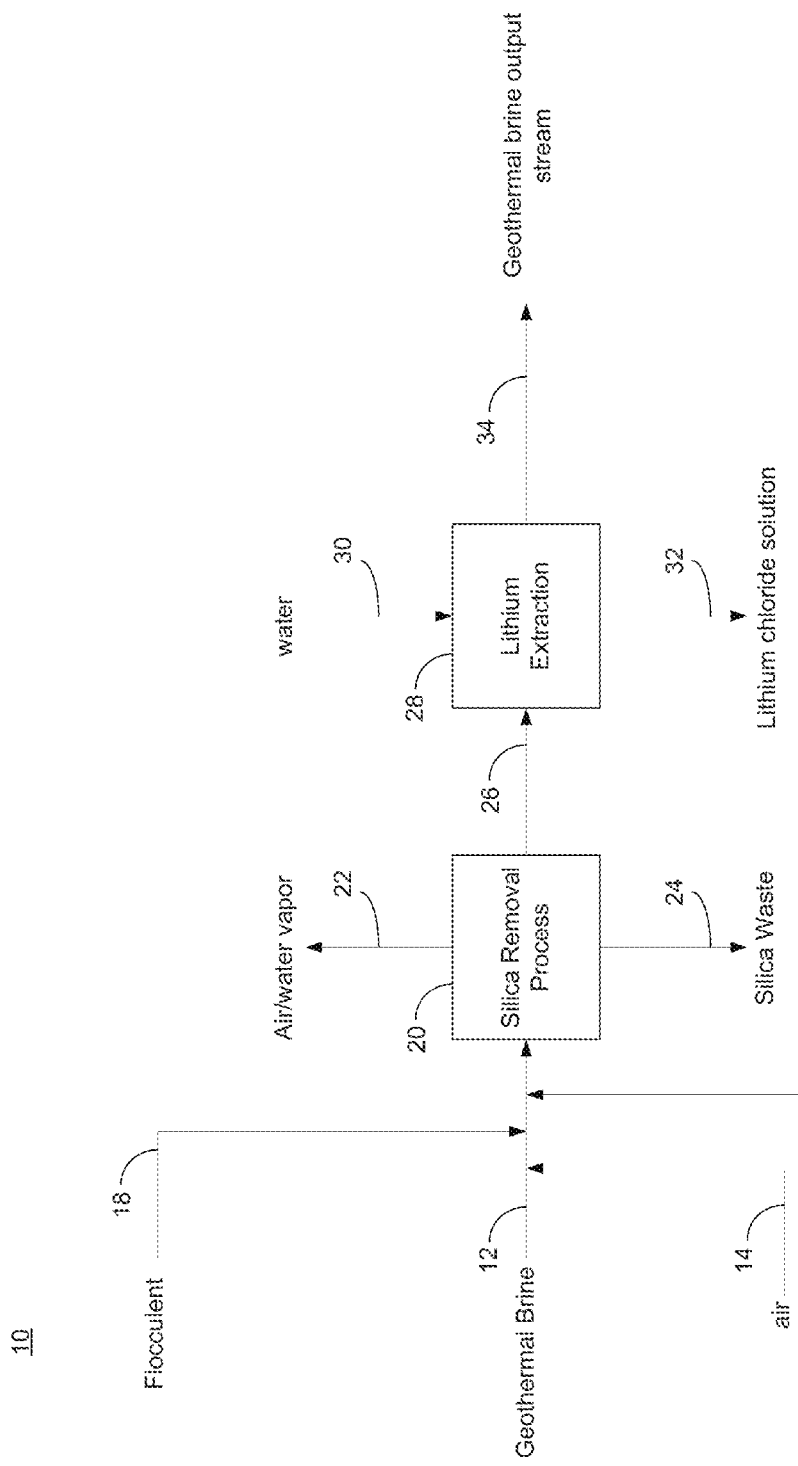
FIG. 5 is an illustration of a process for the removal of silica and iron from a geothermal brine, followed by the subsequent removal of lithium according to an embodiment of the present invention.

For example, as shown in FIG. 5, process 10 for the removal of silica and iron from brine, followed by the subsequent removal of lithium, is provided. In an exemplary embodiment, brine 12, having a silica concentration of at least about 100 ppm, an iron concentration of at least about 500 ppm, and a recoverable amount of lithium or other metal, is supplied with air 14, base stream 16, and flocculant stream 18 to a silica removal process 20.

Silica removal process 20 can produce brine solution 26 having a reduced concentration of silica, and optionally iron, compared to the initial brine, as well as a reaction by-product stream 24 that includes silica that was previously present in the geothermal brine. Additionally, air/water vapor are produced and removed via line 22.

The brine solution 26 having a reduced concentration of silica and iron can be supplied to a lithium recovery process 28. The lithium recovery process can include a column or other means for contacting the brine with a extraction material suitable for the extraction and subsequent recovery of lithium. In certain embodiments, the extraction material can be a lithium aluminate intercalate, an inorganic material with a layered crystal structure that is both highly selective for lithium and economically viable. Exemplary lithium intercalate materials can include a lithium aluminate intercalate/gibbsite composite material, a resin based lithium aluminate intercalate and a granulated lithium aluminate intercalate. The gibbsite composite can be a lithium aluminate intercalate that is grown onto an aluminum trihydrate core. The resin-based lithium aluminate intercalate can be formed within the pores of a macroreticular ion exchange resin. The granulated lithium aluminate intercalate can consist of fine-grained lithium aluminate intercalate produced by the incorporation of a small amount of inorganic polymer.

The process of contacting the lithium aluminate intercalate material with the brine is typically carried out a column that includes the extraction material. The brine flows into the column and lithium ions are captured on the extraction material, while the water and other ions pass through the column as geothermal brine output stream 34. After the column is saturated, the captured lithium is removed by flowing water supplied via line 30, wherein the water can include a small amount of lithium chloride present, through the column to produce lithium chloride stream 32. In some embodiments, multiple columns are employed for the capture of the lithium.

Figure 6:
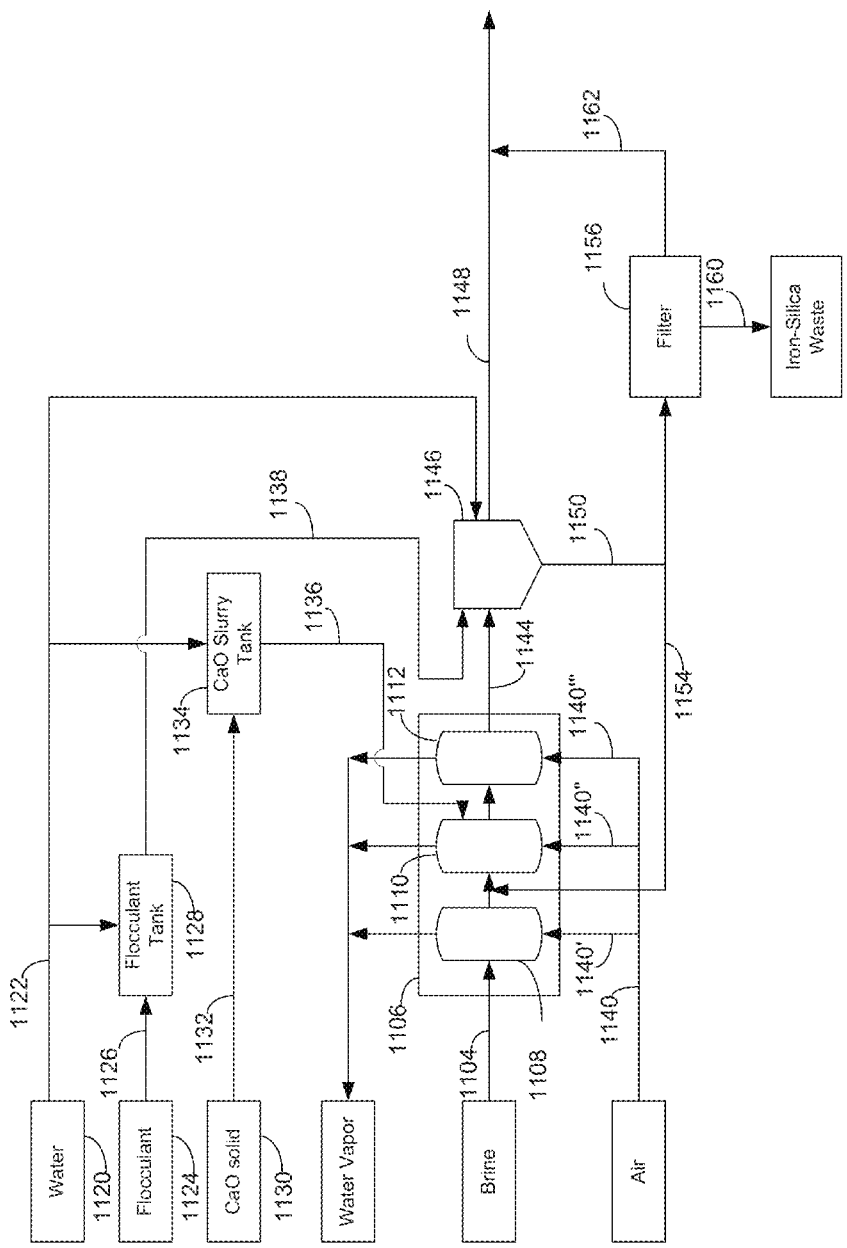
FIG. 6 is an illustration of a continuous process for the management of silica according to an embodiment of the present invention.

As shown in FIG. 6, a continuous process for the management of silica is provided. Silica management system 1106 includes three stirred vessels 1108, 1110, and 1112 provided in series. To first reactor 1108 is provided a geothermal brine via line 1104. In some embodiments, the geothermal brine has an iron content of approximately 1500 ppm and a silica content of about 160 ppm. The brine is added at a rate of about 6 ppm. Air is supplied via line 1140 to each reactor 1108, 1110, and 1112 and is sparged through the geothermal brine. In some embodiments, the air is supplied at a rate of about 100 cfm. In some embodiments, the brine supplied to each of the three reactors is maintained at a temperature of about 95° C.

An aqueous calcium oxide slurry is prepared by mixing solid calcium oxide proved from tank 1130 via line 1132 to vessel 1134, where the solid is mixed with water 1120 provided via line 1122. In some embodiments, the calcium oxide slurry includes between about 15 and 25% by weight, alternatively about 20% by weight, calcium oxide, and is supplied to second reactor 1110 at a rate on a wet basis of about 0.5 lb/min.

In silica management system 1106, brine is supplied to first vessel 1108 where the brine is sparged with air via line 1140'. The brine is then supplied from first vessel 1108 to second vessel 1110. The brine in second vessel 1110 is contacted with calcium oxide supplied via line 1136 and is again sparged with air supplied via line 1140". The brine is then supplied from second vessel 1110 to third vessel 1112 where it is again sparged with air supplied via line 1140'". In some embodiments, the air to the vessels is supplied at a constant rate. In further embodiments, the air to the vessels is supplied at a constant rate of about 100 cfm.

After the addition of the air via line 1140 to first reactor 1108, the pH drops, in some embodiments, the pH drops to between about 2.3 and 3.5. Air is added to second reactor 1110 via line 1140". In some embodiments, air is supplied at a rate of about 1100 cfm and a charge of approximately 15-25% by weight of an aqueous calcium oxide slurry at a rate of about 0.5 lb/min., which can raise the pH in the second reactor to between about 4.8 and 6.5, and preferably between about 5.0 and 5.5. The addition of calcium oxide slurry initiates the precipitation of iron (III) hydroxide and iron silicate. In some embodiments, to third reactor 1112, air is added via line 1140'" at a rate of about 100 cfm. Each of the three reactors includes means for stirring to ensure sufficient mixing of the brine, base, and air oxidant.

In some embodiments, the continuous addition of air and base to the reaction vessels results in the precipitation of the iron and silica at rates up to about 0.5 lb/min., depending upon the concentration of iron and silica in the geothermal brine.

The geothermal brine, which now includes precipitates of iron (III) hydroxide and iron silicate, is then supplied from third vessel 1112 to clarifier 1146 via line 1144. Water may be added to clarifier 1146 via line 1122. In some embodiments, an aqueous flocculant solution of Magnafloc 351, in a concentration between about 0.005% and 1% by weight, such as about 0.025% by weight, is prepared by supplying solid flocculant 1124 via line 1126 to flocculant tank 1128, where the solid is contacted with water 1120 supplied via line 1122. In further embodiments, the aqueous flocculant solution is supplied to clarifier vessel 1146 via line 1138 at a rate of about 0.01 gpm.

Two streams are produced from clarifier 1146. First clarifier product stream 1148 includes the geothermal brine having a reduced concentration of silica and iron, and may be supplied to a secondary process, such as lithium recovery. Second clarifier product stream 1150 includes solid silica-iron waste, as well as some geothermal brine. Stream 1150 can be supplied to filter process 1156 which serves to separate the solid silica-iron waste 1160 from the liquid brine 1162. Alternately, a portion stream 1160 can be resupplied (not shown) to second vessel 1110 via line 1154.

Alternate processes for the removal of silica can also be employed as described herein.

In certain embodiments, the treated brine solution can be supplied to a process designed to selectively remove and recover at least one of manganese and zinc. In a first embodiment, the pH of the solution can be adjusted to selectively precipitate zinc and/or manganese. Following precipitation of zinc and/or manganese, the solids can be separated from the solution by known filtration means.

Separation of the zinc and manganese solids can be achieved by dissolving the solids in acid, followed by selective recovery of either zinc or manganese. In certain embodiments, manganese can be oxidized to precipitate a manganese solid, which can be separated by filtration. Zinc remaining in solution can be recovered by electrochemical means.

Alternatively, zinc and/or manganese can be selectively removed by extraction. In certain embodiments, zinc and manganese can be separately recovered by individual extractions, or by double extraction. In certain embodiments, zinc and manganese can each selectively be recovered by electrochemical means.

Known methods for the recovery of zinc that can be used for recovery from brine solutions are described in U.S. Pat. Nos. 5,229,003, 5,358,700, 5,441,712, 6,458,184, 8,454,816, and 8,518,232.

Known methods for the recovery of manganese that can be used for recovery from brine solutions are described in U.S. Pat. Nos. 6,682,644, 8,454,816, 8,518,232, and U.S. Patent Publication Nos. 2003/0226761 and 2004/0149590.

Figure 7:
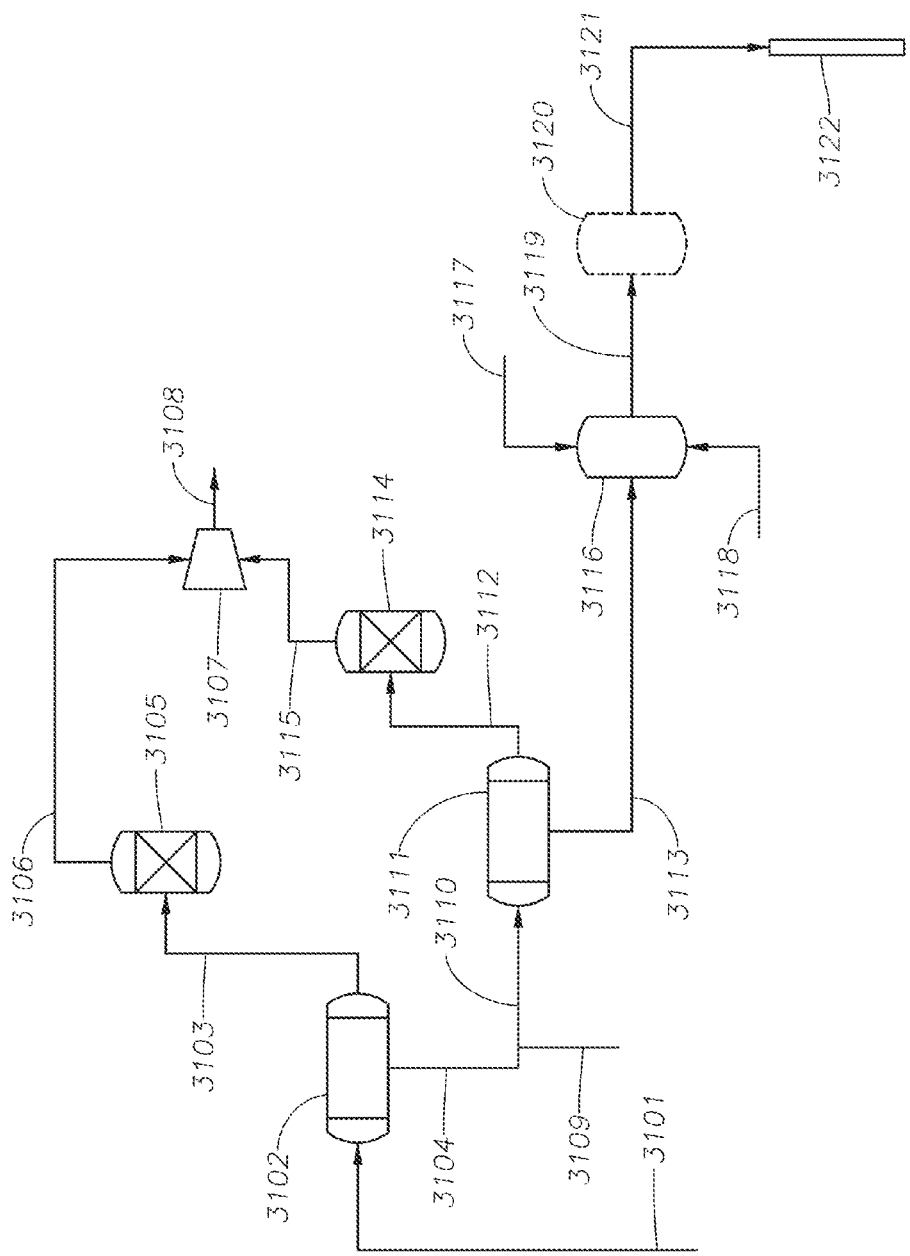
FIG. 7 shows a process according to an embodiment using a pH modification process.
Figure 8:
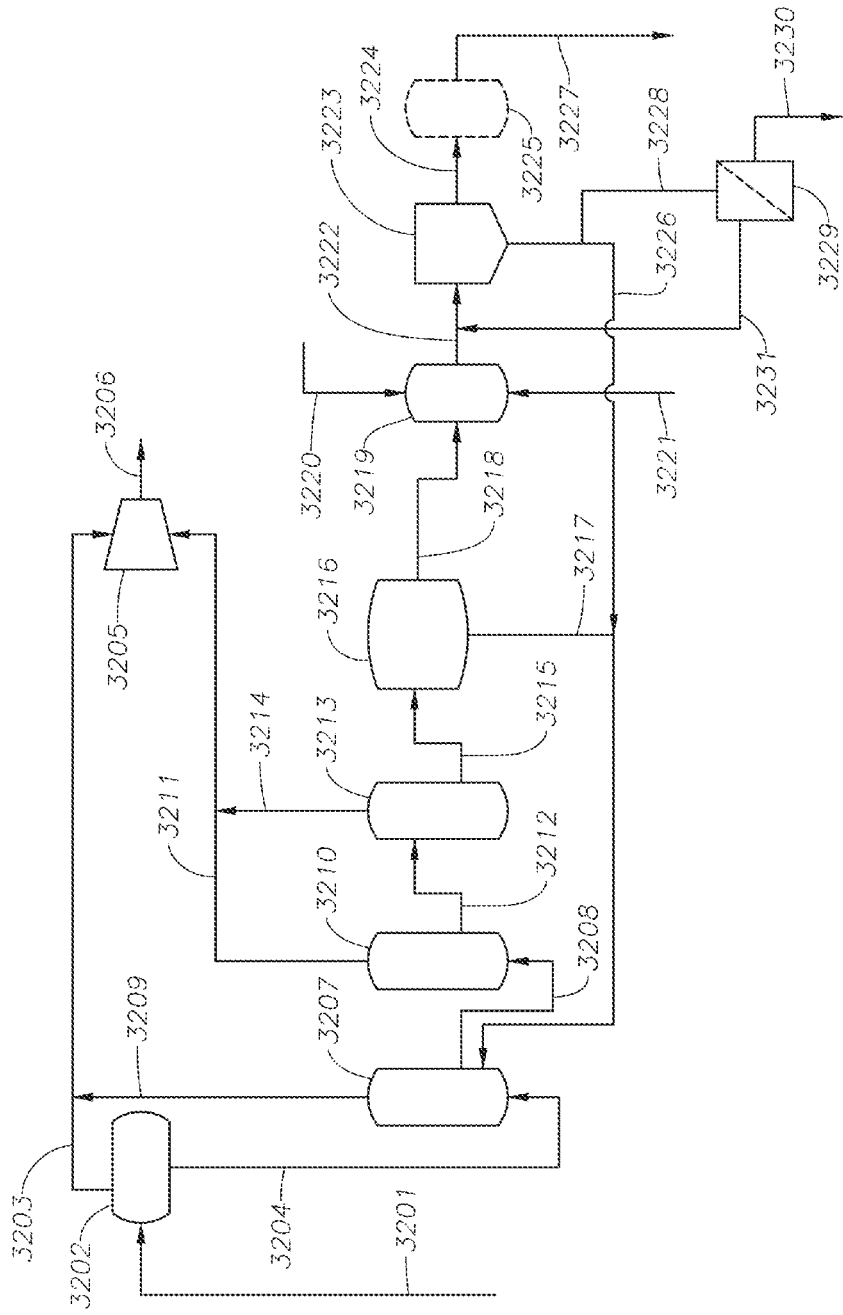
FIG. 8 shows a process according to an embodiment using a crystallizer reactor clarifier process.
Figure 9:
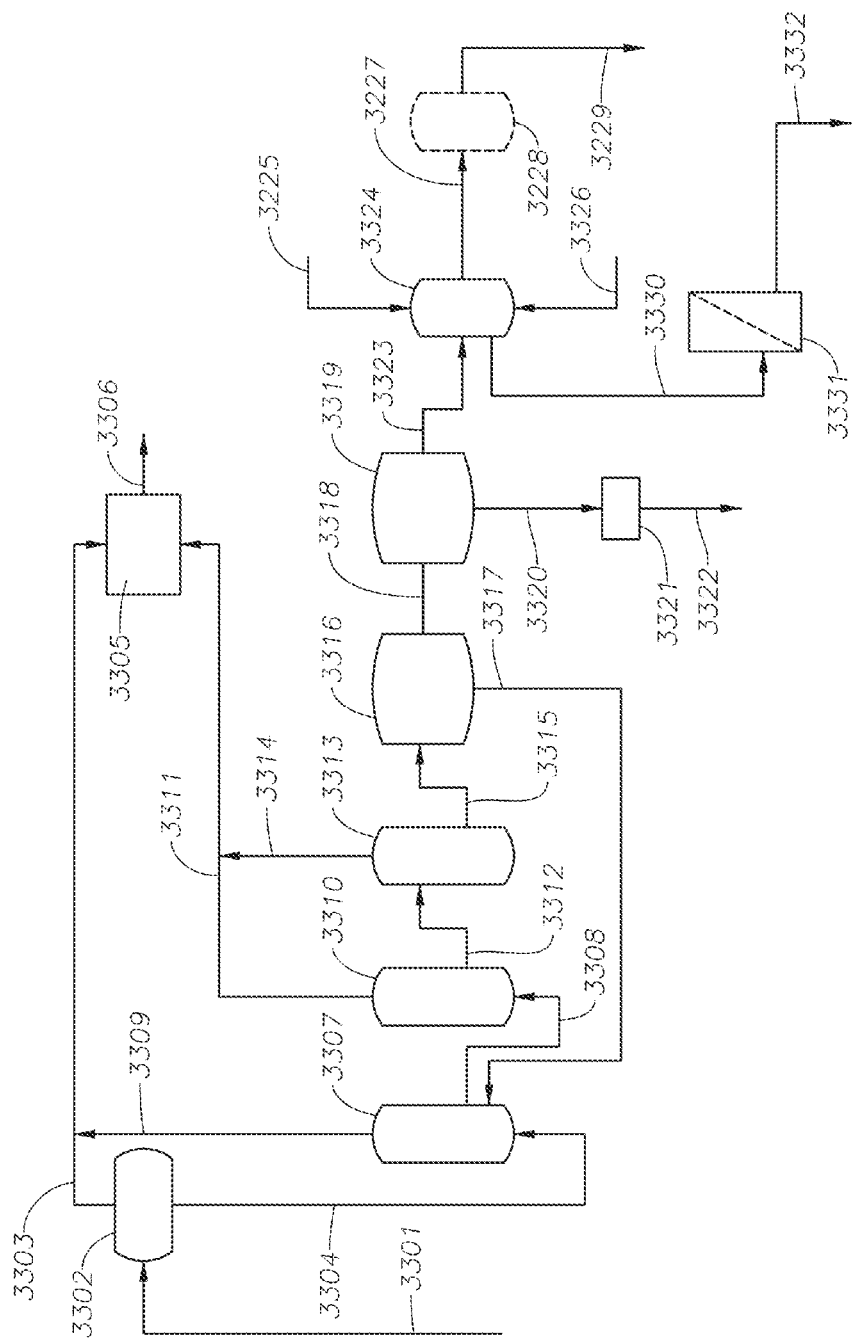
FIG. 9 shows a process according to an embodiment using a crystallizer reactor clarifier process.

FIGS. 7, 8, and 9 show exemplary embodiments of the present invention. FIG. 7 is an illustration of an exemplary embodiment of power production using a geothermal brine, followed by silica management. The brine 3101 is taken from a reservoir and supplied to a high pressure separator 3102. From the high pressure separator are produced two streams, hot brine 3104 and steam 3103. The steam 3103 is then fed to a condenser 3105 to remove salts and entrained water whereby high pressure steam 3106 is generated and fed to a turbine/generator 3107 to produce energy 3108. An acid 3109, preferably hydrochloric acid, is added to the hot brine 3104, as the brine is a chloride brine. Other acids also can be used. The acid/hot brine stream 3110 is then fed to a standard pressure separator 3111. Two streams are produced from the standard pressure separator, a standard pressure steam 3112 and return brine 3113. The standard pressure steam 3112 is then fed to a condenser 3114 to remove entrained brine whereby clean standard pressure steam 3115 is generated and fed to turbine/generator 3107 to produce energy 3108. The return brine 3113 is fed to an iron-silica removal process 3116 whereby iron and silica are removed from the brine by addition of a base 3117 and an oxidant 3118 to produce a reduced silica and iron silica brine stream 3119. The reduced silica and iron brine stream can optionally be fed to a mineral extraction process 3120 whereby at least one mineral is removed from the reduced silica and iron brine stream. The reduced silica and iron brine stream 3121 is then injected into a reservoir 3122.

FIG. 8 is an illustration of an exemplary embodiment of power production using a geothermal brine, followed by silica management. The brine 3201 is taken from a reservoir and supplied to a high pressure separator 3202. From the high pressure separator 3202 are produced two streams, high pressure steam 3203 and concentrated brine stream 3204. The high pressure stream 3203 is then fed to a turbine/generator 3205 to produce energy 3206. The concentrated brine stream 3204 is then fed to a high pressure crystallizer 3207 to produce a stream 3208 that is fed to a low pressure crystallizer 3210. A high pressure steam 3209 is generated and fed to a turbine/generator 3205 to produce energy 3206. From the low pressure crystallizer 3210 is produced a low pressure steam 3211 that fed to the turbine/generator 3205 to produce electricity 3206 and a stream 3212 that is fed to a flash tank 3213. From the flash tank 3213 are produced two streams, low pressure steam 3214 that is fed to a turbine 3205 and a stream of brine and silica solids 3215 that are fed to a primary clarifier 3216. From the primary clarifier 3216, seeds 3217 are recycled to the high pressure crystallizer 3207 and brine 3218 is fed to a silica, management process 3219 to remove silica by addition of a base 3220 and an oxidant 3221. Optionally, iron may be removed, as well. From the silica management process 3219, a reduced silica (and optionally reduced iron) brine 3222 is then fed to a secondary clarifier 3223 to remove silica. From the secondary clarifier 3223 the stream 3224 is fed to an optional metal recovery process 3225. Seeds 3226 are also recycled from the secondary clarifier 3223 to the high pressure crystallizer 3207. The reduced silica and optionally reduced iron) brine 3227 is then injected into a reservoir. Stream 3228 can be supplied to filter process 3229, which serves to separate the solid silica-iron waste 3230 from the liquid brine 3228. Alternately, stream 3231 can be resupplied to second clarifier 3223.

Similarly, FIG. 9 is an illustration of an exemplary embodiment of power production using a geothermal brine, followed by silica management. The brine 3301 is taken from a reservoir and supplied to a high pressure separator 3302. From the high pressure separator 3302 are produced two streams, high pressure steam 3303 and concentrated brine stream 3304. The high pressure steam 3303 is then fed to a turbine/generator 3305 to produce energy 3306. The concentrated brine stream 3304 is then fed to a high pressure crystallizer 3307 to produce a stream 3308 that is fed to a low pressure crystallizer 3310. A high pressure steam 3309 is generated and fed to a turbine/generator 3305 to produce energy 3306. From the low pressure crystallizer 3310 is produced a low pressure steam 3311 that is fed to the turbine/generator 3305 to produce electricity 3306 and a stream 3312 that is fed to a flash tank 3313. From the flash tank 3313 are produced two streams, a low pressure steam 3314 that is fed to a turbine 3305, and a stream of brine and silica solids 3315 that is fed to a primary clarifier 3316. From the primary clarifier 3316, seeds 3317 are recycled to the high pressure crystallizer 3307, and the brine 3318 is fed to a secondary clarifier 3319. While the primary clarifier 3316 removes the bulk of the solids, the secondary clarifier 3319 can further reduced the TSS. From the secondary clarifier 3319, two streams are produced. One stream 3320 is fed in part to a filter 3321 or alternative solids liquid separator where silica solids 3322 are removed. The brine containing silica and iron 3323 is fed to a silica management process 3324, which receives base 3325 and oxidant 3326. Optionally, iron can be removed as well. In some embodiments, the brine contains about 160 ppm silica and about 1600 to 2000 ppm of iron. The reduced silica (and optionally reduced iron) brine 3327 may be fed to an optional metal recovery process 3328. The reduced silica (and optionally reduced iron) brine is then injected into a reservoir 3329. Stream 3330 can be supplied to filter process 3331 which serves to separate the solid waste 3332.

In further embodiments, the reduced silica (and optionally reduced iron) brine is then supplied to a process for the selective removal of lithium, potassium, rubidium and/or cesium.

Selective Removal of Potassium, Rubidium, and/or Cesium from Brines

Figure 10:
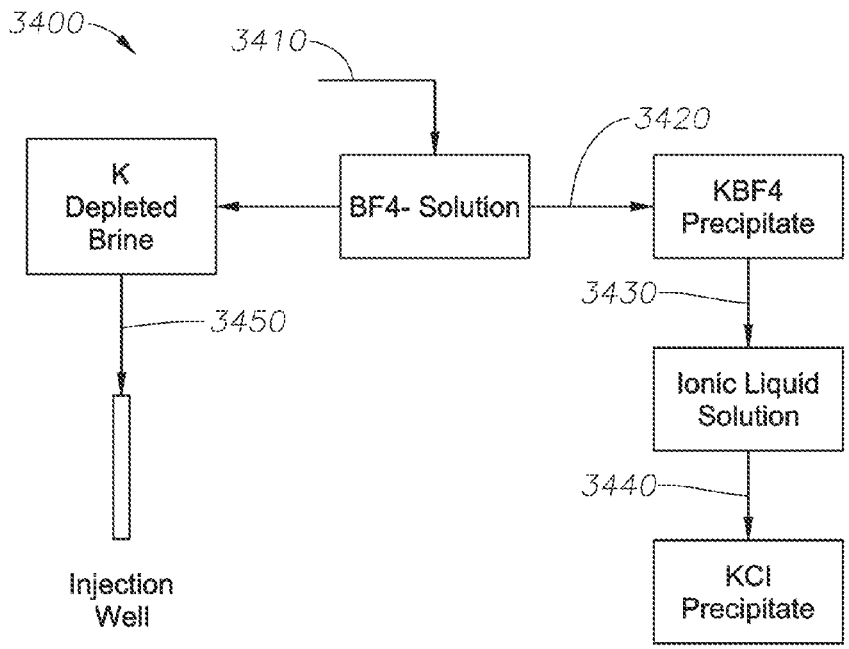
FIG. 10 is a flow diagram of selectively extracting potassium and recovering potassium chloride from brines using ionic liquids.

Broadly described herein are methods of removing potassium, rubidium, and/or cesium, selectively or in combination, from brines. In some embodiments, the methods are operable to remove potassium, rubidium, and/or cesium, selectively or in combination, from brines that have already been treated to remove silica. In further embodiments, the methods are operable to remove potassium, rubidium, and/or cesium, selectively or in combination, from brines that have already been treated to remove silica and iron. As shown in FIG. 10, by process 3400 of the present invention, a heated brine that contains potassium, rubidium, and/or cesium ions is contacted with a tetrafluoroborate containing solution to produce potassium tetrafluoroborate, rubidium tetrafluoroborate, and/or cesium tetrafluoroborate precipitate in step 3410. In certain embodiments, the brine is heated to a temperature of between about 70 to 100° C., in order to facilitate the reactivity of the potassium, rubidium, and/or cesium ions in the brine. In other embodiments, the brine is heated to a temperature of between about 80 to 100° C. In some embodiments, the brine solution is heated to a temperature of about 70° C. In some embodiments, the brine solution is heated to a temperature of about 75° C. In some embodiments, the brine solution is heated to a temperature of about 80° C. In some embodiments, the brine solution is heated to a temperature of about 85° C. In some embodiments, the brine solution is heated to a temperature of about 90° C. In some embodiments, the brine solution is heated to a temperature of about 95° C. In some embodiments, the brine solution is heated to a temperature of about 100° C.

In certain embodiments, the tetrafluoroborate compound is an acid or salt that includes tetrafluoroborate anions. Exemplary tetrafluoroborate compounds include fluoroboric acid, ammonium tetrafluoroborate, alkali metal tetrafluoroborates, and alkaline earth metal tetrafluoroborates although it is understood that other compounds can also be used.

In some embodiments, the brine is contacted with the tetrafluoroborate compound in an amount between about 10 to 80 grams per liter of brine. In some embodiments, the brine is contacted with the tetrafluoroborate compound in an amount between about 15 to 60 grams per liter of brine. In some embodiments, the brine is contacted with the tetrafluoroborate compound in an amount between about 35 to 80 grams per liter of brine. In some embodiments, the brine is contacted with the tetrafluoroborate compound in an amount of at least about 10 grams per liter of brine. In step 3410, the brine and the tetrafluoroborate compound are contacted for between about 30 to 60 seconds. In certain embodiments, the tetrafluoroborate compound and the brine are vigorously mixed. In one embodiment, after the tetrafluoroborate compound has been added to the brine, the mixture is placed in a centrifuge for between about one to five minutes. The centrifuge speed is between about 1000-5000 revolutions per minute, alternatively at a speed of at least 4000 revolutions per minute. Following centrifugation of the mixture, a precipitate layer that includes potassium tetrafluoroborate, rubidium tetrafluoroborate, and/or cesium tetrafluoroborate and an aqueous layer will be present. The potassium tetrafluoroborate, rubidium tetrafluoroborate, and/or cesium tetrafluoroborate precipitate layer 3420 and the aqueous layer is separated using techniques known in the art. In certain embodiments, after separation, the precipitate layer containing potassium tetrafluoroborate, rubidium tetrafluoroborate, and/or cesium tetrafluoroborate is then washed with water. In certain embodiments, the use of fluoroboric acid as the tetrafluoroborate compound selectively precipitates at least about 95% of the potassium present in the brines. As an example, the reaction for a brine containing potassium chloride, which is contacted with a sodium tetrafluoroborate solution is shown in Equation 1 below.

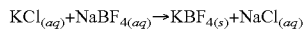

Eq. 1

Preparation of Potassium Chloride, Rubidium Chloride, and/or Cesium Chloride Using Ionic Liquids In another embodiment of the invention, a method for the preparation of potassium chloride, rubidium chloride, and/or cesium chloride, selectively or in combination, from potassium tetrafluoroborate, rubidium tetrafluoroborate, and/or cesium tetrafluoroborate using ionic liquids is provided. In step 3430, potassium tetrafluoroborate, rubidium tetrafluoroborate, and/or cesium tetrafluoroborate is supplied to an ionic liquid solution that contains chloride anions. In certain embodiments of the invention, the potassium tetrafluoroborate, rubidium tetrafluoroborate, and/or cesium tetrafluoroborate is prepared using the method described above. In some embodiments, the ionic liquid solution is selected from the group consisting of quaternary ammonium chlorides. In other embodiments, the ionic liquid solution is selected from a group of phosphonium chlorides. Exemplary ionic liquid solutions include tetrabutylammonium chloride (IRAQ and trihexyltetradecyl phosphonium chloride.

In some embodiments, potassium tetrafluoroborate, rubidium tetrafluoroborate, and/or cesium tetrafluoroborate is added to the ionic liquid solution in an amount between about 35 to 80 grams per liter of brine. In some embodiments, potassium tetrafluoroborate, rubidium tetrafluoroborate, and/or cesium tetrafluoroborate is added to the ionic liquid solution in an amount between about 10 to 80 grams per liter of brine. The ionic liquid solution and potassium tetrafluoroborate, rubidium tetrafluoroborate, and/or cesium tetrafluoroborate mixture is then heated until the potassium tetrafluoroborate, rubidium tetrafluoroborate, and/or cesium tetrafluoroborate is dissolved. In certain embodiments, the mixture is heated to a temperature of between about 70 to 100° C. alternatively between about 80 to 100° C. and alternatively to about 90° C. In some embodiments, the mixture is stirred during the heating step. In exemplary embodiments, when utilizing quaternary ammonium chloride ionic liquids, the stirring is done intermittently, as may be necessary to dissolve all of the potassium tetrafluoroborate, rubidium tetrafluoroborate, and/or cesium tetrafluoroborate. In exemplary embodiments that employ phosphonium chloride ionic liquids, the stirring is vigorous and employed for between about 20 and 30 minutes.

After heating the ionic liquid to dissolve the potassium tetrafluoroborate, rubidium tetrafluoroborate, and/or cesium tetrafluoroborate, the mixture separates into two distinct layers. In certain embodiments using quaternary ammonium chloride ionic liquids, separation of the two layers includes a light white solid precipitate layer that is on top of an aqueous layer. The aqueous layer in these embodiments includes potassium chloride, rubidium chloride, and/or cesium chloride. In certain embodiments using phosphonium chloride ionic liquids, the two layers include an organic layer and an aqueous layer. The aqueous layer in these embodiments includes potassium chloride, rubidium chloride, and/or cesium chloride. Equation 2 is an exemplary reaction showing the conversion of potassium tetrafluoroborate into potassium chloride using a quaternary ammonium chloride ionic liquid. Equation 3 is an exemplary reaction showing the conversion of potassium tetrafluoroborate into potassium chloride using a phosphonium chloride ionic liquid.

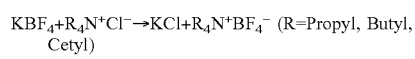

Eq. 2

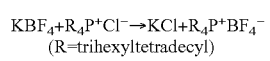

Eq. 3

In step 3440, the aqueous layer containing potassium chloride, rubidium chloride, and/or cesium chloride, is isolated using appropriate separation techniques. It will be apparent to one of skill in the art which separation techniques may be employed to isolate the aqueous layer. For example, the aqueous layer containing potassium chloride is then allowed to evaporate to dryness, resulting in solid potassium chloride. In exemplary embodiments, the percentage conversion of potassium tetrafluoroborate to potassium chloride is between about 60 to 90%. In some embodiments, the percentage conversion of potassium tetrafluoroborate to potassium chloride is at least about 60%. In some embodiments, the percentage conversion of potassium tetrafluoroborate to potassium chloride is at least about 70%. In some embodiments, the percentage conversion of potassium tetrafluoroborate to potassium chloride is at least about 80%. In some embodiments, the percentage conversion of potassium tetrafluoroborate to potassium chloride is at least about 90%. In further embodiments, the purity of the resulting potassium chloride is at least 98%.

As a result of the removal of potassium, rubidium or cesium, a composition is produced that has reduced concentrations of potassium, rubidium or cesium.

As shown in FIG. 10, in some embodiments, once the potassium, rubidium, or cesium has been removed from the brine, the brine is injected into the ground 3450.

Figure 11:
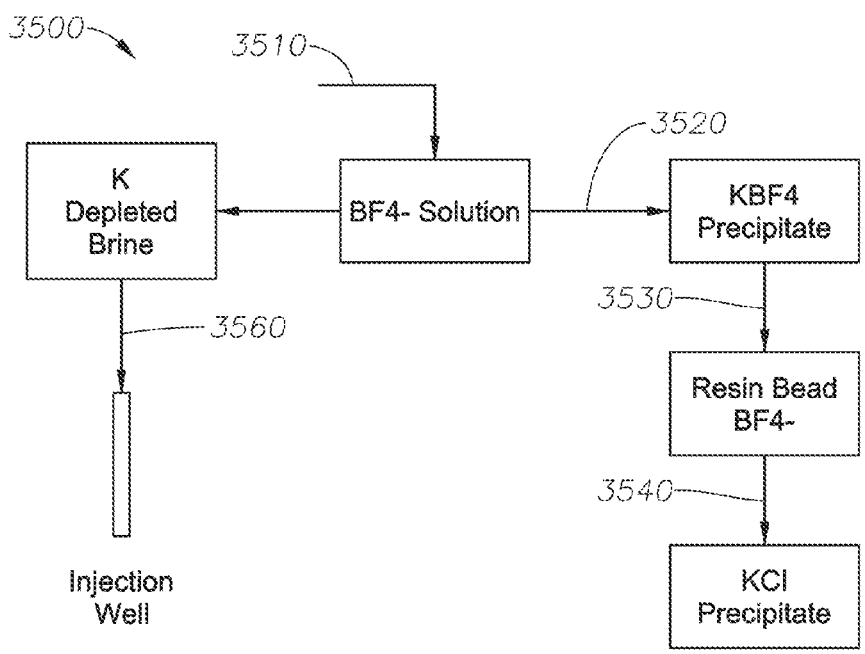
FIG. 11 is a flow diagram of selectively extracting potassium and recovering potassium chloride from brines using ion exchange media.

Preparation of Potassium Chloride, Rubidium Chloride, and/or Cesium Chloride Using Ion Exchange Media Referring now to FIG. 11, process 3500 details a method for the preparation of potassium chloride from potassium tetrafluoroborate using ion-exchange media. Similar process can be employed for preparation of rubidium chloride and/or cesium chloride from rubidium tetrafluoroborate and/or cesium tetrafluoroborate. Steps 3510 and 3520 are the same as steps 3410 and 3420 described above for FIG. 10. In step 3530, potassium tetrafluoroborate is supplied to an ion-exchange media mixture. The ion-exchange media mixture can be prepared by mixing the ion-exchange media with water. In certain embodiments of the invention, the potassium tetrafluoroborate, rubidium tetrafluoroborate, and/or cesium tetrafluoroborate are prepared using the methods described herein. In some embodiments, the ion-exchange media is selected from quaternary ammonium functional resin beads. One exemplary resin bead is the DOWEX-K-21 resin bead.

In an embodiment, potassium tetrafluoroborate, rubidium tetrafluoroborate, and/or cesium tetrafluoroborate are added to the ion-exchange media mixture in an amount between about 0.5 to 10 grams of potassium tetrafluoroborate, rubidium tetrafluoroborate, and/or cesium tetrafluoroborate per 100 g of exchange media mixture. The ion-exchange media mixture with the potassium tetrafluoroborate, rubidium tetrafluoroborate, and/or cesium tetrafluoroborate is then heated until the potassium tetrafluoroborate, rubidium tetrafluoroborate, and/or cesium tetrafluoroborate are dissolved. In some embodiments, the mixture is heated to a temperature of between about 70 to 100° C., and alternatively to about 90° C. in some embodiments, the mixture is heated to a temperature of between about 80 to 100° C. In some embodiments, the mixture is heated to a temperature of about 70° C. In some embodiments, the mixture is heated to a temperature of about 75° C. In some embodiments, the mixture is heated to a temperature of about 80° C. In some embodiments, the mixture is heated to a temperature of about 85° C. In some embodiments, the mixture is heated to a temperature of about 90° C. In some embodiments, the mixture is heated to a temperature of about 95° C. In some embodiments, the mixture is heated to a temperature of about 100° C. In some embodiments, the mixture is also stirred during the heating step. In exemplary embodiments, the mixture is stirred vigorously intermittently for 30 seconds at two minute intervals.

After heating the ion-exchange media mixture to dissolve the potassium tetrafluoroborate, rubidium tetrafluoroborate, and/or cesium tetrafluoroborate, the mixture separates into an aqueous layer that includes potassium chloride, rubidium chloride, and/or cesium chloride and a solid ion exchange media layer. In step 3540, the aqueous layer containing potassium chloride, rubidium chloride, and/or cesium chloride is isolated using appropriate separation techniques, which will be apparent to one of skill in the art. The aqueous layer is then dried, resulting in solid potassium chloride, rubidium chloride, and/or cesium chloride. In exemplary embodiments of the invention, the percentage conversion of potassium tetrafluoroborate to potassium chloride is between about 60 to 90%. In some embodiments, the percentage conversion of potassium tetrafluoroborate to potassium chloride is at least about 60%. In some embodiments, the percentage conversion of potassium tetrafluoroborate to potassium chloride is at least about 70%. In some embodiments, the percentage conversion of potassium tetrafluoroborate to potassium chloride is at least about 80%. In some embodiments, the percentage conversion of potassium tetrafluoroborate to potassium chloride is at least about 90%.

As shown in FIG. 11, in some embodiments, once the potassium, rubidium, or cesium has been removed from the brine, the brine can be injected into the ground 3560.

Cesium can also be removed from brines using known methods, such as through the use of silicotitanate.

Brines that can be used in the various methods described herein can include any type of brine. In some embodiments, the brine is a geothermal brine. In further embodiments, the geothermal brine is a Salton Sea geothermal brine. In other embodiments, the brine is a concentrated geothermal brine. The treated brines described herein can be used for a variety of purposes. In some embodiments, the treated brines are used in a process to extract minerals remaining in the brine. In some embodiments, the treated geothermal brine is used in a method whereby the treated brine is injected into a geothermal reservoir.

In some embodiments, the compositions of the present invention have improved injectivity due to the reduction in concentration of silica, iron, potassium, rubidium, cesium, and/or other elements, as removal of these components of the brine reduce scaling in the well.

EXAMPLES

Example 1

Selective Removal of Silica Using Aluminum Salts

A simulated brine was prepared to mimic the brine composition from exemplary Salton Sea deep test wells (post reactor crystallizer clarifier system), having an approximate composition of 260 ppm (mg/kg) lithium, 63,000 ppm sodium, 20,100 ppm potassium, 33,000 ppm calcium, 130 ppm strontium, 700 ppm zinc, 1700 ppm iron, 450 ppm boron, 54 ppm sulfate, 3 ppm fluoride, 450 ppm ammonium ion, 180 ppm barium, 160 ppm silica (measured as silicon dioxide), and 181,000 ppm chloride. The silica was added to the brine as acidified sodium silicate solution, with the target of a concentration of about 160 ppm, the anticipated value for the test well brine after undergoing a clarifying process to partially remove silica. The pH of the simulated brine was between about 3 and 4, and was subsequently adjusted with sodium hydroxide or other suitable base.

To enhance separation of the aluminosilicates from the brine once precipitated, aluminosilicates are recycled to contact them with a fresh batch of brine. Yjos enhances silica removal by increasing the size of the particles, making it easier to separate them physically. The amorphous aluminosilicate material was prepared by neutralizing a concentrated sodium silicate solution with an aluminum chloride salt. Specifically, 710 g of $Na_2SiO_3.9H_2O$ was dissolved in 400 mL of distilled water. To the solution, 420 g $AlCl_3$ was slowly added while stirring to produce a wet paste of precipitated material. The paste was dried at 60° C. in an oven overnight and washed with Milli-Q water to remove fines to produce a solid. The resulting solid was relatively insoluble (relative to pure amorphous silica) and suitable for use as a seed material for subsequent silica removal tests.

Approximately 1.6 mL of a 0.1M solution of $AlCl_3$ was added to approximately 60 mL of the simulated brine solution, which had an initial silica concentration of about 160 ppm and a pH of about 5. Approximately 1.5% by weight (relative to the total mass) of solid amorphous aluminosilicate was added to the solution. The $AlCl_3$ was slowly added in an amount equal to the molar amount of silica solution to achieve a ratio of silica to aluminum of about 1:1. The solution was heated to approximately 95° C. and stirred constantly. The pH was monitored and adjusted by titrating with sodium hydroxide or calcium hydroxide to maintain the starting pH of about 5. The solution was allowed to stir for approximately 10 minutes, during which the silica and aluminum reacted to selectively precipitate on the seed material, thereby removing both aluminum and silica from the solution. The monomeric silica content (i.e., non-amorphous aluminosilicate content) dropped to approximately 25-40 ppm upon addition of base to maintain the pH at about 5. An additional 5-15% of the silica, present precipitated over the next 30 minutes. Total silica removal for the process after 15 minutes of stirring was about 95%, resulting in a brine solution having a silica content of approximately about 10 ppm. The aluminum concentration of the solution, after precipitation of the silica, was between about 2-10 ppm.

Example 2

Selective Removal of Silica Using Iron

A simulated brine was prepared to mimic the brine composition of test wells found in the Salton Sea, having an approximate composition of about 252 ppm lithium, 61,900 ppm sodium, 20,400 ppm potassium, 33,300 ppm calcium, 123 ppm strontium, 728 ppm zinc, 1620 ppm iron, 201 ppm boron, 322 ppm sulfate, 3 ppm fluoride, 201 ppm barium, 57 ppm magnesium, 1880 ppm manganese, 136 ppm lead, 6 ppm copper, 11 ppm arsenic, 160 ppm silicon dioxide, and 181,000 ppm chloride. The simulated brine (1539.2 g) was sparged with air for about 60 minutes, during which time pH was measured. A calcium hydroxide slurry having 20% solids by weight was added dropwise after 60, 90, and 120 minutes (total weight of the calcium hydroxide slurry added was 13.5 g; calcium hydroxide was 2.7 g dry basis) to the solution. The pH was monitored throughout the reaction and was initially allowed to fall, than adjusted to a pH of about 5 with the addition of calcium hydroxide after 60 minutes, and maintained at about a pH of 5 thereafter. The reaction was allowed to stir while the pH was maintained at about 5. Total reaction time was about 180 minutes. A white precipitate was collected, washed and weighed, providing a yield of about 95% recovery of the silica present in the brine and about 100% of the iron present in the brine.

Example 3

Selective Removal of Silica Using Activated Alumina

A 50 mL brine solution having approximately 180 ppm dissolved silica was passed through a 2.5 cm diameter column filled to a depth of 20 cm and containing approximately 0.5 g activated alumina and about 1.2 g water. The silica preferentially adsorbed onto the alumina and was removed from the solution. The activated alumina had a surface area of about 300 $m^2/g$ and a grain size of between about 8-14 mesh (~2 mm diameter). The total bed volume was about 102 mL. The temperature during the step of contacting the silica containing brine and the activated alumina was maintained between about 90 and 95° C.

The concentration of silica in the brine was monitored by measuring monomeric silica using the molybdate colorimetric method and using Atomic Absorption for total silica. Silica values were significantly lower in the exit solution due to adsorption of the silica on the activated alumina. Saturation of the activated alumina, in the column was indicated by a sudden increase in silica concentration in the exit solution. A total loading of about 1.8% by weight of silica ($SiO_2$) on the activated alumina was achieved.

To regenerate the alumina, for another cycle of silica removal, the alumina was first washed with 5 bed volumes of dilute water in order to remove an salt solution remaining in the pores. This removed only a small amount of silica from the alumina. The alumina was then reacted with a dilute (0.1M) sodium hydroxide solution at a temperature of between about 50-75° C. until a desired amount of silica has been removed. The alumina was then rinsed with between about 2-3 bed volumes of dilute acid to prepare the surface for the next silica adsorption cycle.

Example 4

Continuous Processing of Geothermal Brine

To a brine solution comprising about 200 mg/L Li, 75,000 mg/L Na, 24,000 mg/L K, 39,000 mg/L Ca, 156 mg/L Sr, 834 mg/L Zn, 539 mg/L B, 219 mg/L Ba, 160 mg/L $SiO_2$, and 215,500 mg/L Cl and maintained at about 95° C. was added approximately 1.5% by weight aluminosilicate seed. To approximately 39 mL of the brine solution was added 1.07 mL of a 0.1M solution of $AlCl_3$ such that the ratio of $SiO_2$:Al was 1:1. About 0.45 ME, of a 1N solution of NaOH was used to titrate the pH of the solution to about 5. The solution was heated and stirred for about 10 minutes to ensure complete precipitation of the aluminosilicate.

Analysis of both the feed and the output fluids during silica removal yielded mixed results. Comparing the results of molybdate blue calorimetry (MBC; useful for quantifying monomeric silica) and ICP-OES yielded silica levels that were significantly lower than input levels (160 mg/L).

As shown in Table 1, the results of several methods for the removal of silica from a brine solution were tested. Both $Ca(OH)_2$ and NaOH were investigated, as was NaOH along with a 10% excess of $AlCl_3$. For the use of an excess of $AlCl_3$, the additional $AlCl_3$ was added approximately 2 minutes after initiation of the reaction, and additional NaOH was titrated into the reaction mixture to maintain a pH of about 5. Finally, NaOH and polymerized aluminum in the form of aluminum chlorohydrate (PAC) was also investigated, instead of $AlCl_3$, and was prepared in situ by titrating NaOH into $AlCl_3$ until a pH of about 4.5 was achieved. Additional base was added to raise the pH to about 5.

Both $Ca(OH)_2$ and NaOH were effective in both increasing the pH of the solution, and in removing silica, with $Ca(OH)_2$ being slightly more effective at removing silica than NaOH, and removing at least about 80% of the silica present. Precipitation of silica by contacting with an excess of $AlCl_3$ resulted in the precipitation of nearly 87% of silica present. Finally, use of the PAC resulted in the removal of about 84% of the silica present.

TABLE 1

| | Test Condition | | | |
| --- | --- | --- | --- | --- |
| | ICP | | MBC | |
| | % $SiO_2$ remaining in solution | % $SiO_2$ removed | % $SiO_2$ remaining in solution | % $SiO_2$ removed |
| $Ca(OH)_2$ | 17 | 83 | 19 | 81 |
| NaOH | 28 | 72 | 20 | 80 |
| NaOH + 110% $AlCl_3$ | 16 | 84 | 13 | 87 |
| NaOH + PAC | 17 | 83 | 15 | 85 |

Example 5

Silica Removal Process Using Aluminum Salts

Approximately 60 mL of brine containing about 160 mg/L silica at a pH of 5 was added to 1.07 g of amorphous aluminosilicate seed (~1.5 wt. % solids). Approximately 1.6 mL of a 0.1M solution of aluminum chloride ($AlCl_3$) was added to the brine solution. The solution was stirred, maintained at nominally 95° C., and the pH monitored. The pH dropped to about 2.7 upon addition of the $AlCl_3$ solution. Approximately 13 mL of a saturated and filtered $Ca(OH)_2$ solution was added. Silica and the aluminum salt formed precipitates, yielding a brine solution having a silica content of about 0.23 mg/mL.

Example 6

Packed Bed Testing

A hold-up vessel and packed bed tester (HUV-PB) were used in the packed bed testing. A baffled, plug-flow design with stirred sections to keep solid particles suspended in solution was employed. The plug-flow design with mixing is important as it maintains a constant and narrow residence time distribution (RTD) while preventing premature deposition of suspended solids, which would bias scaling and packed-bed fouling rates.

The test set-up included brine pumping and metering equipment, a hold-up vessel (HUV) to provide controlled residence times similar to a full-scale injection system, and related controls and instrumentation.

A HUV sized for the minimum and maximum hold-up time for injection pipelines and wellbores was used to test the fouling rate across the packed bed. The fouling rate was monitored by real-time pressure drop (ΔP) signals at constant flow through the packed bed.

The packing configuration and flow through the packed bed was designed to provide accelerated fouling compared to that occurring in the injection well. The packed beds were packed with screened drilling rock chips from a well hydrothermal zone. The rock chips were primarily of two types: 1) hydrothermally-crystallized fine-grained granitic material composed of quartz and feldspar and 2) silica-bonded metasiltstone. The rock chips were uniformly packed to allow for the measurement of relative fouling rates under process conditions for each test.

The run time of each experiment depended on the behavior of the brine across the packed bed and the increase in pressure across the packed bed. If a pressure drop maximum was not reached, the test was run for up to 2 weeks before discontinuation of the test.

A side-stream of brine was supplied to the packed bed through heat-traced packed bed tubing at about 10 psig from continuously flowing bypass loops. The brine streams were metered by positive-displacement peristaltic pumps at a controlled ratio through a HUV to simulate the average residence time in the injection pipeline and well casings. The HUV was fitted with baffles and mixing paddles to provide plug flow without settling of suspended solids. The brine was then pumped under high-pressure (up to 1000 psig) through the columns packed with rock chips in order to simulate the reservoir formation.

During each test, data collection included brine flow rate, temperature, pressure, and differential pressure for each of the columns. Brine samples were collected for chemical analysis upstream and downstream of the beds. The tests were run until the pressure drop (ΔP) across the packed bed indicated significant plugging (approaching 1000 psig) while the brine flow rate through the column was maintained at a constant rate by a positive displacement pump. The tubes had injection brine pumped through them until the pressure reached about 1000 psig at 1 LPM brine flow. The tests were concluded at 2 weeks, if the pressure drop of 1000 psig was not experienced.

At the end of each test the packed bed and tubing test sections were weighed to determine the amount of scale deposited and the residual bulk porosity of the packed bed was measured. Cross-sections of the packed bed were examined by Scanning Electron Microscopy (SEM) and X-ray diffraction (XRD). Brine samples and deposited solids in the tubing were also analyzed for chemical composition.

The test runs were performed in accordance with Table 2.

TABLE 2

| Test 1 | Untreated Brine (UB) |
| --- | --- |
| Test 2 | Treated Brine (TB) |
| Test 3 | 50% UB:50% TB |
| Test 4 | Untreated Brine (UB) |
| Test 5 | 50% UB:50% TB |
| Test 6 | Treated Brine (TB) |
| Test 7 | Untreated Brine (UB) |
| Test 8 | Treated Brine (TB) |
| Test 9 | 50% UB:50% TB |
| Test 10 | Untreated Brine (UB) |

Treated brine was brine that had been subjected to a silica management and iron removal step as described in example 4 above (continuous removal of silica). The brine was treated by first oxidizing the Fe(II) to Fe(III) and precipitating it as FeO(OH) with the addition of lime (as described herein). The lithium was extracted using a granulated sorbent based on a lithium aluminate intercalate. Untreated brine was brine that had been flashed for purposes of extracting energy, but which had only a portion of silica removed, and had not been processed to remove iron, in a process in accordance with that described in U.S. Pat. No.

5,413,718. The untreated brine had approximately 160 mg/kg of silica. The 50:50 blends were 50:50 by volumetric flow rate of treated and untreated brine.

Lithium Extraction Step

Lithium was extracted with a granular lithium aluminate sorbent placed in two five foot deep and 18 inch diameter columns that were run in alternating sequences of load and strip. Each operation was approximately two hours in duration. The sorbent was made according to the process described in U.S. Pat. No. 8,574,519, which is hereby incorporated by reference in its entirety. Once the brine had passed through the columns it was recovered in a holding tank before a part of the flow was pumped packed bed test. The lithium was reduced from approximately 250 mg/kg to generally less than about 100 mg/kg and preferably less than about 15 ppm.

The pressure profiles of each run are shown in FIGS. 12-20, and are summarized in Table 3 below.

TABLE 3

| Source | Packed Bed Days of Operation (to 1000 psi stop-point) | | | Average |
|---|---|---|---|---|
| Untreated Brine | 1.38 (Test 1) | 1.67 (Test 4) | 0.97 (Test 7) | 1.34 days |
| Treated Brine | +15.0 (Test 2) | 4.59 (Test 6) | +13.0 (Test 8) | +10.9 days |
| 50:50 blend | 1.39 (Test 3) | 3.28 (Test 5) | 4.60 (Test 9) | 3.09 days |

Figure 12:
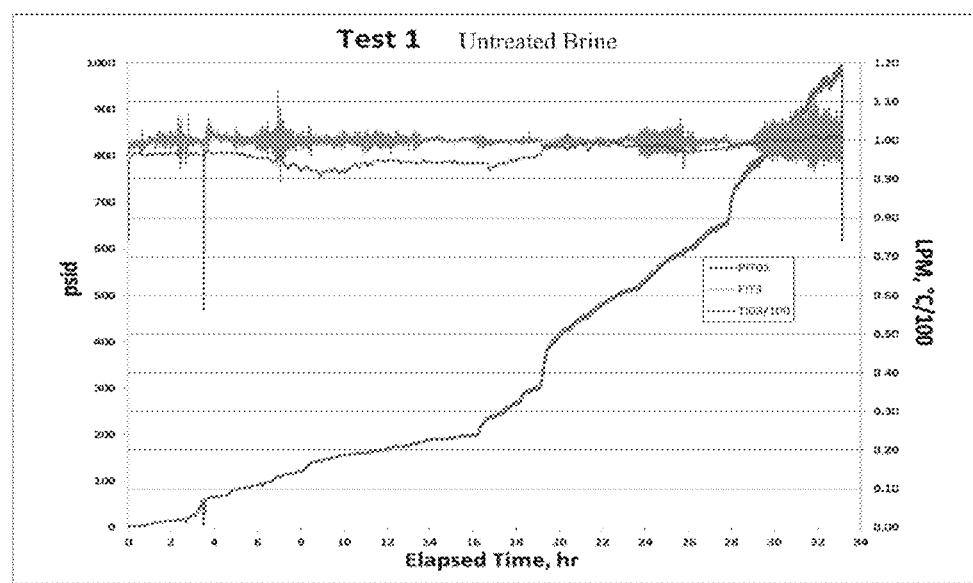
FIG. 12 is a graph showing the packed bed differential pressure versus time for an untreated brine.
Figure 13:
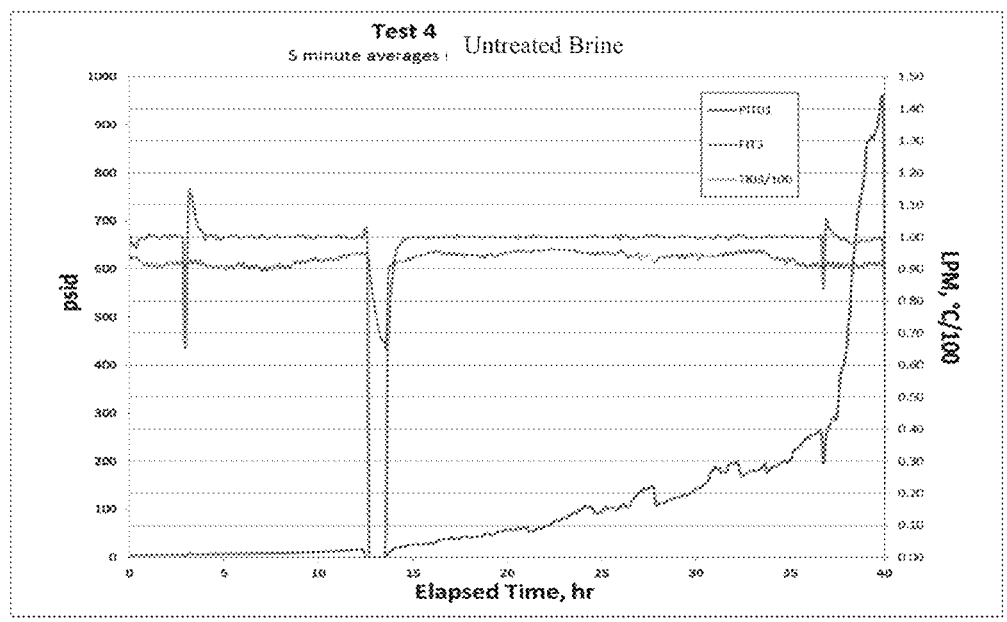
FIG. 13 is a graph showing the packed bed differential pressure versus time for an untreated brine.
Figure 14:
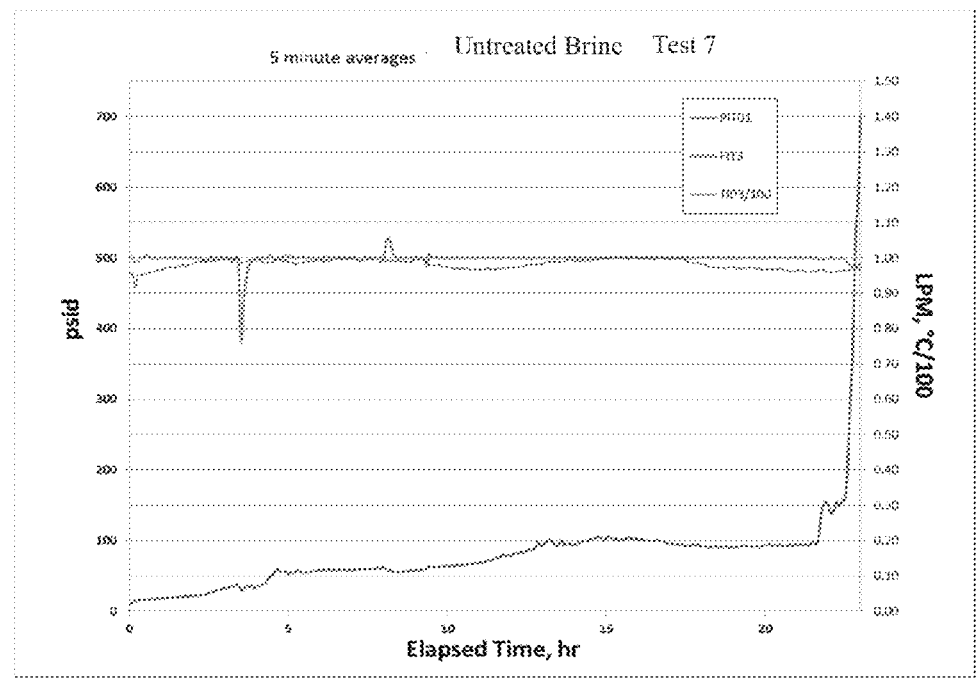
FIG. 14 is a graph showing the packed bed differential pressure versus time for an untreated brine.
Figure 15:
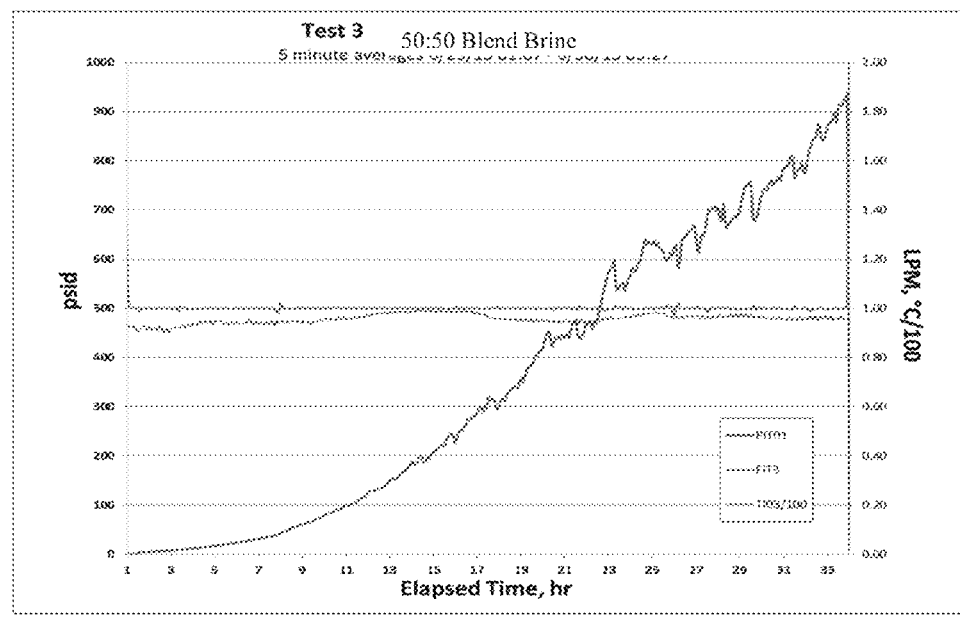
FIG. 15 is a graph showing the packed bed differential pressure versus time for a 50:50 blend brine.
Figure 16:
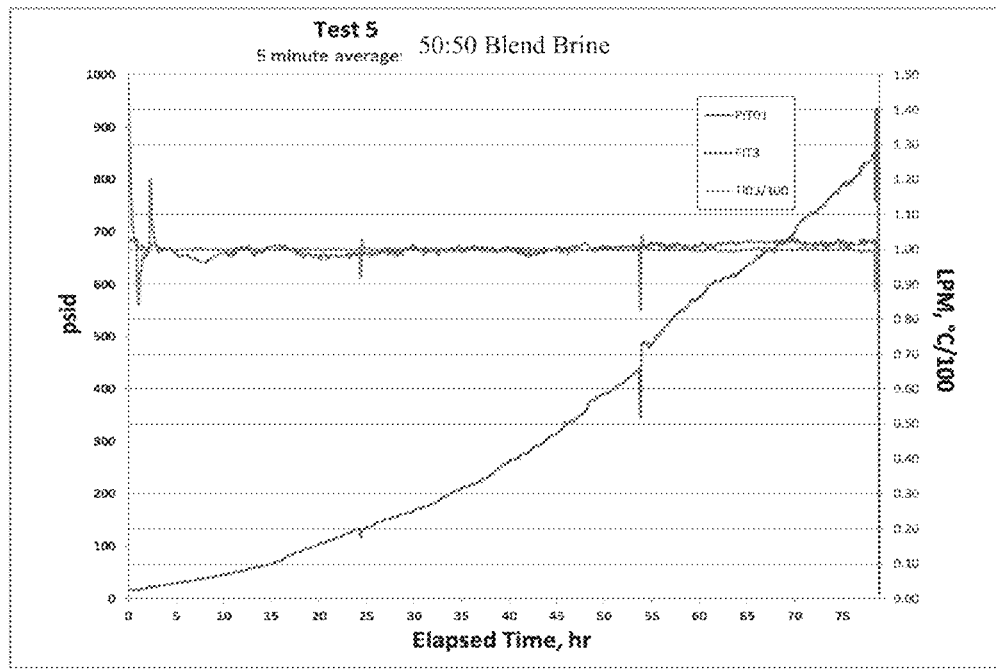
FIG. 16 is a graph showing the packed bed differential pressure versus time for a 50:50 blend brine.
Figure 17:
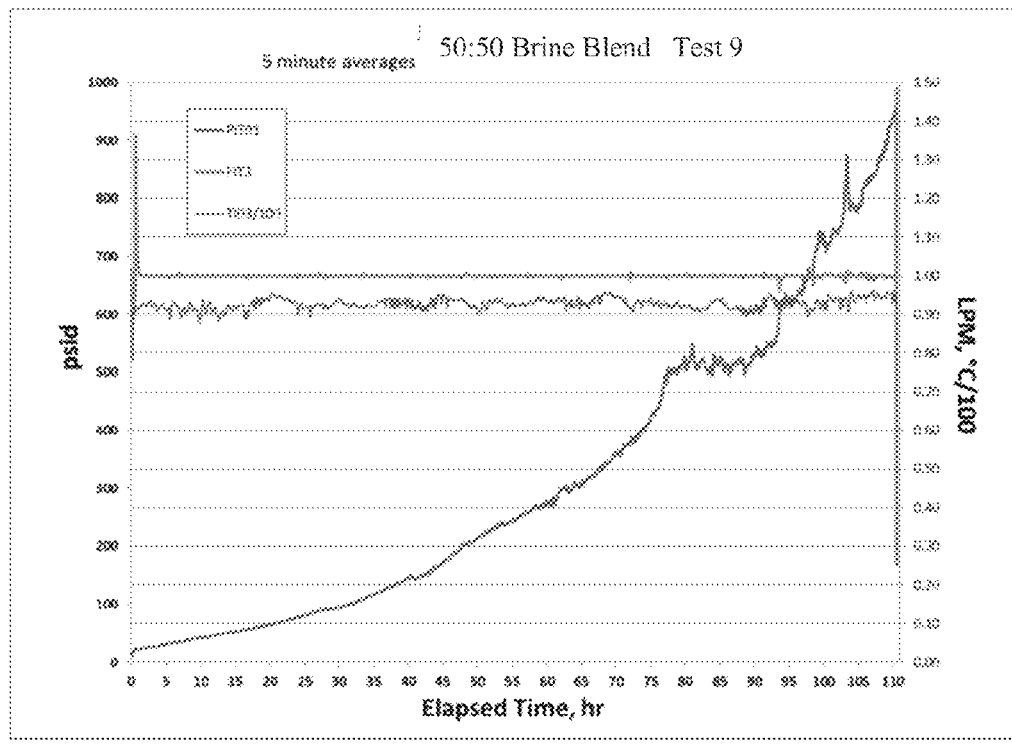
FIG. 17 is a graph showing the packed bed differential pressure versus time for a 50:50 blend brine.
Figure 18:
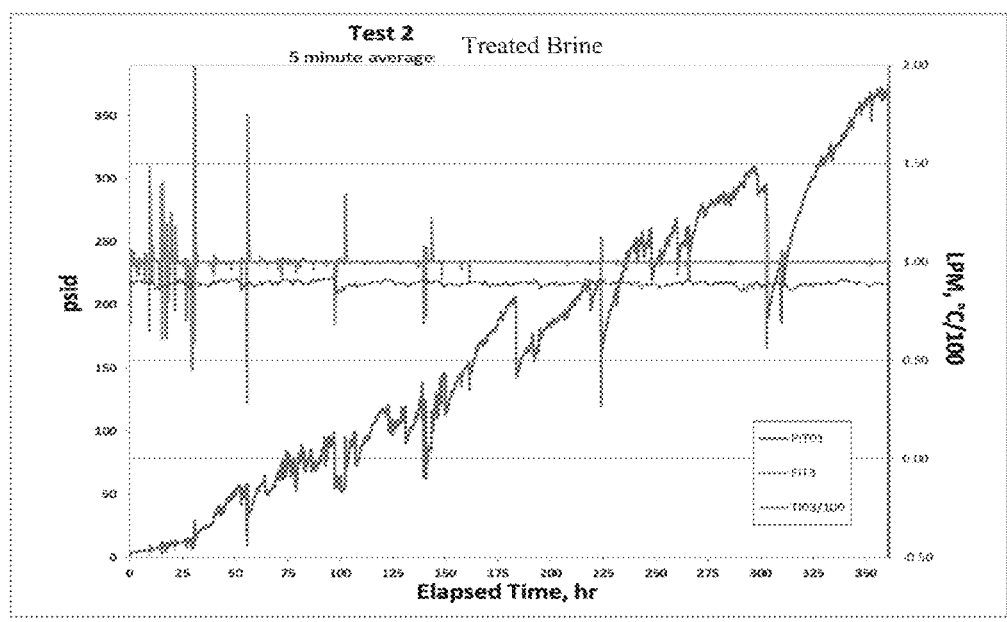
FIG. 18 is a graph showing the packed bed differential pressure versus time for a treated brine.
Figure 19:
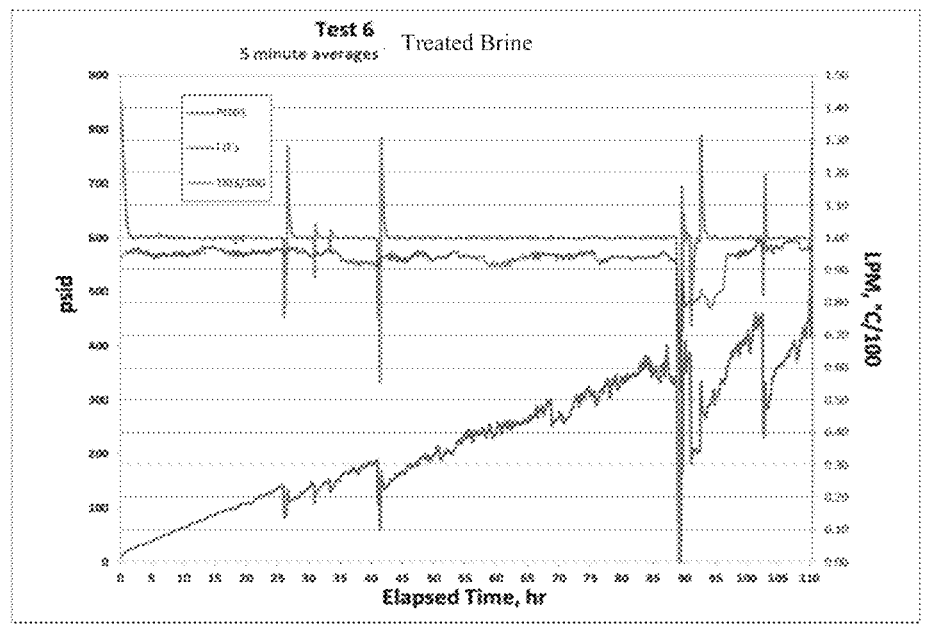
FIG. 19 is a graph showing the packed bed differential pressure versus time for a treated brine.
Figure 20:
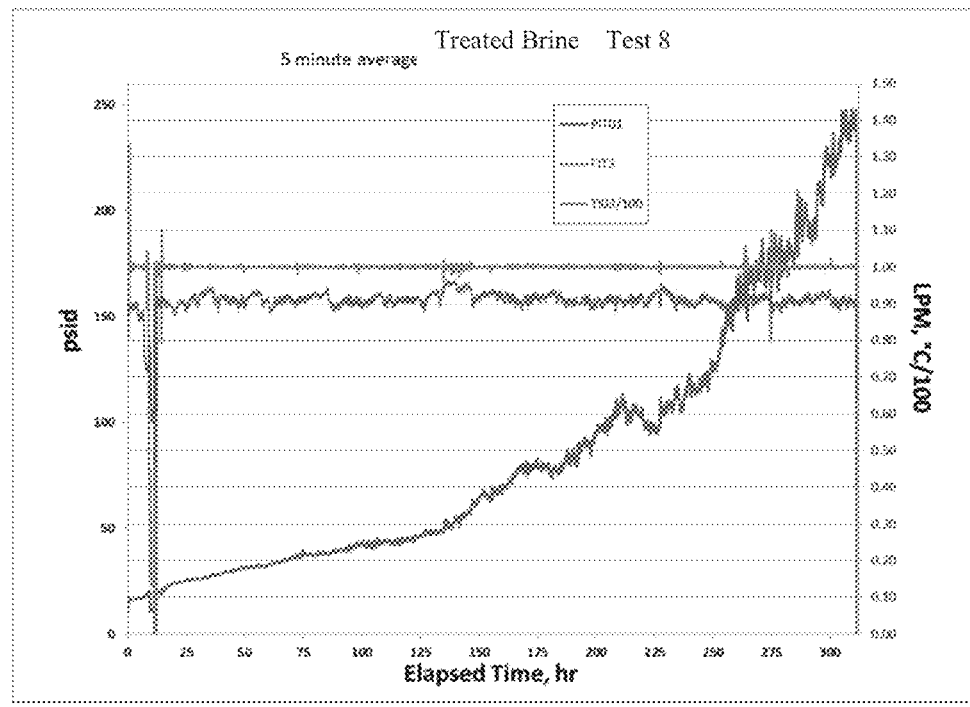
FIG. 20 is a graph showing the packed bed differential pressure versus time for a treated brine.

Comparing the differential pressure profiles from FIGS. 12, 13, and 14 against the differential pressure profiles from FIGS. 14, 15, and 16, the 50:50 brine blend run times were equal or better than the untreated brine, which shows that the blend is not likely to cause scaling problems as quickly as untreated brine. The longest run times were observed with the treated brine as shown in FIGS. 18, 19, and 20, which ran long enough that two of the runs were terminated at two weeks. The maximum potential run time for treated brine, Test 2, FIG. 18, is not known, but an extrapolation of the trend shows it may have been as long as 6 weeks. The long run time of the treated brine is likely due to the lack of iron and silica in the brine solution. Thus, injection of treated brine appears to give the best outcome for injectivity and long term well permeability.

As shown in Table 4, the differences between the treated and untreated brines were the almost total removal of Fe, Si, and As, the significant reduction in Li, Ba, $SO_4$, F, and Pb concentrations, and the increase in pH, oxygen concentration, and ORP in the treated brine relative to the untreated brine. Removal of Fe, Si, As, reduction in Pb concentration, increase in pH, oxygen, and ORP result from the silica management process. Removal/reduction of Li is due to the lithium extraction process. Reduction in Ba, $SO_4$, and F concentrations was due to $BaSO_4$ and $CaF_2$ precipitation during the silica management process. Since Fe and Si are major scaling components, the ultimate impact of the brine treatment process on brine chemistry will reduce the scaling potential of the depleted brine and improve injectivity.

TABLE 4

| Analyte | Treated brine relative to untreated brine |
|---|---|
| Temperature | −15-20° C. |
| pH | +0.8 units |

TABLE 4-continued

| Analyte | Treated brine relative to untreated brine |
|---|---|
| ORP | +300 to 500 mV |
| Ca | −3% |
| Fe | −100% |
| Si | −97% |
| Li | −90% |
| As | −100% |
| Pb | −30%-50% |
| Ba | −60% |
| $SO_4$ | −55% |

The chemistry of the brines were measured before and after residence time in the packed bed and blending in the HUV, to ensure that no major chemical reactions were taking place during the packed bed testing. A significant reaction would deplete the brine in one or more elements.

Figure 21:
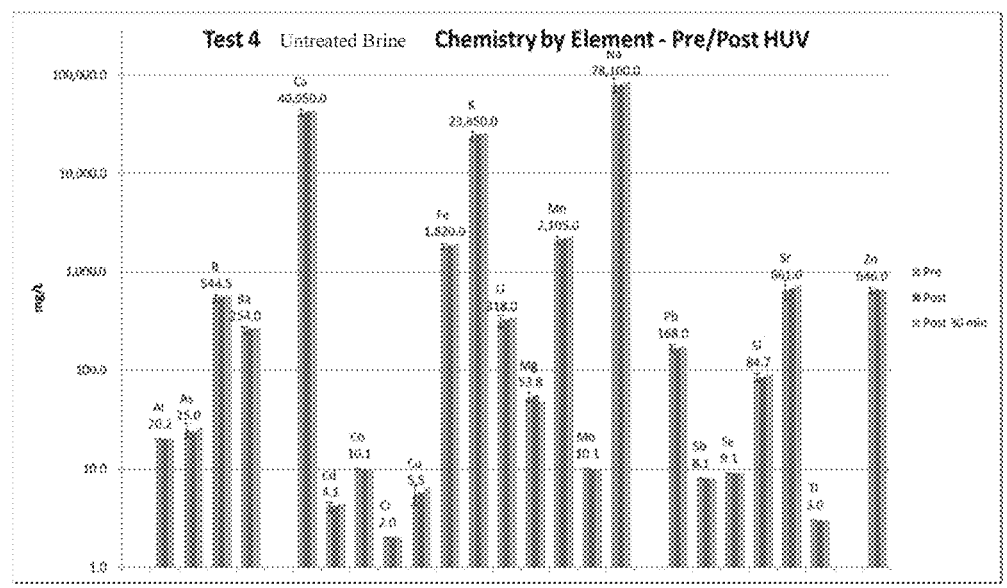
FIG. 21 shows the chemistry of an untreated brine before and after packed bed testing.

In FIGS. 21 through 25, the first column of each element shows the brine chemistry as it entered the HUV, the second column of each element shows the brine chemistry as it exited the HUV, and the third column shows the brine chemistry of a sample pulled 30 minutes from the post-HUV sample. The chemistry of Test 1 (untreated brine) was not measured, as it terminated sooner than expected, before chemical samples could be taken. However, Test 4 is a repeat of the same test and the results are shown in FIG. 21, and due to the consistency seen in the brines it is believed that Test 1 would yield similar results.

Figure 22:
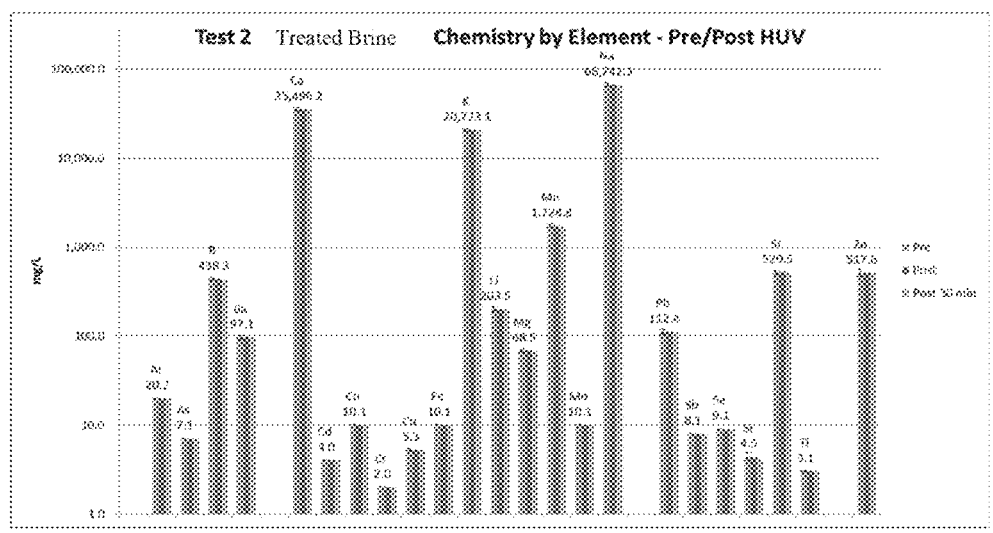
FIG. 22 shows the chemistry of a treated brine before and after packed bed testing.
Figure 23:
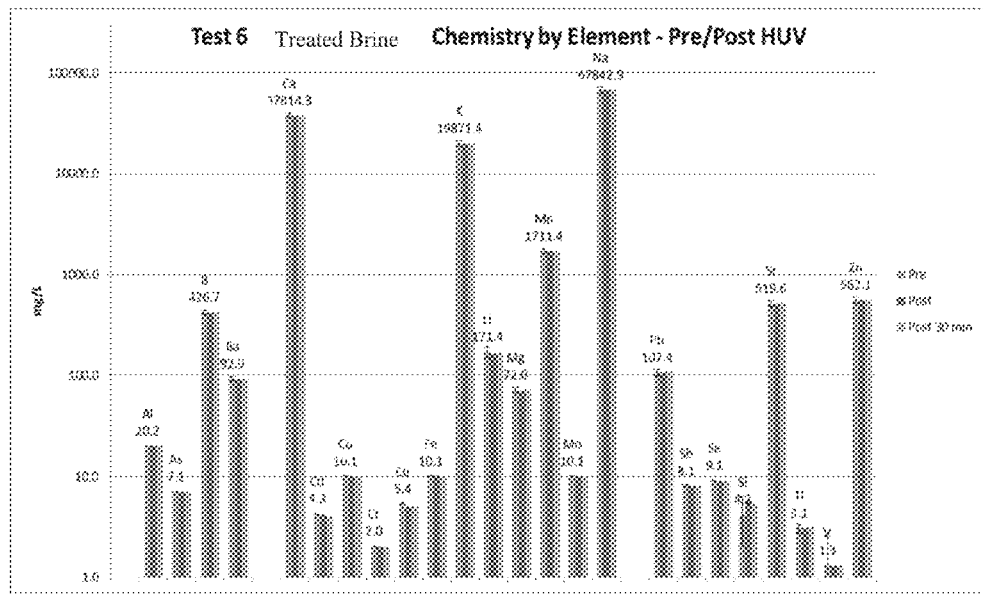
FIG. 23 shows the chemistry of a treated brine before and after packed bed testing.
Figure 24:
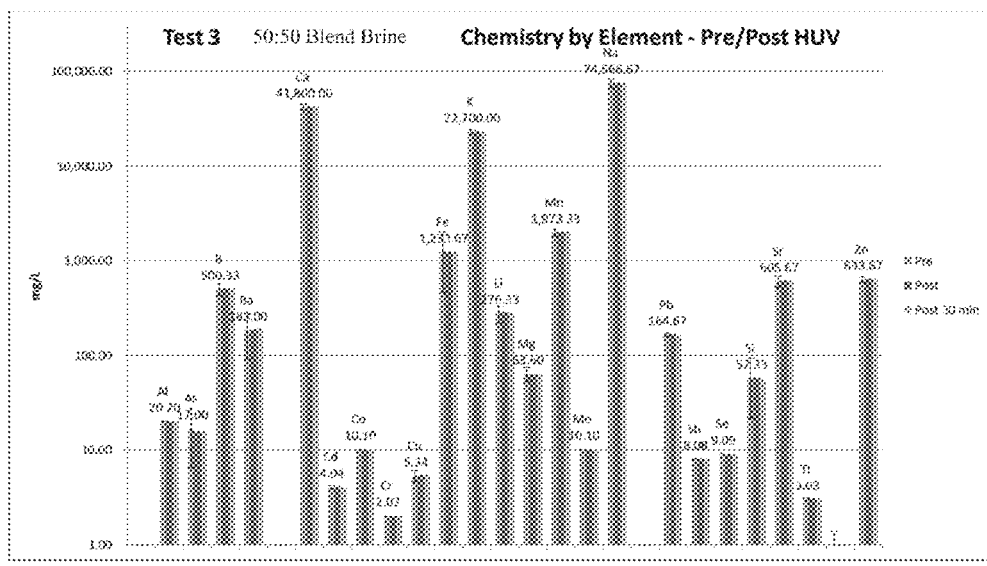
FIG. 24 shows the chemistry of a 50:50 blend brine before and after packed bed testing.
Figure 25:
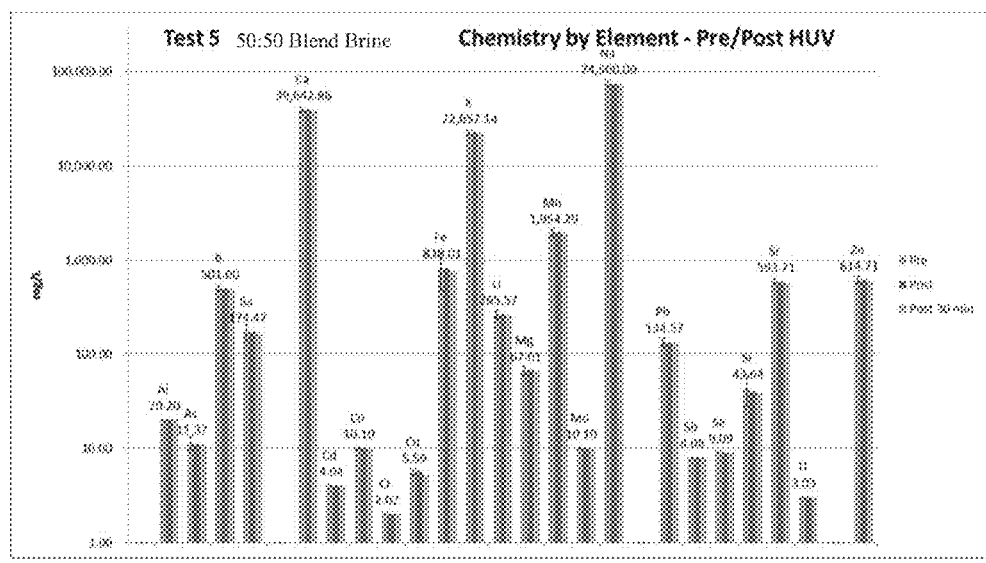
FIG. 25 shows the chemistry of a 50:50 blend brine before and after packed bed testing.

As shown in FIGS. 22 and 23 for treated brines and in FIGS. 24 and 25 for 50:50 blend brines, it was observed in almost every case that any change in the pre- and post-HUV levels was small, and within the normal sample variation. The implication of this result is that the chemistry of the brine is stable during testing, and that there are no major chemical reactions for precipitation reactions that effect brine chemistry in the packed bed. Even in the 50:50 blend brine (FIGS. 24 and 25), there were no significant differences before and after the HUV. The 50:50 blend brine does show more variability, likely due to a small amount of Fe oxidation that also precipitates Si. Typical pH of the tested brines are shown in Table 5.

TABLE 5

|  | Untreated Brine | Treated Brine | 50:50 Blend |
|---|---|---|---|
| Average pH | 4.61 | 5.67 | 5.20 |
| Std. Dev. | 0.23 | 0.27 | 0.09 |
| Samples | 20 | 34 | 9 |

To evaluate the scale, cut sections of the packed beds from Tests 1 through 5 were submitted for petrologic (mineralogical) evaluation of solids precipitated or trapped during packed bed testing. Scanning electron microscopy and X-ray diffraction analyses were conducted to characterize the chemical deposits and suspended solids that were trapped in the rock matrix. A sample of the unexposed matrix material was also provided in order to compare the fine solids with the original rock material.

Detailed SEM analyses of the scale and fine particles from the five tests show a variety of textures and particle morphologies. Associated spot elemental analyses reveal the composition of each type of fine material. The dominant type of fine material consisted of dark green-colored, amorphous iron silicate with subtle variations based on texture and elemental composition. FIGS. 26 through 31 show low and high magnification SEM images from the testing of untreated, treated and 50:50 blend brines.

Figure 26:
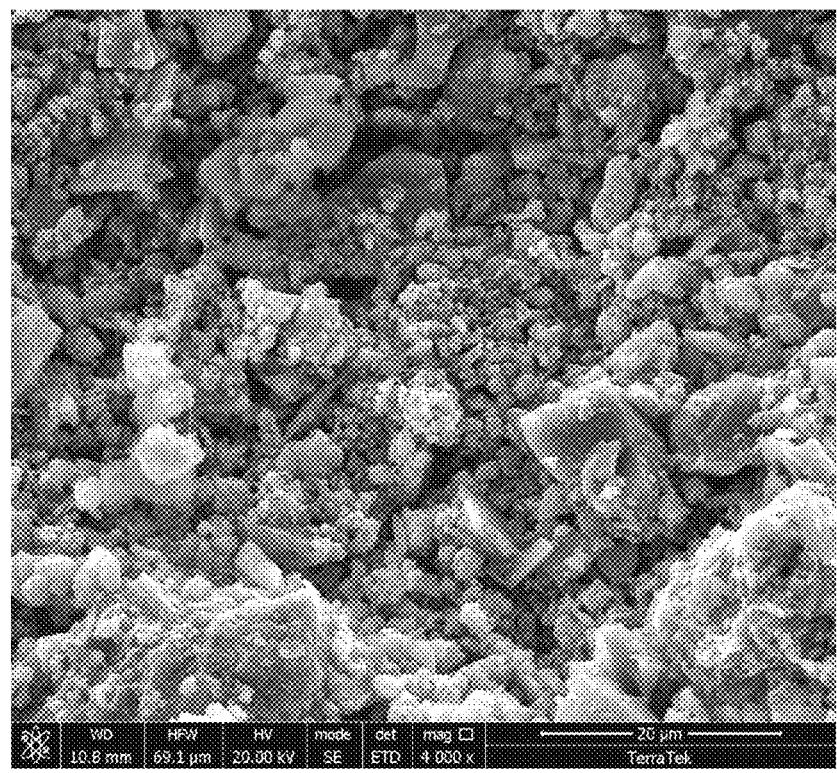
FIG. 26 shows a SEM image from a packed bed test of untreated brine.
Figure 27:
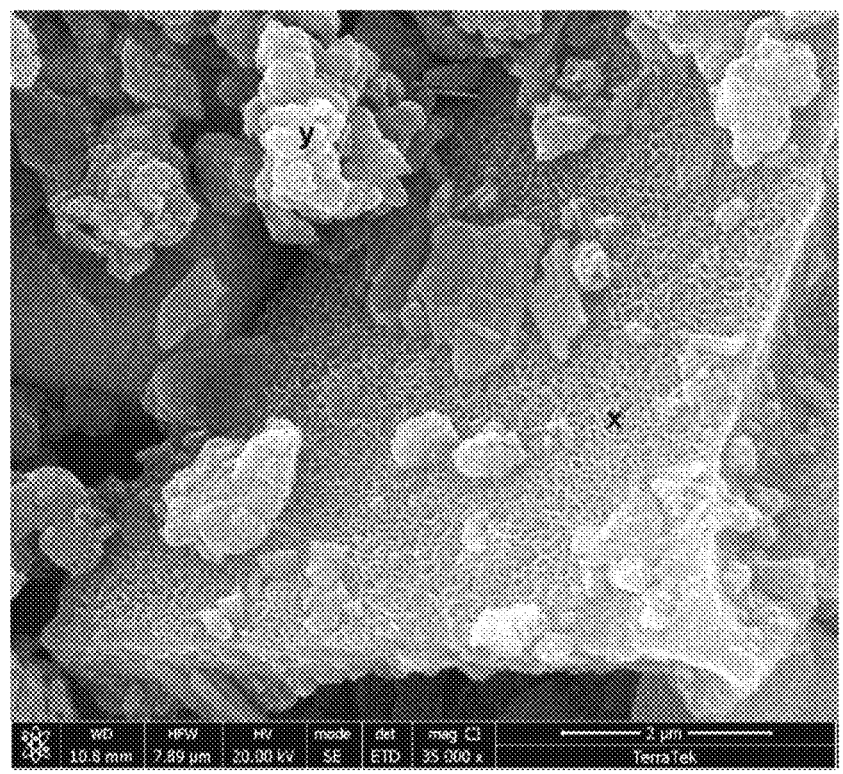
FIG. 27 shows a SEM image from a packed bed test of untreated brine.

FIGS. 26 and 27 show low and high magnification SEM images from the testing of untreated brines. The untreated brine used in Tests 1 and 4, showed smooth, botryoidal (globular textured) particles composed of relatively pure iron silicate. More crumbly, rough-textured, or fuzzy aggregates were composed of iron silicate with minor calcium and aluminum. In places, more flaky or webby-textured surfaces were composed of iron silicate with potassium, aluminum, and calcium. This material could possibly represent a smectite-like clay.

Figure 28:
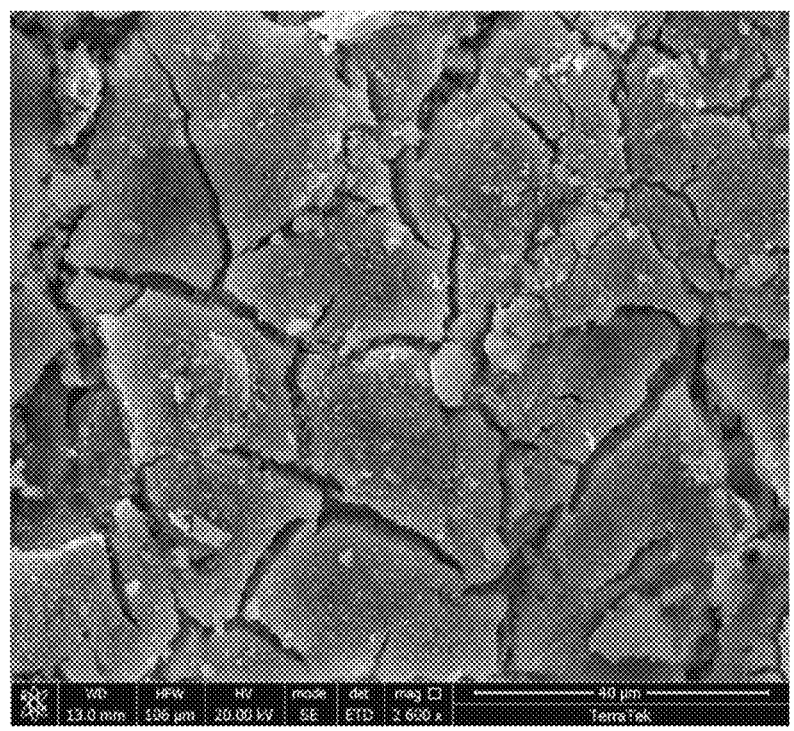
FIG. 28 shows a SEM image from a packed bed test of treated brine.
Figure 29:
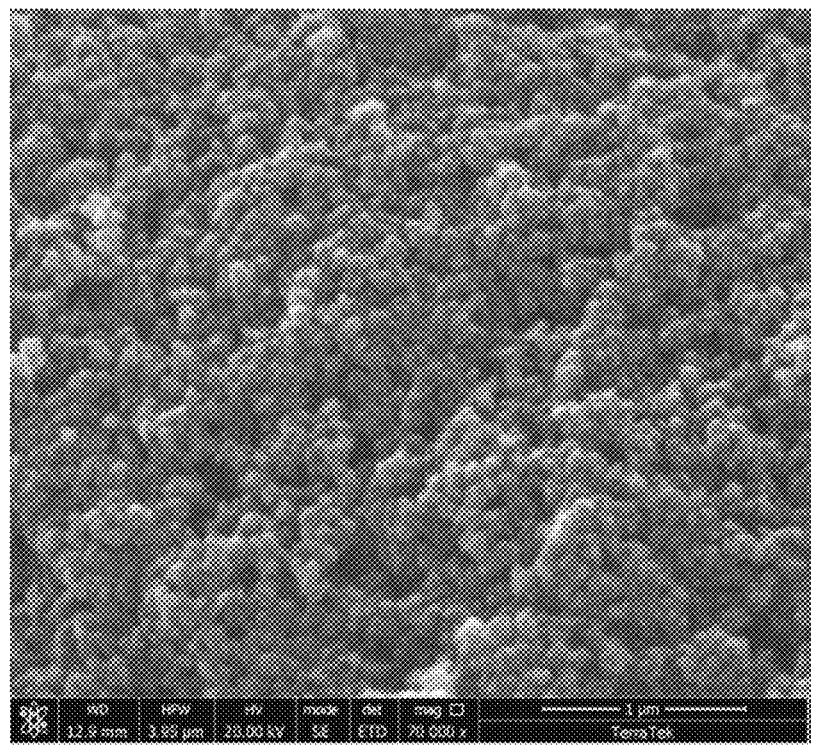
FIG. 29 shows a SEM image from a packed bed test of treated brine.

FIGS. 28 and 29 show low and high magnification SEM images from the testing of treated brines. The treated brine used in Test 2 formed a fine, cracked crust composed of dehydrated iron oxyhydroxide with manganese, chromium, and minor silica. In places, trace amounts of nickel and zinc were also present in the Fe—Mn oxyhydroxide. The Fe—Mn oxyhydroxide formed a thin brown coating on the drill cuttings.

Figure 30:
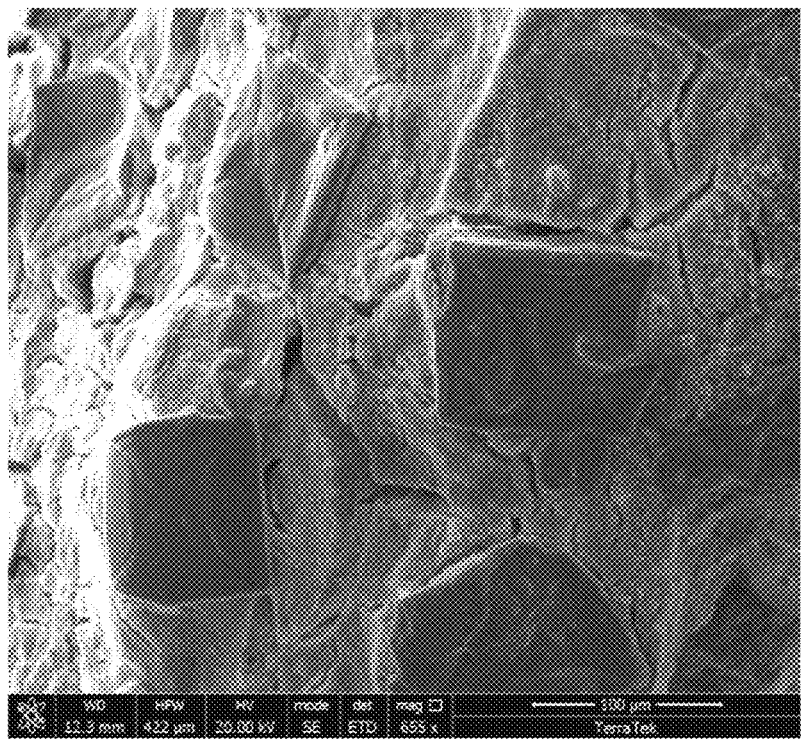
FIG. 30 shows a SEM image from a packed bed test of a 50:50 blend brine.
Figure 31:
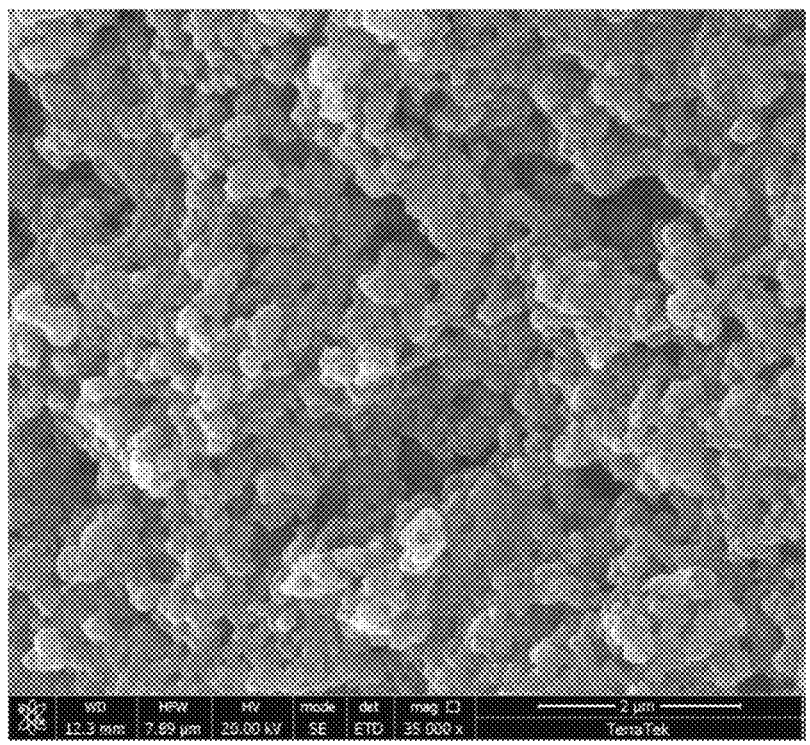
FIG. 31 shows a SEM image from a packed bed test of a 50:50 blend brine.

FIGS. 30 and 31 show low and high magnification STEM images from the testing of 50:50 blend brines. The 50:50 blend brine used in Tests 3 and 5 formed Fe and NaCl deposits in a fine solid form. These were submicron-sized crumbly deposits. The iron chloride had a consistent composition with minor calcium and potassium. Spot analyses also consistently showed minor silica with the iron chloride and it was difficult to determine whether this was one compound (such as eltyubyuite) or an iron-calcium-potassium chloride admixed with opaline silica. XRD analyses indicated minor amounts of opal-A in these two samples. Based on how the chloride crystals in the sample were intermixed with the other scale material, it was possible that the chlorides had precipitated out of solutions during mixing and reaction. This was likely due to the lower temperature of the treated brine when it mixes with the untreated brine. In a real injectivity situation, the temperatures of injectivity will be higher and this will keep the chlorides in solution.

A material of interest from the packed bed tests was the small scale particles and chemical deposits attached to the rock chip matrix. If the total rock sample was used, the rock matrix would dilute the scale minerals in the sample, rendering them too dilute to be identifiable in the XRD scans. Therefore, the small-scale particles were washed from the matrix rock and concentrated to more accurately measure the mineralogy and composition of the scale.

A summary of the separated packed bed tube scale is shown in Table 6. Other than halite (Nag) precipitated in the 50:50 blend in Tests 3 and 5, all of the major crystalline material in the XRD patterns was attributed to minerals from the rock fragments in the drill cuttings. Other than trace to minor amounts of crystalline iron oxides (magnetite, maghemite) and iron oxyhydroxides (goethite, akaganeite), most of the chemical deposits appeared to be amorphous or too poorly crystalline to diffract the X-rays.

TABLE 6

XRD Mineralogy Relative Wt %

| SAMPLE ID | Salton Sea Drill Cuttings | Test #1 | Test #2 | Test #3 | Test #4 | Test #5 |
|---|---|---|---|---|---|---|
| Quartz | 63 | 31 | 41 | 0 | 7 | 17 |
| Plagioclase | 15 | 14 | 11 | 1 | 0 | 8 |
| K-Feldspar | 5 | 5 | 8 | 2 | 1 | 3 |
| Calcite | 2 | 2 | 0 | 0 | 0 | 1 |
| Dolomite | 1 | 0 | 0 | 0 | 0 | 0 |
| Ankerite | 1 | 0 | 0 | 0 | 0 | 0 |
| Epidote | 5 | 11 | 7 | 30 | 2 | 6 |
| Barite | 0 | 0 | 1 | 0 | 0 | 0 |
| Pyrite | 0 | 0 | 0 | 0 | 0 | 0 |
| Magnetite | 0 | 1 | 6 | 1 | 4 | 2 |
| Maghemite | 0 | 2 | 0 | 0 | 3 | 1 |
| Geothite | 0 | 0 | 0 | 0 | 3 | 0 |
| Akaganeite | 0 | 0 | 1 | 0 | 0 | 3 |
| Halite | 0 | 0 | 0 | 38 | 0 | 14 |
| Total (Non-Clay) | 91 | 66 | 74 | 71 | 20 | 55 |
| Illite + Mica | 0 | 0 | 4 | 9 | 12 | 11 |
| Mixed-Layer Illite-Smectite | 0 | 0 | 0 | 0 | 0 | 0 |
| Chlorite | 8 | 11 | 22 | 1 | 4 | 18 |
| Total (Clay) | 9 | 11 | 27 | 10 | 16 | 29 |
| Total (Crystalline Material) | 100 | 76 | 100 | 81 | 36 | 84 |
| Amorphous (Opal-A) | 0 | 24 | 0 | 19 | 64 | 16 |
| GRAND TOTAL (Crystalline and Opal-A) | 100 | 100 | 100 | 100 | 100 | 100 |

A summary of the clay fines from the packed tube scale is shown in Table 7. The dominant clay material was fine mica, which was likely a component of the drill cuttings matrix.

TABLE 7

Clay XRD Mineralogy (<4 micron size fraction, Relative Wt %)

| SAMPLE ID | Rock chips | Test #1 | Test #2 | Test #3 | Test #4 | Test #5 |
|---|---|---|---|---|---|---|
| % Expandability of I/S clay (smectite interlayers) | 25 | 0 | 35 | 10 | 0 | 0 |
| Mica | 26 | 67 | 31 | 35 | 71 | 44 |
| Mixed-Layer Illite-Smectite (I/S) | 13 | 0 | 23 | 39 | 0 | 0 |
| Kaolinite | 0 | 0 | 0 | 0 | 0 | 18 |
| Chlorite | 61 | 33 | 46 | 26 | 29 | 38 |
| TOTAL | 100 | 100 | 100 | 100 | 100 | 100 |

Total suspended solids is also an important parameter of the brine compatibility testing. The treated brine had lower TSS values than the untreated brine, and even the 50:50 blend brines had less than or equal TSS to the untreated brine.

Figure 32:
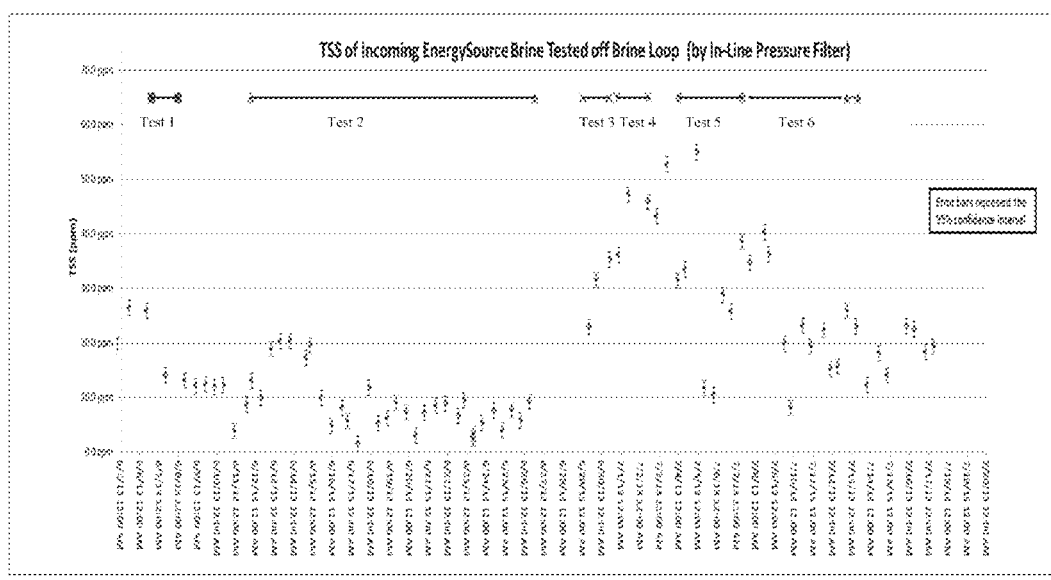
FIG. 32 shows TSS by in-line pressure filter of untreated, treated, and 50:50 blend brines.

The TSS of the untreated brine was measured using an accurate in-line method throughout the series for tests. Those values are shown in FIG. 32. The data showed that the TSS of the untreated brine average was about 20 ppm, but it was variable, and sometimes reached 50 ppm.

Figure 33:
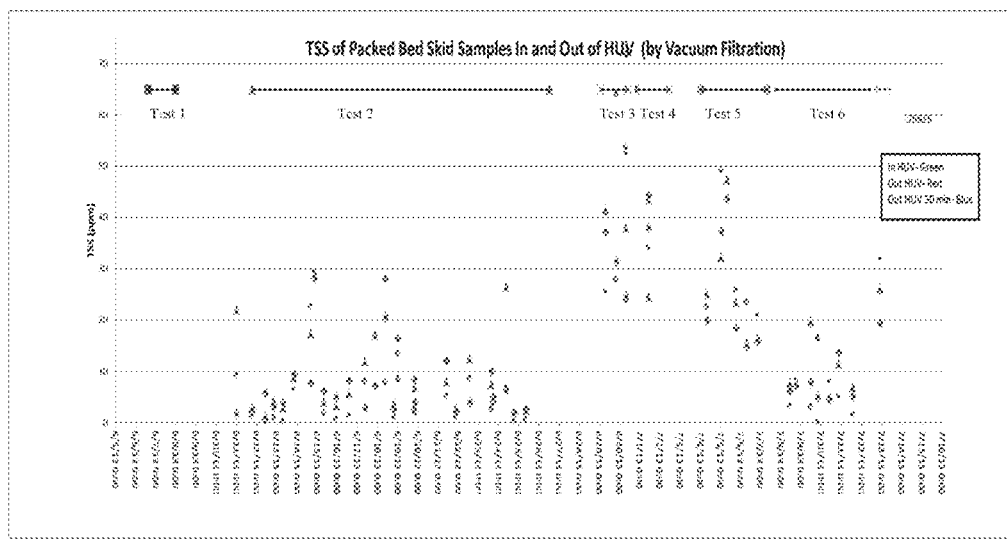
FIG. 33 shows TSS by vacuum filtration of untreated, treated, and 50:50 blend brines.

The TSS were also measured on the brines used for packed bed testing, before and after the HUV using a vacuum filtration method. The values are shown in FIG. 33. As expected, the treated brines possessed a low TSS due to the lack of scaling components and filtration during processing. The untreated brine and the 50:50 blend brine showed higher TSS, at a similar range of values.

Figure 34:
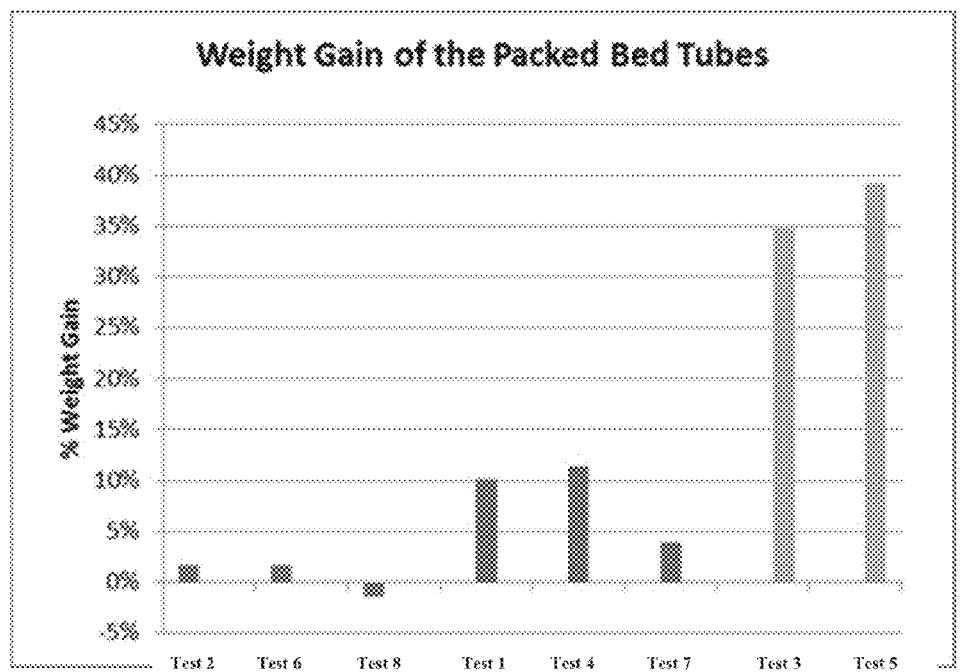
FIG. 34 shows the weight gain of packed bed tubes after the processing of untreated, treated, and 50:50 blend brines.
Figure 35:
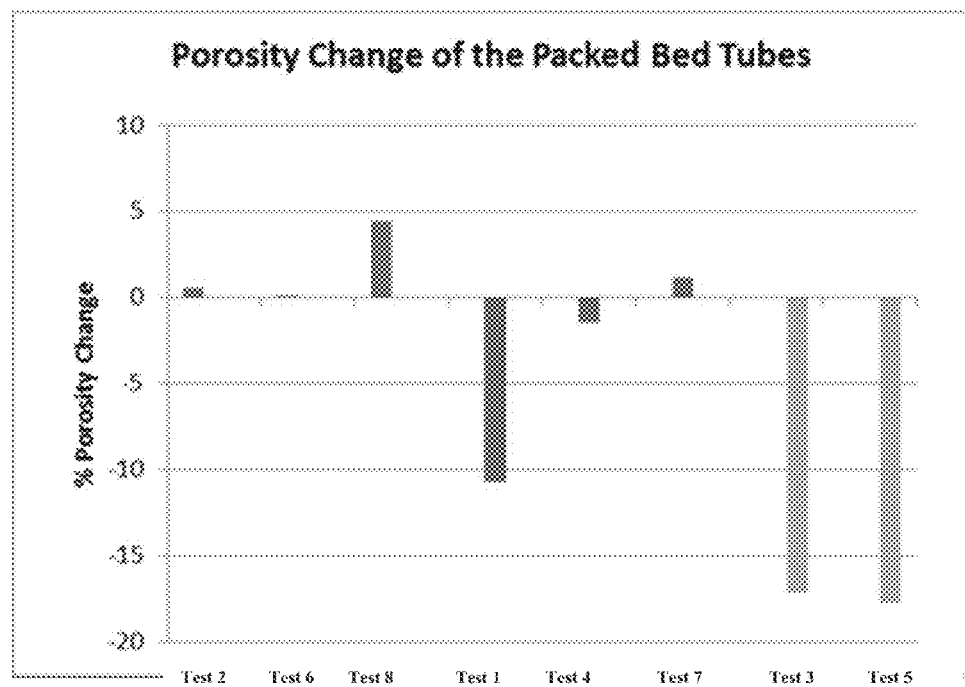
FIG. 35 shows the porosity change of packed bed tubes after the processing of untreated, treated, and 50:50 blend brines.

Shown in FIGS. 34 and 35 are the results of the treated brine (Tests 2, 6, and 8), untreated brine (Tests 1, 4, and 7), and 50:50 brine blends (Tests 3 and 5) analysis for percent weight gain and residual bulk porosity.

The 50:50 blend brines performed equal to or better than the untreated brine in packed bed simulated well testing. This suggests that there are no major compatibility or reaction issues, and that reservoir permeability would not be any worse than the untreated brine.

In addition, treated brine performed far better on the packed bed permeability testing than any other brine or brine blend tested. This is likely due to the lack of scaling compounds in the treated brine, along with a lower TSS value. The results suggests that an injection fluid of 100% treated brine will have the best injectivity and permeability performance than any other brine tested.

One improvement that can be made to the 50:50 blend brine, that may make it perform even better, is to provide dilution water or maintain high temperature to prevent halite (NaCl) from coming out of solution before injection.

Example 7

Preparation of Treated Geothermal Brine Compositions with Reduced Concentrations of Iron and Silica In another example, four 20 L plastic pails of geothermal brine from the Salton Sea, Calif. that were subjected to silica processing, were transferred to the reactor. The combined sample was agitated at 80° C. for 4 hours and then samples were collected for an elemental analysis. Table 8 shows concentrations of various elements in samples of the geothermal brine samples.

TABLE 8

| Element analyzed | Concentration in Sample 1 mg/L | Concentration in Sample 2 mg/L |
| --- | --- | --- |
| Arsenic | <3 | <3 |
| Barium | 42 | 44 |
| Iron | 1900 | 1900 |
| Lithium | 310 | 309 |
| Lead | 130 | 130 |
| Silicon | 30 | 30 |

A laboratory scale stage 1 precipitation was conducted on a sample of the adjusted geothermal brine. The brine was sparged with air for 20 minutes, and then approximately 70% of the required lime was added to the reaction solution. The balance of the lime was added over the next 20 minute period. The reaction was conducted for a total time of 150 minutes. During the reaction period, kinetic samples were collected at set reaction times. At the end of the reaction period the slurry was processed in the standard manner. The Oxidation Reduction Potential of the solution after 20 minutes of air sparging was 200 mV. The solution pH value was 3.0. The solution concentrations for iron and silica were plotted against elapsed reaction time in FIG. 34. Approximately 98% of the silica precipitated and the final silica concentration was reduced to 6 mg/L after 65 minutes. The iron was removed by about 65% of the Fe precipitated and the final Fe solution concentration was 940 mg/L.

Example 8

Preparation of Larger Scale Treated Geothermal Brine Compositions with Reduced Concentrations of Iron and Silica In another example, about 69 liters of adjusted geothermal brine was subjected to processing on a larger scale. An insulated double walled polypropylene reactor (~80 L) was equipped with a polycarbonate lid that had multiple access ports for the various pieces of equipment and instrumentation. The overall reaction as observed at about 81° C., following initial sparging time of 40 minutes with an airflow of 2.25 L/min. About 84 g of dry lime was added. The Si and Fe solution concentrations are plotted against reaction time in FIG. 35. Some of the initial and final test conditions for the bulk test are summarized in Table 9.

TABLE 9

| Condition | Initial Reading | Final Reading |
| --- | --- | --- |
| pH | 4.43 | 5.33 |
| ORP, mV | −14 | −293 |

Figure 36:
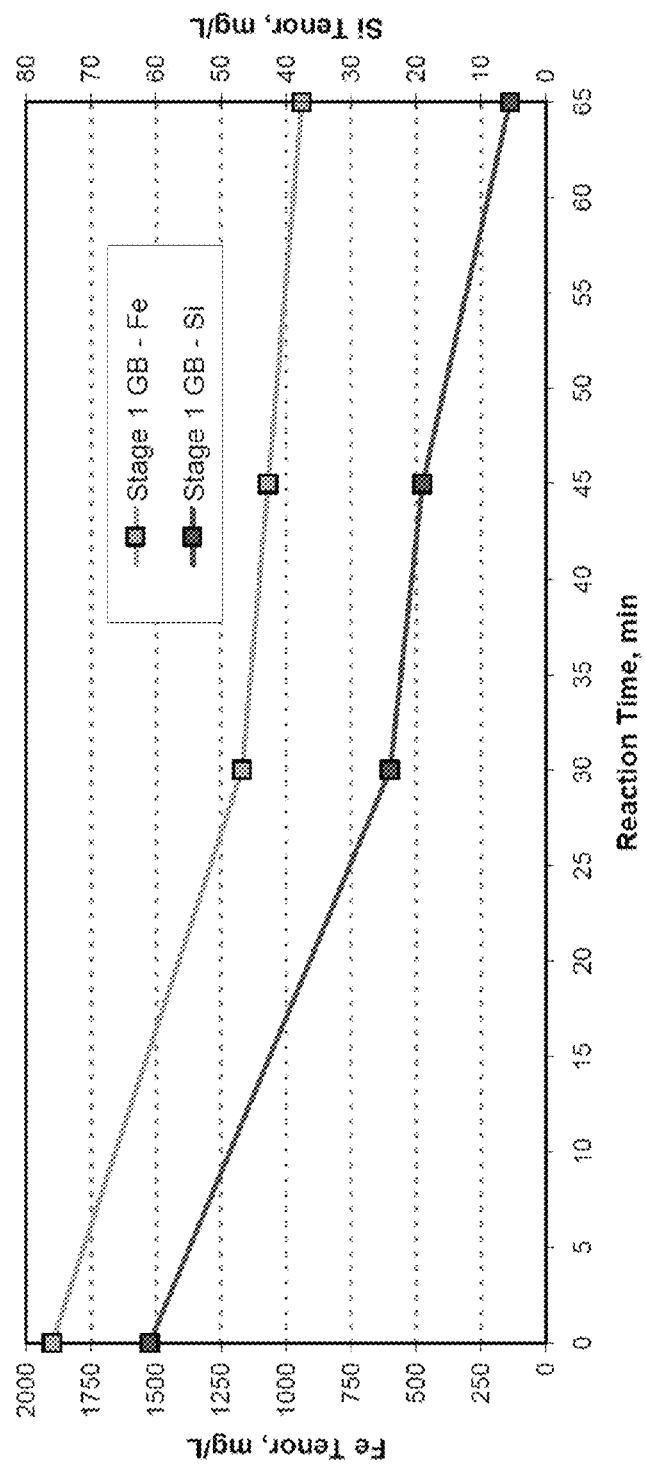
FIG. 36 shows the concentration of iron and silica in an exemplary treated brine composition as a function of time during the silica management process.

Analysis of the data from this experiment revealed that there was insufficient mixing of the solution that resulted in poor suspensions of the initial contained solids. As the reaction progressed, the majority of these solids dissolved and released iron and silica to solution. The silica concentration was reduced to below 10 mg/L and iron was removed to about 900 mg/L. Changes in the air sparging period or changes in the air flow to the system were made to increase the iron removal. The filtrate from the reactor was subjected to further processing at a temperature of about 95° C. Air was sparged into the system for about 20 minutes and then lime was added and the pH constantly monitored. Air sparging continued. The iron concentration at pH 6.0 was below 50 mg/L and, therefore, the reaction was stopped and the reaction slurry was processed. The Si and Fe solution concentrations were plotted against reaction time in FIG. 36. These experiments revealed that by changing the conditions of the treatment, one could achieve the desired levels of iron and silica removal from the geothermal brine.

Example 9

Preparation of Treated Geothermal Brine Compositions with Reduced Concentrations of Iron and Silica from Brine Treatment at a Physical Plant Producing treated brines with reduced silica and iron concentration minimizes the problems downstream during extraction of minerals like zinc and lithium from the treated brine. As discussed herein, the restating brines with reduced silica and iron concentration is much less likely to damage the injection wells, because all major scale-producing elements have been removed.

The methods and systems described herein were deployed for silica management of geothermal brine at two different physical plants. One physical plant included three rectangular continuously stirred tank reactors for iron (II) oxidation and iron (III) oxyhydroxide precipitation, and an inclined plate (lamella) clarifier for initial solid/liquid separation. Another physical plant included two cylindrical continuously stirred tank reactors and a cylindrical conventional rake-style clarifier. The second plant also implemented an improved air-sparging/agitation system for more efficient iron (II) oxidation. Because of the decrease in number of reactors, and the increased sparging efficiency, the total residence time in the reactor train could be reduced by a factor of 3. The switch to a conventional clarifier was made in part to minimize manual operations related to cleaning the clarifier lamella of sticky solids, and partly to provide data for a clarifier design that was suitable for scale up to commercial size.

Operations using the three-reactor physical plant included feeding brine from a geothermal energy producer at a specified rate between 3-6 gpm. Operational set points (pH, sparge rate, agitation) for the three reactors were adjusted following the experimental observation from pilot studies. Flocculant was added initially to the clarifier based on batch flocculation tests, and adjusted as necessary to gain control of TSS in overflow. The proportion of underflow directed to recycle, and the recycle return point(s) were set as desired for the specific pilot campaign. Underflow advance was directed to the filter feed tank (or thickener), and then to pressure filter. Filtrate and thickener overflow were generally recycled back to the first reactor. Filter cake was periodically removed from the pressure filter and directed to waste.

Operations using the two-reactor physical plant were essentially similar. Table 10 shows a comparison of the sample operating conditions at the two plants.

slurry at a rate of about 0.5 lb/min., which raised the pH in the second reactor to between about 5.0 and 5.6. The addition of the lime slurry initiated the precipitation of iron (III) hydroxide and iron silicate. The geothermal brine, which included precipitates of iron (III) hydroxide or iron oxyhydroxide and iron silicate, was then supplied from the second vessel 1110 to clarifier 1146 via line 1144. An aqueous flocculant solution of Magnafloc 351, in a concentration between about 0.005% and 1% by weight, such as about 0.025% by weight, was prepared by supplying solid flocculent 1124 via line 1126 to flocculant tank 1128, where the solid was contacted with water 1120 supplied via line 1122. The aqueous flocculant solution was supplied to clarifier vessel 1146 via line 1138 at a rate of about 0.01 gpm.

Two streams were produced from clarifier 1146. First clarifier product stream 1148 included the geothermal brine having a reduced concentration of silica and iron, and was supplied to a secondary process, such as lithium recovery. Second clarifier product stream 1150 included solid silica-iron waste, as well as some geothermal brine. The brine was

TABLE 10

| Plant | Residence time at nominal 5 gpm, min | Feed/inlet/outlet | Agitation | Sparging | Clarifier | Recycle |
|---|---|---|---|---|---|---|
| 3-reactor plant | 120 | Inlet feed was pump controlled; advance flow via gravity. Horizontal input near tank bottom below agitator blade. Horizontal output near tank top. | Variable speed; single impeller | Sparging via perforated square U-tube at bottom of tank | Inclined plate with integral flash tank and floc chambers | Recycle underflow to R-1 and R-2 |
| 2-reactor plant | 40 or 20 depending on position of outflow | Inlet feed is pump controlled; advance flow via gravity. Vertical input at tank bottom; mixed with sparge air. Two side outlet ports; upper yields 40 minute residence time; lower yields 20 minute residence time at 5 gpm. | Variable speed; dual impeller; lower was 8" Rushton blade; upper was 8" pitched blade | Sparging via air injection into brine feeds at tank bottom | Cylindrical with rake and separate floc mixing tank | Recycle underflow to R-1 only |

Previous studies indicate that at ~110° C. the concentration of dissolved silica in Salton Sea geothermal brine coming out of a crystallizer clarifier is ~116 ppm. The feed brine composition varied depending on variations in the geothermal brine and in the operations of the geothermal energy producer. For example without limitations, the variations could arise from changes in dilution water added to the brine, or from operations related to their flashing and subsequent processing.

In an exemplary set-up, similar to that shown in FIG. 6, geothermal brine was subjected to a continuous process for the management of silica. Silica management system 1106 was carried out using two stirred vessels 1108 and 1110 provided in series. To first reactor 1108 a geothermal brine was supplied via line 1104 having an iron content of approximately 1500 ppm and a silica, content of about 160 ppm. The brine is added at a rate of about 6 gpm. Approximately 30 cfm of air was supplied via line 1140 to each reactors 1108 and 1110, and was sparged through the geothermal brine. The operating temperature was approximately about 90 to 95° C. in reactor 1 and 85 to 90° C. in reactor 2.

After the addition of the air via line 1140' to first reactor 1108, the pH dropped and was around approximately about pH 4.8 to 5.4. Air was added to second reactor 1110 via line 1140" at a rate of about 30 cfm and a charge of approximately 10-25% by weight of an aqueous calcium oxide sampled between reactors 1108 (Reactor 1) and after 1110 (Reactor 2) before as well as after the clarifier 1146 (clarifier overflow).

Table 11 shows the concentration of iron and silica after silica management through the first reactor and after the second reactor in a physical plant. Based on analysis of the data collected, the iron concentration ranged from about 200 mg/L to 1000 mg/L, while the silicon concentration ranged from about 1 to 60 mg/L.

TABLE 11

| | Fe concentrations (mg/kg) | Si concentrations (mg/kg) |
|---|---|---|
| From Reactor 1 | | |
| Min | 168 | 1 |
| Max | 828 | 43 |
| Mode | 307 | 10 |
| Median | 335 | 13 |
| From Reactor 2 | | |
| Min | 180 | <1 |
| Max | 833 | 48 |
| Mode | 297 | 12 |
| Median | 261 | 14 |

Figure 37:
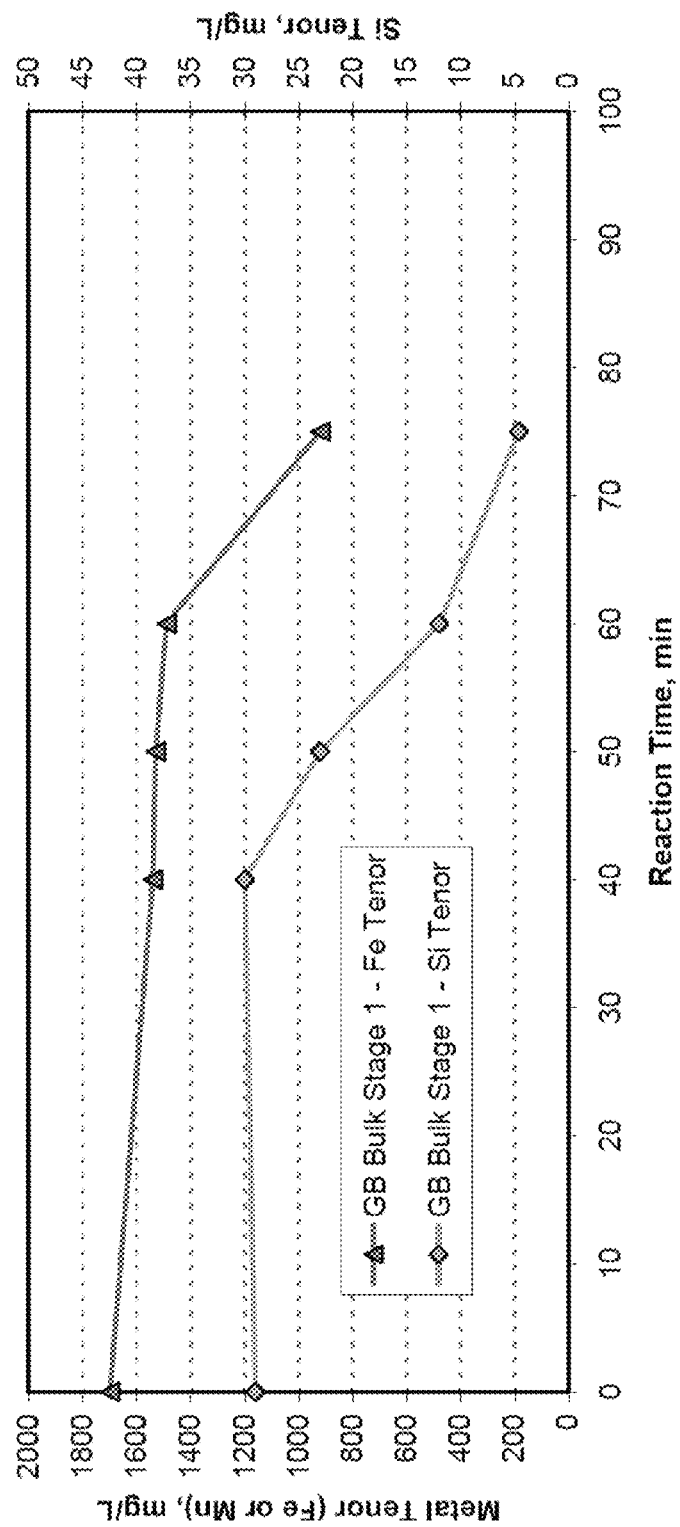
FIG. 37 shows the concentration of iron and silica in an exemplary treated brine composition as a function of time during the silica management process.

Samples were analyzed from the feed brine and from the clarifier overflow to determine the concentrations of silica and silicon. FIGS. 37A and 37B show the histograms of silicon (not $SiO_2$) concentrations in feed brine (FIG. 37A) and clarifier overflow (FIG. 37B). While the concentration of silicon in the feed brine ranged from 16-117 ppm, the mean and median silicon concentrations were both about 55 ppm. While the concentration of silicon in the treated brine from the clarifier ranged from 0-25 ppm, the mean and median silicon concentrations were both about 4 ppm. The $SiO_2$ concentration in the feed brine ranged from 32 to 250 ppm, with a mean and median of 118 ppm. The silica in the clarifier overflow ranged from 0.4 to 53 ppm, with a mean and median of 8.6 and 7.7 ppm, respectively. Hence, ~93% of the feed $SiO_2$ was removed by the silica management circuit.

Figure 39A:
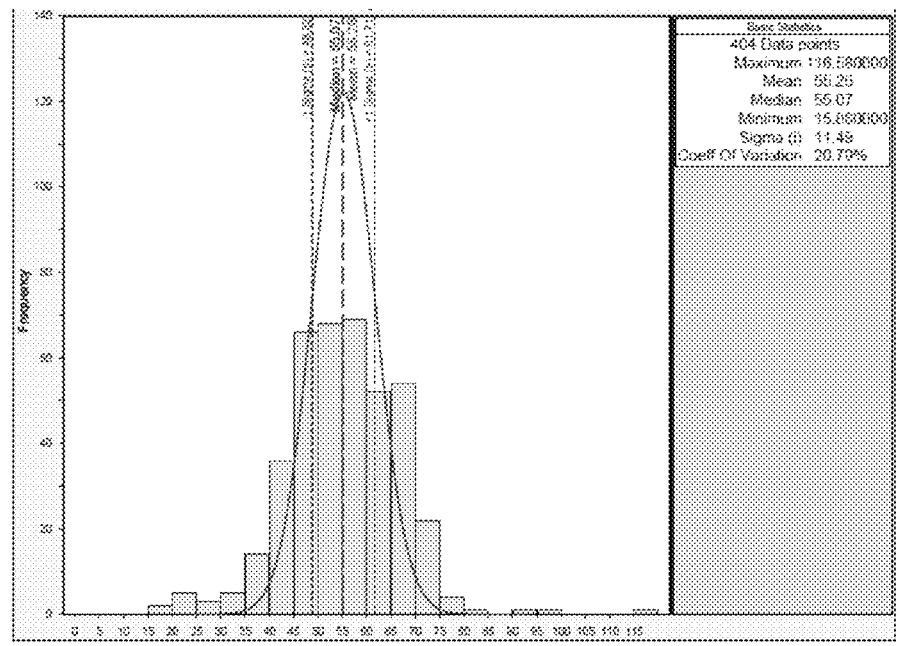
FIGS. 39A and 39B show histograms of silica concentrations in an exemplary treated brine composition during the silica management process.
Figure 39B:
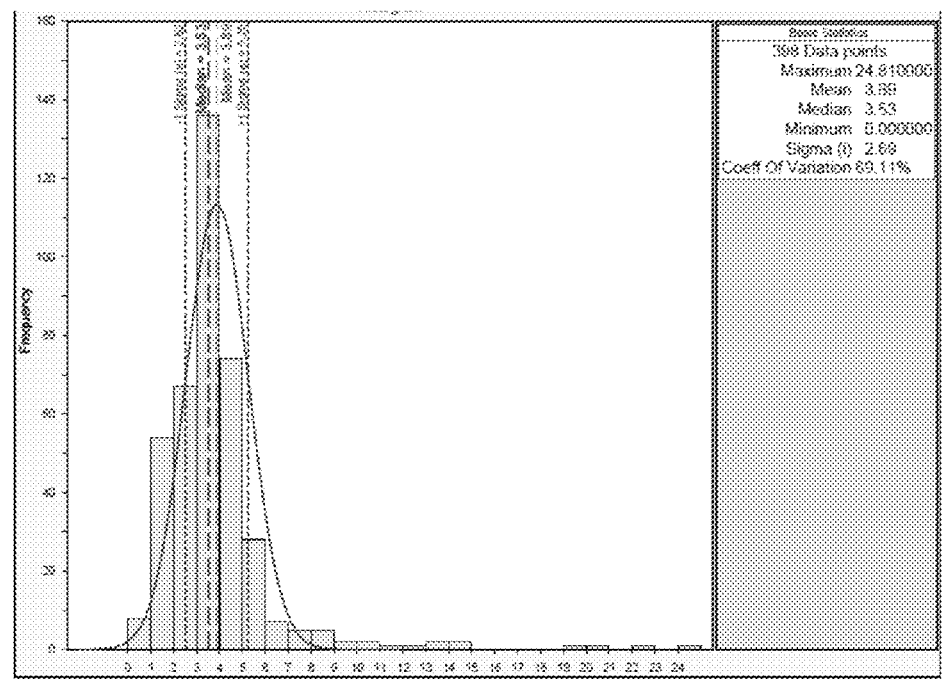

Samples were analyzed from the feed brine and from the clarifier overflow to determine the concentrations of iron. The histograms in FIGS. 39A and 39B illustrate the iron concentrations in feed brine (FIG. 39A) and clarifier overflow (FIG. 39B). While the concentration of iron in the feed brine ranged from 638-3830 ppm, the mean and median iron concentrations were both about 1600 ppm. While the concentration of iron in the treated brine from the clarifier ranged from 0-636 ppm, the mean and median iron concentrations were about 20 ppm and less than 1 ppm respectively.

Figure 38:
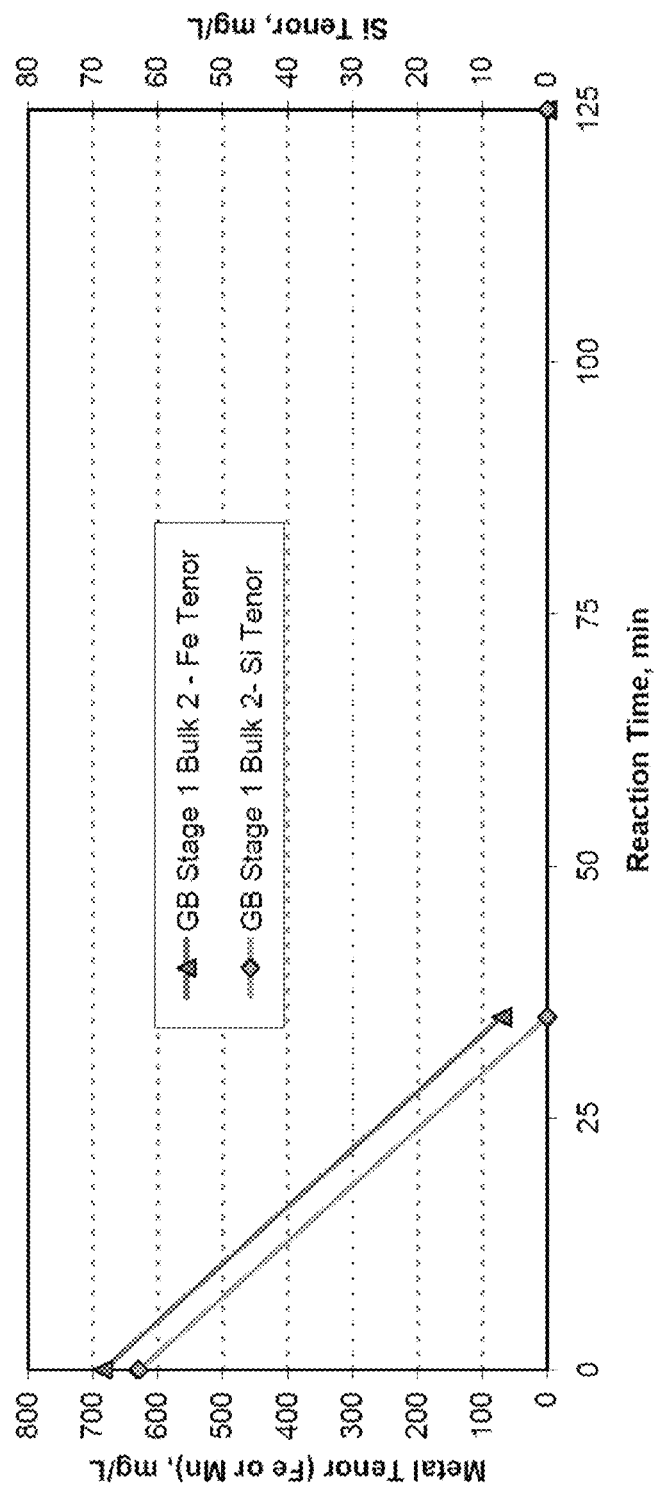
FIG. 38 shows the concentration of iron and silica in an exemplary treated brine composition as a function of time during the silica management process.
Figure 40A:
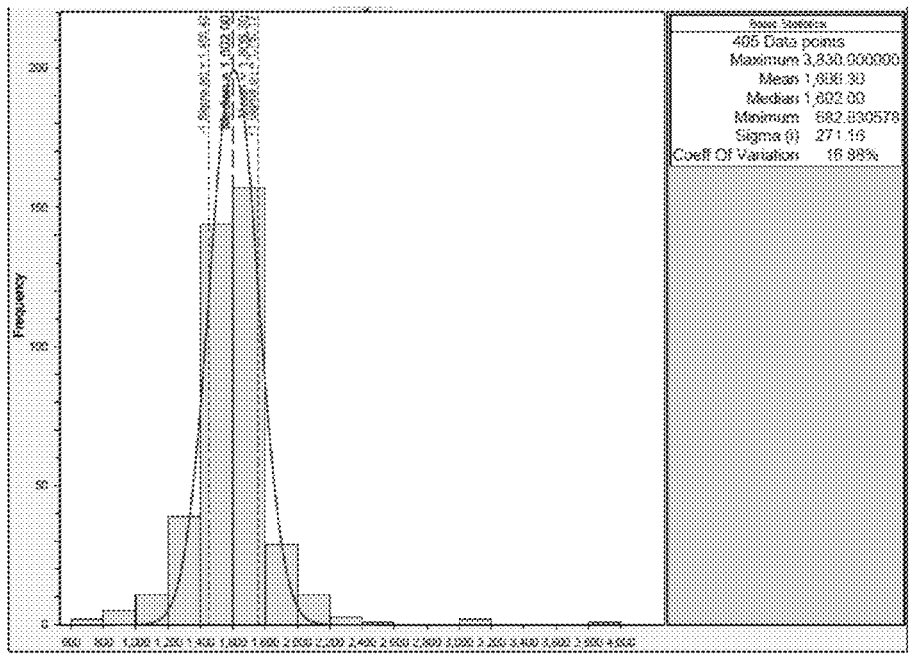
FIGS. 40A and 40B show histograms of iron concentrations in an exemplary treated brine composition during the silica management process.
Figure 40B:
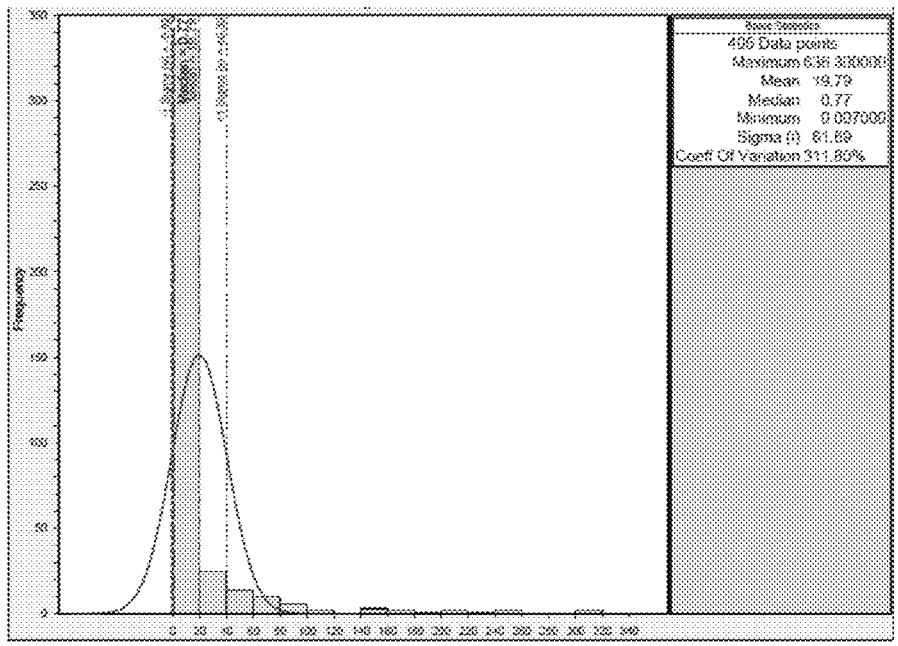
Figure 41A:
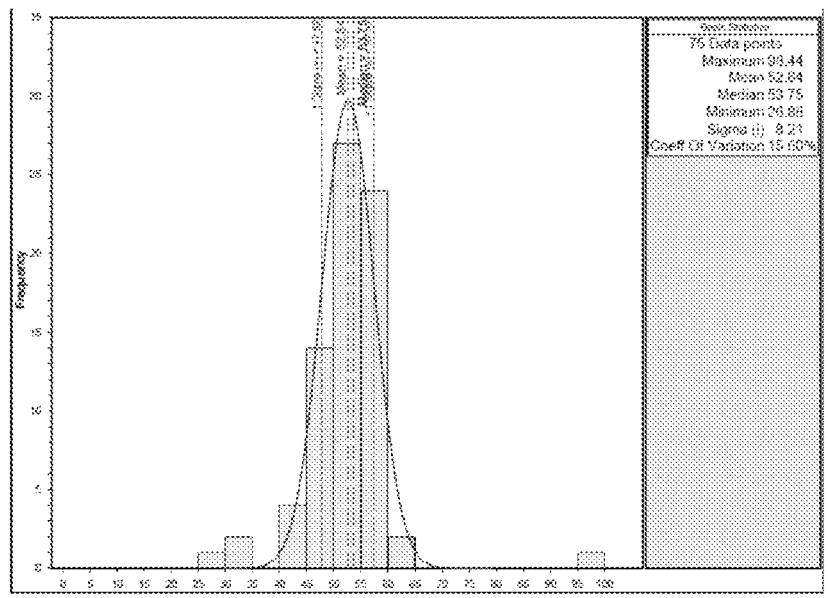
FIGS. 41A and 41B show histograms of silica concentrations in an exemplary treated brine composition during the silica management process.
Figure 41B:
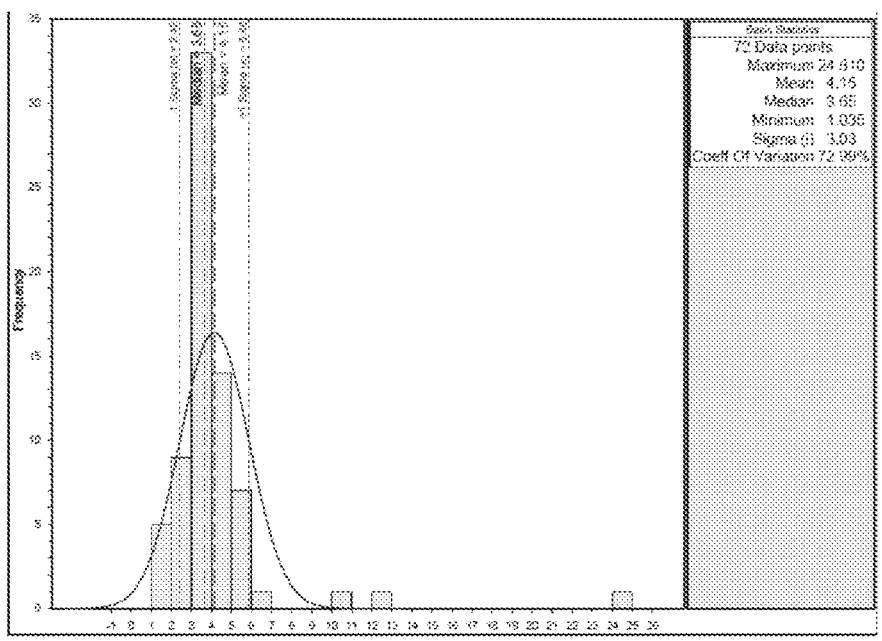
Figure 42A:
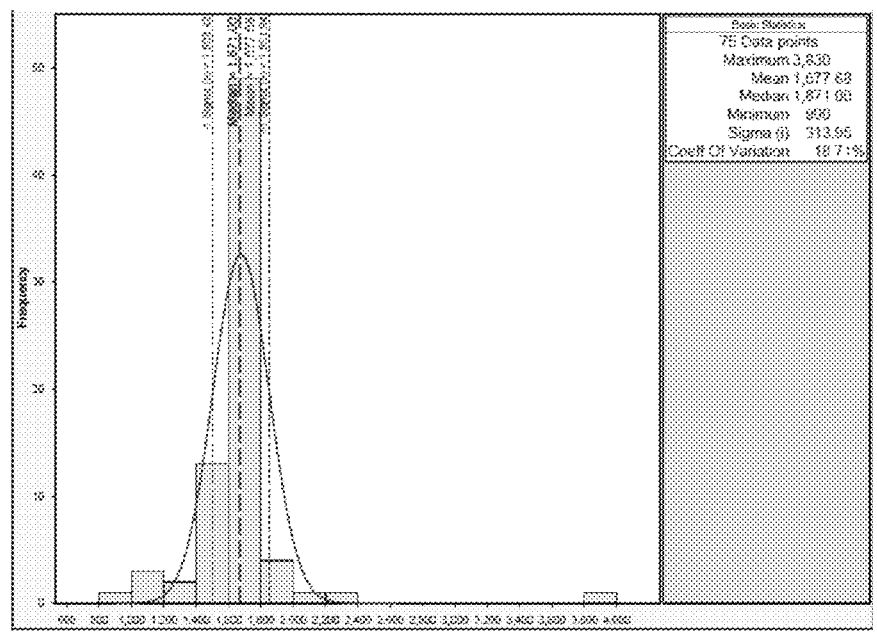
FIGS. 42A and 42B show histograms of iron concentrations in an exemplary treated brine composition during the silica management process.
Figure 42B:
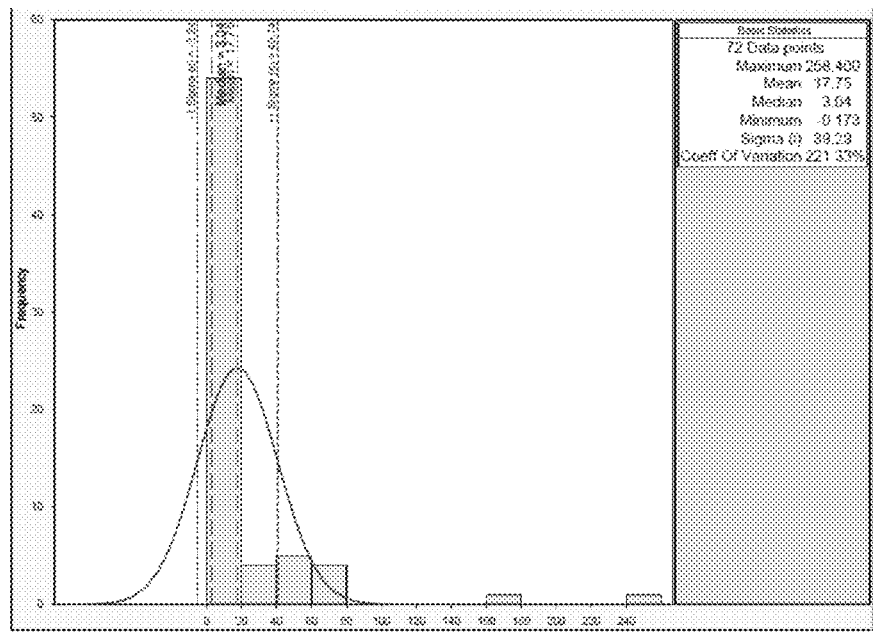

Samples were also analyzed from another exemplary demonstration of the process. FIGS. 38A and 39B show histograms of dissolved silicon (not silica) concentrations in feed brine (FIG. 38A) and clarifier overflow (FIG. 38B). While the concentration of silicon in the feed brine ranged from 27-98 ppm, the mean and median silicon concentrations were both about 53-54 ppm. While the concentration of silicon in the treated brine from the clarifier ranged from 1-25 ppm, the mean and median silicon concentrations were both about 4 ppm. The range in feed $SiO_2$ was 58 ppm to 131 ppm with mean and median of 113 ppm and 115 ppm, respectively. $SiO_2$ in the clarifier overflow ranged between 2 and 53 ppm, with a mean and median of 8.9 and 7.8 ppm, respectively. There was similar removal efficiency in the 95% range. Samples were analyzed from the feed brine and from the clarifier overflow to determine the concentrations of iron. The histograms in FIG. 40 illustrate the iron concentrations in feed brine (FIG. 40A) and clarifier overflow (FIG. 40B). While the concentration of iron in the feed brine ranged from 980-3830 ppm, the mean and median iron concentrations were both about 1670 ppm. While the concentration of iron in the treated brine from the clarifier ranged from 0-258 ppm, the mean and median iron concentrations were about 18 ppm and 3 ppm, respectively.

In another exemplary demonstration of the process, the treated brine with reduced silica and iron concentration was fed to a lithium removal process, and the presence of arsenic, barium, iron, lithium, lead, and silicon was analyzed at different stages of the operation, and the results are shown in Table 12. Concentrations of calcium in these treated compositions can vary from about 30,000 ppm to about 46,000 ppm, with a median concentration of about 36,000 ppm. Concentrations of sodium in these treated compositions can vary from about 40,000 ppm to about 80,000 ppm, with a median concentration of about 61,150 ppm.

TABLE 12

| Sampling | | Arsenic ppm | Barium ppm | Iron ppm | Lithium ppm | Lead ppm | Silicon ppm | Potassium ppm | Manganese ppm | Zinc ppm |
|---|---|---|---|---|---|---|---|---|---|---|
| Silica | Min | 8 | 0 | 990 | 144 | 49 | 27 | 10,990 | 889 | 288 |
| Management | Max | 30 | 244 | 2085 | 387 | 110 | 61 | 25,990 | 1558 | 540 |
| Inlet | Median | 13 | 198 | 1673 | 248 | 92 | 54 | 17,920 | 1349 | 472 |
| Silica | Min | 0 | 51 | 0 | 122 | 43 | 1 | 9,063 | 695 | 208 |
| Management | Max | 3 | 516 | 258 | 354 | 90 | 25 | 24,350 | 1556 | 552 |
| Outlet | Median | 0 | 154 | 3 | 251 | 78 | 4 | 18,480 | 1366 | 476 |
| Brine Outlet | Min | 0 | 52 | 0 | 16 | 41 | 0 | 16,860 | 953 | 434 |
| from | Max | <1 | 191 | 72 | 287 | 86 | 4 | 29,325 | 1803 | 614 |
| Lithium Extraction Column 1 | Median | <1 | 120 | 1 | 45 | 65 | 3 | 21,020 | 1483 | 515 |
| Brine Outlet | Min | 0 | 0 | 0 | 5 | 26 | 0 | 10,640 | 753 | 309 |
| from | Max | 1 | 348 | 331 | 341 | 92 | 12 | 33,850 | 2111 | 678 |
| Lithium Extraction Column 2 | Median | <1 | 108 | 1 | 46 | 73 | 3 | 19,920 | 1427 | 499 |

Example 10

Selective Removal of Potassium Using Ammonium Tetrafluoroborate

Approximately 100 grams of geothermal brine was heated to about 90° C. in a water bath. Approximately 3.5 grams of ammonium tetrafluoroborate was added to the brine. White potassium tetrafluoroborate precipitate formed almost immediately. The mixture was vigorously shaken for 30 seconds and then transferred to centrifuge tubes and centrifuged at 4000 rpm for 4 minutes. Two layers formed, a clear aqueous layer and a white potassium tetrafluoroborate precipitate layer. The clear aqueous layer was decanted off and the potassium tetrafluoroborate precipitate was washed with deionized water at room temperature. The potassium tetrafluoroborate precipitate yield was 2.4 grams.

Example 11

Selective Removal of Potassium Using Fluoroboric Acid

Approximately 100 grams of geothermal brine was heated to about 90° C. in a water bath. Approximately 5.0 grams of fluoroboric acid (as 48% by weight solution) was added to the brine. A white potassium tetrafluoroborate precipitate formed almost immediately. The mixture was vigorously shaken for 30 seconds and then centrifuged at 4000 rpm for four minutes. Two layers were formed, a clear aqueous layer and a solid white potassium tetrafluoroborate precipitate layer. The clear aqueous layer was decanted off and the potassium tetrafluoroborate precipitate layer was washed with deionized water. The potassium tetrafluoroborate precipitate yield was 2.65 grams.

Example 12

Selective Removal of Potassium Using Modified DOWEX-K-21 Resin Beads

Approximately 100 grams of water was added to 40 grams of Dowex-K-21 ion exchange resin beads containing chloride ions. To this, 8 grams of potassium tetrafluoroborate was added and the resulting solution was heated to about 90° C. in a water bath for approximately 30 minutes. The solution was stirred occasionally during heating. All potassium tetrafluoroborate dissolved in the first 5 minutes of the reaction. The clear solution was decanted of and the tetrafluoroborate terminated Dowex-K-21 resin beads (modified resin beads) were separated from the clear solution. Approximately 50 grams of geothermal brine was heated to about 90° C. in a water bath. Approximately 40 grams of the modified resin beads were added to the brine. The mixture was vigorously shaken for 1 minute and then continued heating at 90° C. in a water bath. A white potassium tetrafluoroborate precipitate formed within 5 minutes. Heating continued for 5 more minutes. The liquid with the precipitate was collected in a centrifuge tube. The liquid with the precipitate was then centrifuged at 4000 rpm for 4 minutes. The potassium tetrafluoroborate precipitate yield was 0.4 grams.

Example 13

Potassium Chloride Conversion using Tetrabutylammonium Chloride

Approximately 0.55 grams of tetrabutylammonium chloride (TBAC) was dissolved in about 10 mL of water in a test tube and heated to about 85° C. Potassium tetrafluoroborate (approximately 0.25 grams), prepared using the methods described above, was added to the solution and heated with occasional stirring until completely dissolved. A lighter white precipitate formed and floated to the surface of the solution. After five minutes, the white precipitate was separated from the aqueous layer of the solution. The aqueous layer was allowed to evaporate to dryness, producing solid potassium chloride. The reaction yielded 90 mg of potassium chloride.

Example 14

Potassium Chloride Conversion Using Trihexyltetradecyl Phosphonium Chloride

Approximately 1.03 grams of trihexyltetradecyl phosphonium chloride was added to about 5 grams of water and heated to about 90° C. Approximately 1.02 grams of potassium tetrafluoroborate, prepared using the methods described above, was added to the solution and stirred vigorously for about 30 minutes. Two layers were formed, an aqueous layer and an organic layer. The two layers were separated and the aqueous layer was allowed to evaporate to dryness, producing solid potassium chloride. The reaction yielded 0.5 grams of potassium chloride.

Example 15

Potassium Chloride Conversion Using DOWEX-K-21 Resin Beads

Approximately 8 grams of DOWEX-K-21 resin beads were added to 100 grams of water and heated to 90° C. 1.0 gram of potassium tetrafluoroborate was added to the solution and the solution was shaken vigorously for 30 seconds every two minutes, for approximately 10 minutes. All of the potassium tetrafluoroborate was dissolved in solution after 10 minutes. The resulting aqueous layer was separated from the resin beads and allowed to evaporate to dryness, producing solid potassium chloride. This reaction yielded 0.58 grams of potassium chloride.

Example 16

Potassium Chloride Conversion Using Trihexyltetradecyl Phosphonium Chloride

Approximately 4.1 grams of potassium tetrafluoroborate was added to 7.3 grams of water. To this suspension was added approximately 16.8 grams of trihexyltetradecyl phosphonium chloride. The resulting mixture was vigorously agitated at 90° C. for 2 to 10 minutes. The resulting mixture was separated using a separatory funnel. The potassium chloride concentration in the final solution was approximately 23 wt. %. X-ray powder diffraction confirmed the presence of potassium chloride.

Example 17

Selective Removal of Potassium and Rubidium from a Reduced Silica Feed Using Fluoroboric Acid A geothermal brine that had been subjected to a silica management process and had reduced silica content was heated to about 90° C. in a water bath. Fluoroboric acid (as 48% by weight solution) was added to the reduced silica geothermal brine, as shown in Table 13. A white potassium tetrafluoroborate precipitate formed almost immediately. The mixtures were vigorously shaken for 30 seconds and then centrifuged at 4000 rpm for four minutes. Two layers were formed; a clear aqueous layer and a solid white potassium tetrafluoroborate precipitate layer. The clear aqueous layer was decanted off and the potassium tetrafluoroborate precipitate layer was washed with deionized water. The clear aqueous layer was analyzed using ICP-OES. The results are shown in Table 14.

TABLE 13

| Sample | g XBF4/kg Brine | brine wt. (g) | brine, mL | HBF4 wt. (g) |
|---|---|---|---|---|
| 1 | 0 | 10 | 8.33 | 0 |
| 2 | 0.96 | 10 | 8.33 | 0.02 |
| 3 | 4.8 | 10 | 8.33 | 0.1 |
| 4 | 12 | 10 | 8.33 | 0.25 |
| 5 | 24 | 10 | 8.33 | 0.5 |
| 6 | 36 | 10 | 8.33 | 0.75 |
| 7 | 48 | 10 | 8.33 | 1 |
| 8 | 60 | 10 | 8.33 | 1.25 |
| 9 | 72 | 10 | 8.33 | 1.5 |

TABLE 14

| Sample | Fe (mg/kg) | K (mg/kg) | Li (mg/kg) | Mn (mg/kg) | Pb (mg/kg) | Rb (mg/kg) | Si (mg/kg) | Zn (mg/kg) |
|---|---|---|---|---|---|---|---|---|
| 1 | 0.2 | 19667 | 256 | 1417 | 93 | 287 | 4 | 531 |
| 2 | N.D. | 18167 | 249 | 1433 | 89 | 280 | 4 | 537 |
| 3 | N.D. | 17000 | 247 | 1400 | 89 | 264 | 5 | 520 |
| 4 | N.D. | 13917 | 248 | 1392 | 90 | 234 | 5 | 529 |
| 5 | 0.17 | 8417 | 23 | 1283 | 85 | 179 | 5 | 489 |
| 6 | N.D. | 3500 | 249 | 1425 | 83 | 123 | 6 | 537 |
| 7 | N.D. | 925 | 235 | 1358 | 72 | 55 | 6 | 507 |
| 8 | 0.18 | 392 | 251 | 1425 | 76 | 37 | 9 | 524 |
| 9 | 0.13 | 362 | 266 | 1508 | 74 | 32 | 11 | 565 |

N.D. indicates that the levels were below detectable limits.

Example 18

Selective Removal of Potassium and Rubidium from a Reduced Silica Feed Using Fluoroboric Acid A geothermal brine that had been subjected to a silica management process and had reduced silica content was heated to about 90° C. in a water bath. Fluoroboric acid (as 48% by weight solution) was added to the reduced silica geothermal brine, as shown in Table 15. A white potassium tetrafluoroborate precipitate formed almost immediately. The mixtures were vigorously shaken for 30 seconds and then centrifuged at 4000 rpm for four minutes. Two layers were formed; a clear aqueous layer and a solid white potassium tetrafluoroborate precipitate layer. The clear aqueous layer was decanted off and the potassium tetrafluoroborate precipitate layer was washed with deionized water. The clear aqueous layer was analyzed using ICP-OES. The results are shown in Table 16.

TABLE 15

| | g XBF4/Kg Brine | brine wt. (g) | brine, mg/Kg | HBF4 wt. (g) |
|---|---|---|---|---|
| 1 | 0 | 50 | 41.7 | 0 |
| 2 | 2.16 | 50 | 41.7 | 0.23 |
| 3 | 5.57 | 50 | 41.7 | 0.58 |
| 4 | 8.06 | 50 | 41.7 | 0.84 |
| 5 | 12.96 | 20 | 41.7 | 0.54 |
| 6 | 17.52 | 20 | 41.7 | 0.73 |
| 7 | 22.56 | 20 | 41.7 | 0.94 |
| 8 | 25.44 | 20 | 41.7 | 1.06 |

TABLE 16

| Sample | Fe (mg/kg) | K (mg/kg) | Li (mg/kg) | Mn (mg/kg) | Pb (mg/kg) | Rb (mg/kg) | Si (mg/kg) | Zn (mg/kg) |
|---|---|---|---|---|---|---|---|---|
| 1 | <MQL | 21917 | 131 | <MQL | <MQL | <MQL | 1.31 | 1.31 |
| 2 | <MQL | 19000 | 121 | 0.93 | <MQL | <MQL | 2.01 | 2.01 |
| 3 | <MQL | 17958 | 125 | 0.44 | <MQL | <MQL | 1.38 | 1.38 |
| 4 | <MQL | 16792 | 130 | 0.62 | <MQL | <MQL | 1.30 | 1.30 |
| 5 | <MQL | 14292 | 134 | 1.64 | <MQL | <MQL | 1.33 | 1.33 |
| 6 | <MQL | 11125 | 121 | 0.62 | <MQL | <MQL | 1.23 | 1.23 |
| 7 | <MQL | 9208 | 127 | 0.48 | <MQL | <MQL | 1.30 | 1.30 |
| 8 | <MQL | 7017 | 115 | <MQL | <MQL | <MQL | 1.23 | 1.23 |

<MQL or less than Method Quantification Limit indicates that the levels were below detectable limits of the method.

Example 19

Selective Removal of Potassium and Rubidium from a Reduced Silica Brine Using Ammonium Tetrafluoroborate A geothermal brine that had been subjected to a silica management process and had reduced silica content was heated to about 90° C. in a water bath. Ammonium tetrafluoroborate was added to the reduced silica geothermal brine, as shown in Table 17. A white potassium tetrafluoroborate precipitate formed almost immediately. The mixtures were vigorously shaken for 30 seconds and then centrifuged at 4000 rpm for four minutes. Two layers were formed; a clear aqueous layer and a solid white potassium tetrafluoroborate precipitate layer. The clear aqueous layer was decanted off and the potassium tetrafluoroborate precipitate layer was washed with deionized water. The clear aqueous layer was analyzed using ICP-OES. The results are shown in Table 18.

TABLE 17

| Sample | g XBF4/Kg Brine | Brine wt. (g) | Brine, mL | NH4BF4 wt. (g) |
|---|---|---|---|---|
| 1 | 0 | 10 | 8.33 | 0 |
| 2 | 0.48 | 10 | 8.33 | 0.01 |
| 3 | 2.4 | 10 | 8.33 | 0.05 |
| 4 | 4.8 | 10 | 8.33 | 0.1 |
| 5 | 12 | 10 | 8.33 | 0.25 |
| 6 | 24 | 10 | 8.33 | 0.5 |
| 7 | 38.4 | 10 | 8.33 | 0.8 |

TABLE 18

| Sample | Fe (mg/kg) | K (mg/kg) | Li (mg/kg) | Mn (mg/kg) | Pb (mg/kg) | Rb (mg/kg) | Si (mg/kg) | Zn (mg/kg) |
|---|---|---|---|---|---|---|---|---|
| 1 | <MQL | 19417 | 235 | 1883 | 83 | 191 | 2.6 | 507 |
| 2 | <MQL | 18083 | 220 | 1817 | 78 | 183 | 2.6 | 465 |
| 3 | <MQL | 18167 | 224 | 1833 | 79 | 181 | 2.8 | 473 |
| 4 | <MQL | 17583 | 220 | 1800 | 78 | 178 | 2.9 | 469 |
| 5 | <MQL | 16083 | 230 | 1892 | 83 | 173 | 3.1 | 499 |
| 6 | <MQL | 9917 | 260 | 2017 | 93 | 135 | 3.8 | 531 |
| 7 | <MQL | 1542 | 218 | 1783 | 79 | 42 | 7.8 | 455 |

<MQL or less than Method Quantification Limit indicates that the levels were below detectable limits of the method.

Example 20

Selective Removal of Potassium and Rubidium from a Reduced Silica Brine Using Calcium Tetrafluoroborate Reduced silica brine was heated to about 90° C. in a water bath. Calcium tetrafluoroborate was added to the reduced silica brine, as shown in Table 19. A white potassium tetrafluoroborate precipitate formed almost immediately. The mixtures were vigorously shaken for 30 seconds and then centrifuged at 4000 rpm for four minutes. Two layers were formed; a clear aqueous layer and a solid white potassium tetrafluoroborate precipitate layer. The clear aqueous layer was decanted off and the potassium tetrafluoroborate precipitate layer was washed with deionized water. The clear aqueous layer was analyzed using ICP-OES. The results are shown in Table 20.

TABLE 19

| Sample | g XBF4/Kg Brine | brine wt. (g) | brine, L (brine density 1.2 g/cc) | Ca(BF4)2 wt. (g) |
|---|---|---|---|---|
| 1 | 0 | 10 | 8.33 | 0 |
| 2 | 2 | 10 | 8.33 | 0.02 |
| 3 | 10 | 10 | 8.33 | 0.1 |
| 4 | 25 | 10 | 8.33 | 0.25 |
| 5 | 50 | 10 | 8.33 | 0.5 |
| 6 | 75 | 10 | 8.33 | 0.75 |
| 7 | 100 | 10 | 8.33 | 1 |

TABLE 20

| Sample | Fe (mg/kg) | K (mg/kg) | Li (mg/kg) | Mn (mg/kg) | Pb (mg/kg) | Rb (mg/kg) | Si (mg/kg) | Zn (mg/kg) |
|---|---|---|---|---|---|---|---|---|
| 1 | <MQL | 14833 | 109 | 0.1 | 15 | 242 | 10.7 | 0.91 |
| 2 | <MQL | 14833 | 106 | 0.1 | 16 | 239 | 2.7 | 0.96 |
| 3 | <MQL | 14292 | 107 | 0.1 | 16 | 229 | 4.4 | 0.95 |
| 4 | <MQL | 12208 | 106 | 0.1 | 16 | 209 | 1.6 | 0.99 |
| 5 | <MQL | 10292 | 111 | 0.2 | 16 | 113 | 0.8 | 1.14 |
| 6 | <MQL | 5688 | 110 | 0.2 | 16 | 142 | 1.0 | 1.20 |
| 7 | <MQL | 2483 | 111 | 0.3 | 16 | 99 | 1.1 | 1.34 |

Example 21

Selective Removal of Cesium from a Reduced Silica Brine Using Crystalline Silicotitanate A reduced silica brine was heated to about 90° C. in a water bath. One gram of crystalline silicotitanate was added to 100 grams of reduced silica brine and allowed contact for 3 hours, at pH 3, 5, and 8. The crystalline silicotitanate uptake of cesium was measured. Uptake efficiency at pH 8 was 35.11%, at pH 5 was 77.46%, and pH 3 was 73.53%. The concentration of Cs was measured using atomic absorption spectroscopy. The uptake efficiency is measured by analyzing the initial concentration in the brine solution prior to contact with the CST sorption media and again after contact.

As is understood in the art, not all equipment or apparatuses are shown in the figures. For example, one of skill in the art would recognize that various holding tanks and/or pumps may be employed in the present method.

The singular forms "a," "an" and "the" include plural referents, unless the context clearly dictates otherwise.

"Optional" or "optionally" means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

As used herein, recitation of the term about and approximately with respect to a range of values should be interpreted to include both the upper and tower end of the recited range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

We claim:

1. A treated geothermal brine composition, the composition comprising a treated geothermal brine having a concentration of silica ranging from about 0 mg/kg to about 15 mg/kg, a concentration of iron ranging from about 0 mg/kg to about 10 mg/kg, and a concentration of potassium less than about 500 mg/kg, and comprising recoverable amounts of one or more metals selected from the group consisting of lithium, rubidium, and cesium or mixtures thereof.

2. The treated geothermal brine composition of claim 1, wherein the concentration of silica is less than about 10 mg/kg, the concentration of iron is less than about 10 mg/kg, and the concentration of potassium is less than about 4000 mg/kg.

3. The treated geothermal brine composition of claim 1, wherein the concentration of silica is less than about 15 mg/kg, the concentration of iron is less than about 10 mg/kg, and the concentration of potassium is less than about 4000 mg/kg.

4. The treated geothermal brine composition of claim 1, wherein the concentration of silica is less than about 10 mg/kg, the concentration of iron is less than about 10 mg/kg, and the concentration of potassium is less than about 2000 mg/kg.

5. The treated geothermal brine composition of claim 1, wherein the concentration of silica is less than about 10 mg/kg, the concentration of iron is less than about 10 mg/kg, and the concentration of potassium is less than about 1000 mg/kg.

6. The treated geothermal brine composition of claim 1, wherein the concentration of silica is less than about 5 mg/kg, the concentration of iron is less than about 10 mg/kg, and the concentration of potassium is less than about 1000 mg/kg.

7. The treated geothermal brine composition of claim 1, wherein the concentration of silica is less than about 10 mg/kg, the concentration of iron is less than about 10 mg/kg, and the concentration of potassium is less than about 500 mg/kg.

8. The treated geothermal brine composition of claim 1, wherein the concentration of silica is less than about 5 mg/kg, the concentration of iron is less than about 10 mg/kg, and the concentration of potassium is less than about 500 mg/kg.

9. The treated geothermal brine composition of claim 1, further wherein the treated geothermal brine has a concentration of rubidium ranging from about 30 mg/kg to about 200 mg/kg.

10. The treated geothermal brine composition of claim 1, further wherein the treated geothermal brine has a concentration of rubidium less than about 150 mg/kg.

11. The treated geothermal brine composition of claim 1, further wherein the treated geothermal brine has a concentration of rubidium less than about 100 mg/kg.

12. The treated geothermal brine composition of claim 1, further wherein the treated geothermal brine has a concentration of rubidium less than about 50 mg/kg.

13. The treated geothermal brine composition of claim 1, wherein the treated geothermal brine is a Salton Sea geothermal brine.

14. A method of using a treated geothermal brine composition, the method comprising the steps of supplying the composition of claim 1 to a process for mineral extraction.

15. A method of using a treated geothermal brine composition, the method comprising the step of injecting the composition of claim 1 into a geothermal reservoir.

16. A treated geothermal brine composition, the composition comprising a treated geothermal brine having a concentration of silica ranging from about 0 mg/kg to about 15 mg/kg, a concentration of iron ranging from about 0 mg/kg to about 10 mg/kg, and a concentration of rubidium ranging from about 30 mg/kg to about 200 mg/kg, and comprising recoverable amounts of one or more metals selected from the group consisting of lithium and cesium or mixtures thereof.

17. The treated geothermal brine composition of claim 16, wherein the treated geothermal brine is a Salton Sea geothermal brine.

18. A method of using a treated geothermal brine composition, the method comprising the step of supplying the composition of claim 16 to a process for mineral extraction.

19. A method of using a treated geothermal brine composition, the method comprising the step of injecting the composition of claim 16 into a geothermal reservoir.

20. The treated geothermal brine composition of claim 16, wherein the treated geothermal brine has a concentration of potassium of less than about 4000 mg/kg.

* * * * *